(12) United States Patent
Van Ostrand et al.

(10) Patent No.: US 12,321,560 B2
(45) Date of Patent: *Jun. 3, 2025

(54) FINGERPRINT IMAGING DEVICE INCORPORATING ELECTRODES AND DRIVE-SENSE CIRCUITRY

(71) Applicant: SigmaSense, LLC., Wilmington, DE (US)

(72) Inventors: Daniel Keith Van Ostrand, Leander, TX (US); Michael Shawn Gray, Elgin, TX (US); Patrick Troy Gray, Cedar Park, TX (US); Richard Stuart Seger, Jr., Belton, TX (US)

(73) Assignee: SigmaSense, LLC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,315

(22) Filed: Oct. 16, 2023

(65) Prior Publication Data

US 2024/0061540 A1 Feb. 22, 2024

Related U.S. Application Data

(63) Continuation of application No. 17/448,286, filed on Sep. 21, 2021, now Pat. No. 11,797,139.

(51) Int. Cl.
*G06F 3/044* (2006.01)
*G06F 3/041* (2006.01)
(Continued)

(52) U.S. Cl.
CPC .......... *G06F 3/0446* (2019.05); *G06F 3/0412* (2013.01); *G06F 3/04166* (2019.05);
(Continued)

(58) Field of Classification Search
CPC .. G06F 3/0446; G06F 3/0412; G06F 3/04166; G06F 3/04182; G06V 40/1306; G06V 40/1365
See application file for complete search history.

(56) References Cited

U.S. PATENT DOCUMENTS 5,437,178 A 8/1995 Esin et al.
5,953,441 A 9/1999 Setlak
(Continued)

FOREIGN PATENT DOCUMENTS

CN 103995626 A 8/2014
CN 104182105 A 12/2014
(Continued)

OTHER PUBLICATIONS

Baker; How delta-sigma ADCs work, Part 1; Analog Applications Journal; Oct. 1, 2011; 6 pgs.
(Continued)

*Primary Examiner* — Jonathan A Boyd
(74) *Attorney, Agent, or Firm* — Garlick & Markison; Timothy W. Markison; Shayne X. Short

(57) ABSTRACT

A fingerprint imaging device incorporating a first plurality of electrodes, a second plurality of electrodes and drive-sense circuitry. The first plurality of electrodes and the second plurality of electrodes are separated by a dielectric material and arranged in a crossing pattern in a sensing area. In an embodiment, each of the drive-sense circuits is configured to drive a sensor signal on an electrode of the first plurality or second plurality of electrodes, the sensor signal including a drive signal component and a receive signal component. Each of the drive-sense circuits is further configured to generate, based on the receive signal component, a sensed signal representative of at least a first impedance of the electrode. For at least some of the drive-sense circuits, the sensed signal further represents a second impedance of the electrode in accordance with a drive signal component from a differing electrode. A processing module of the device is configured to process the sensed signals to detect a finger touch to the sensing area and generate a digital representa- (Continued)

tion/capacitive image of a fingerprint corresponding to the finger touch.

20 Claims, 33 Drawing Sheets

(51) Int. Cl.
   *G06V 40/12* (2022.01)
   *G06V 40/13* (2022.01)
(52) U.S. Cl.
   CPC ...... *G06F 3/04182* (2019.05); *G06V 40/1306* (2022.01); *G06V 40/1365* (2022.01)

(56) References Cited

U.S. PATENT DOCUMENTS

| | | | |
|---|---|---|---|
| 6,218,972 | B1 | 4/2001 | Groshong |
| 6,665,013 | B1 | 12/2003 | Fossum et al. |
| 7,476,233 | B1 | 1/2009 | Wiener et al. |
| 7,528,755 | B2 | 5/2009 | Hammerschmidt |
| 8,031,094 | B2 | 10/2011 | Hotelling |
| 8,089,289 | B1 | 1/2012 | Kremin et al. |
| 8,279,180 | B2 | 10/2012 | Hotelling et al. |
| 8,537,110 | B2 | 9/2013 | Kruglick |
| 8,547,114 | B2 | 10/2013 | Kremin |
| 8,587,535 | B2 | 11/2013 | Oda et al. |
| 8,625,726 | B2 | 1/2014 | Kuan |
| 8,657,681 | B2 | 2/2014 | Kim |
| 8,966,400 | B2 | 2/2015 | Yeap |
| 8,982,097 | B1 | 3/2015 | Kuzo et al. |
| 9,081,437 | B2 | 7/2015 | Oda |
| 9,201,547 | B2 | 12/2015 | Elias |
| 10,007,335 | B2 | 6/2018 | Lee |
| 10,756,578 | B1 | 8/2020 | Price |
| 2003/0052657 | A1 | 3/2003 | Koernle et al. |
| 2005/0235758 | A1 | 10/2005 | Kowal et al. |
| 2011/0063154 | A1 | 3/2011 | Hotelling et al. |
| 2011/0279409 | A1 | 11/2011 | Salaverry |
| 2011/0298745 | A1 | 12/2011 | Souchkov |
| 2012/0278031 | A1 | 11/2012 | Oda |
| 2013/0278447 | A1 | 10/2013 | Kremin |
| 2014/0327644 | A1 | 11/2014 | Mohindra |
| 2015/0091847 | A1 | 4/2015 | Chang |
| 2015/0346889 | A1 | 12/2015 | Chen |
| 2016/0188049 | A1 | 6/2016 | Yang et al. |
| 2016/0358010 | A1 | 12/2016 | Yang |
| 2018/0157354 | A1 | 6/2018 | Blondin et al. |
| 2018/0275824 | A1 | 9/2018 | Li |

FOREIGN PATENT DOCUMENTS

| | | |
|---|---|---|
| CN | 104536627 A | 4/2015 |
| CN | 107771273 A | 3/2018 |
| EP | 2284637 A1 | 2/2011 |

OTHER PUBLICATIONS

Brian Pisani, Digital Filter Types in Delta-Sigma ADCs, Application Report SBAA230, May 2017, pp. 1-8, Texas Instruments Incorporated, Dallas, Texas.

European Patent Office; Extended European Search Report; Application No. 19853507.2; Jun. 13, 2023; 7 pgs.

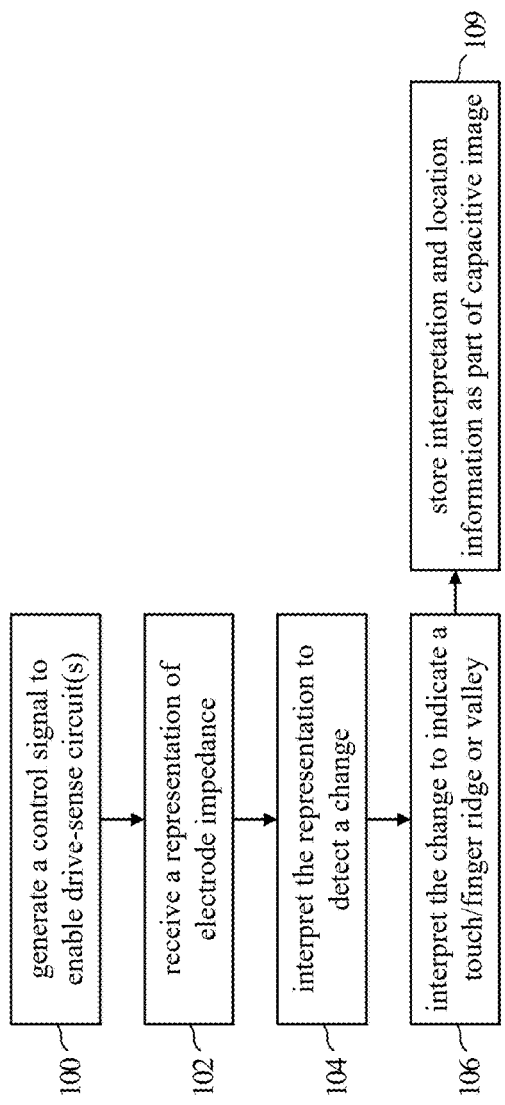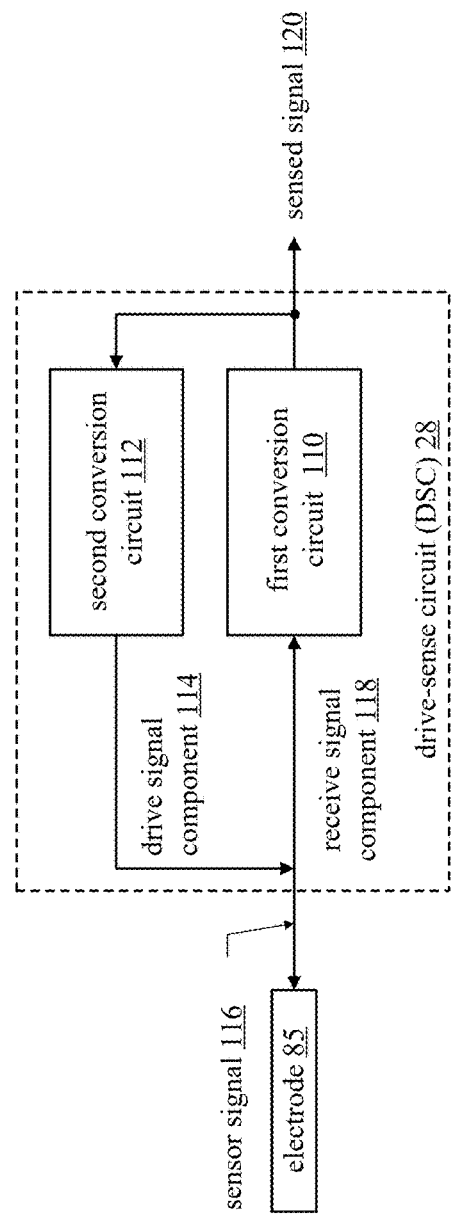

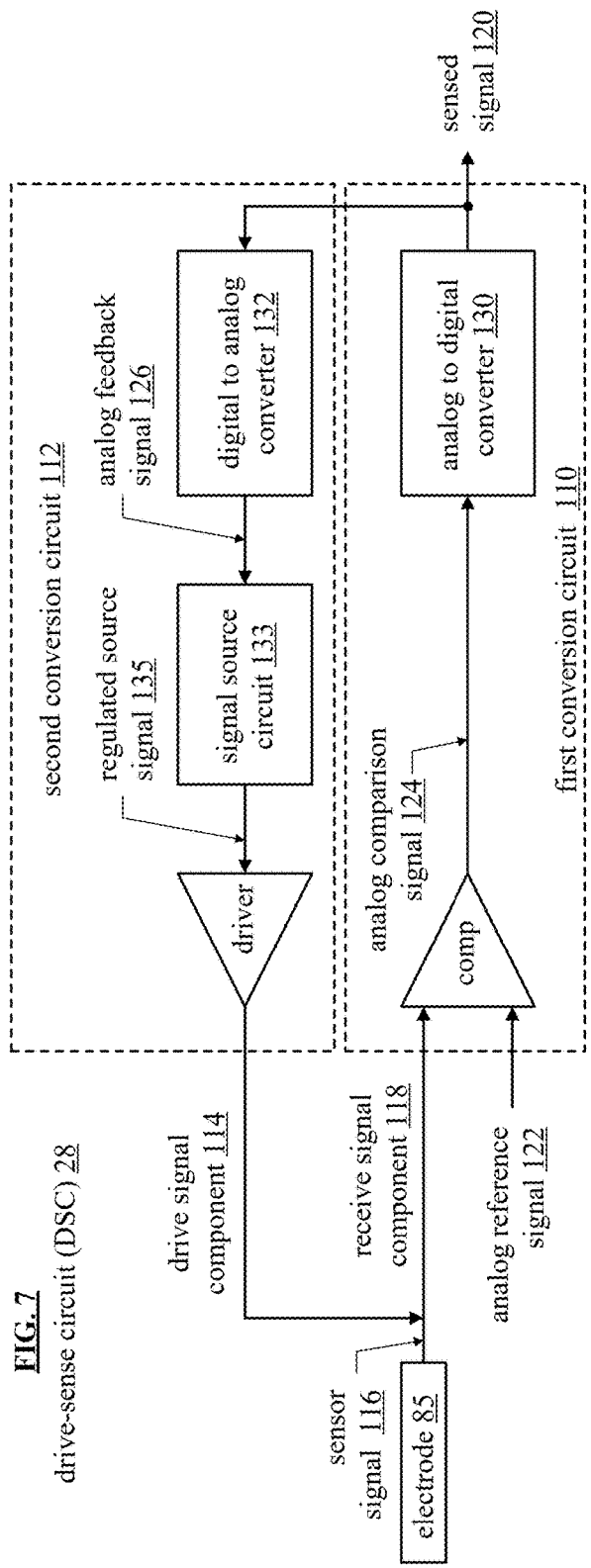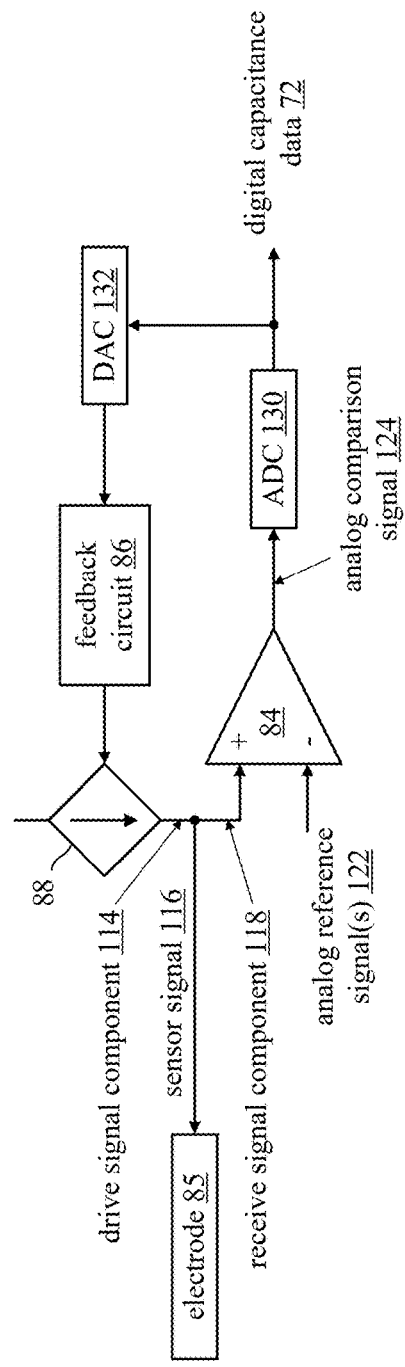

no touch no touch

FIG. 11 touch electrode self-capacitance = $C_p + C_f$ touch mutual capacitance = $C_{m\_1} < C_{m\_0}$
$C_{m\_1} = (C_{m\_0} * C_{f1})/(C_{m\_0} + C_{f1})$

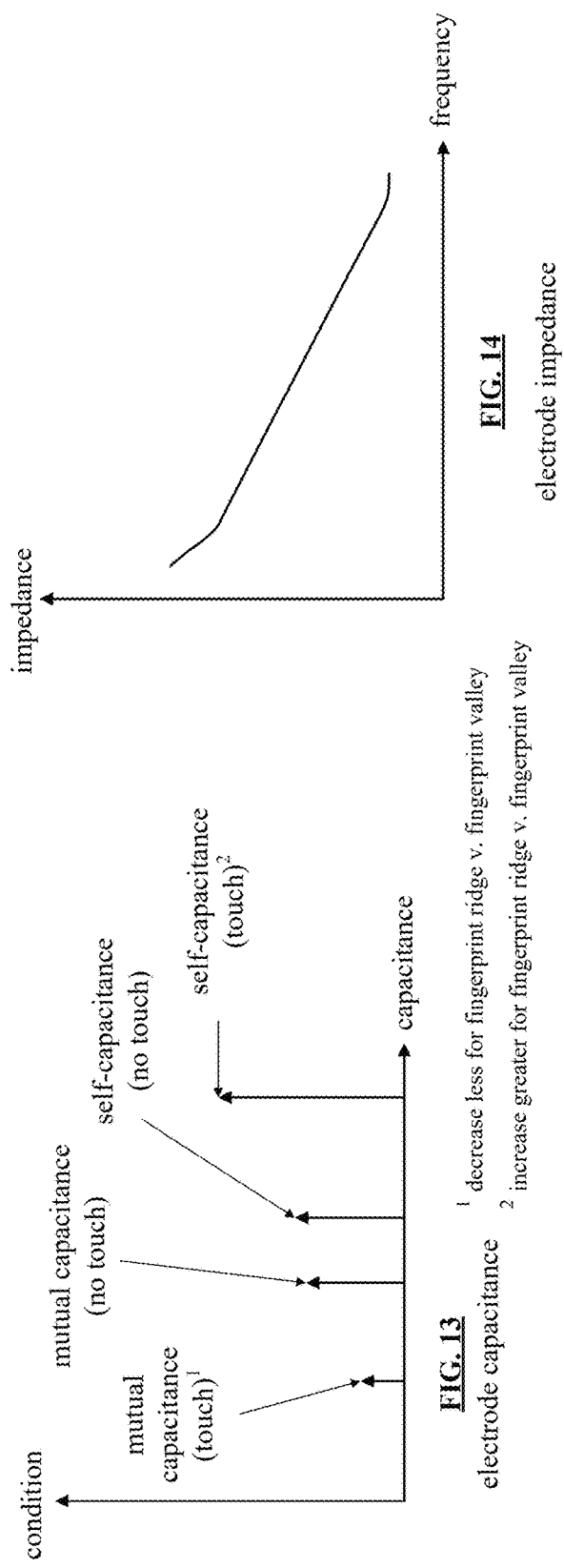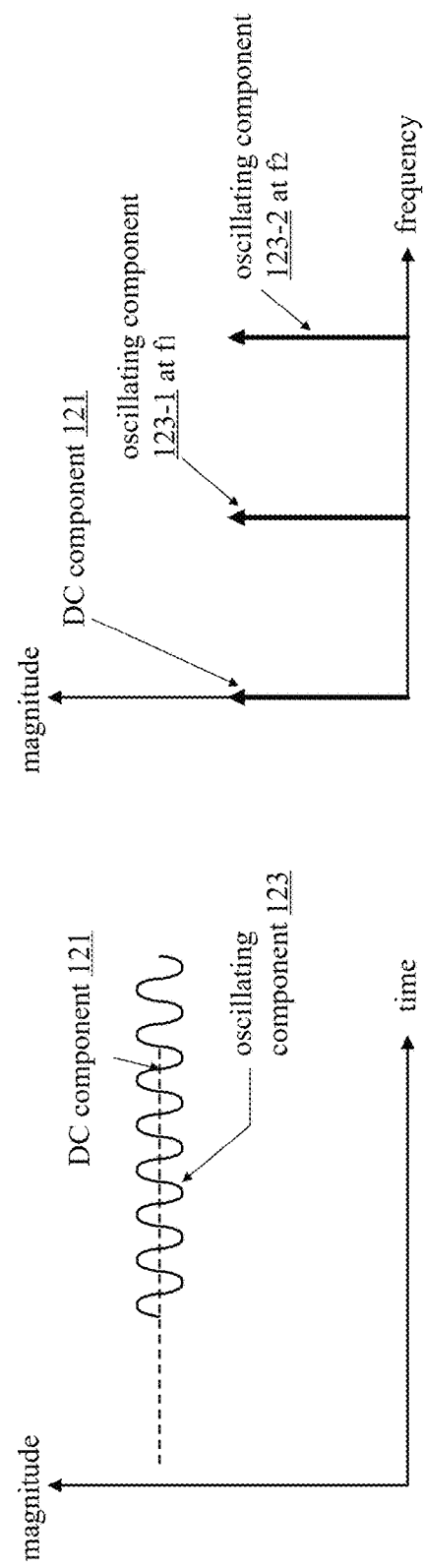

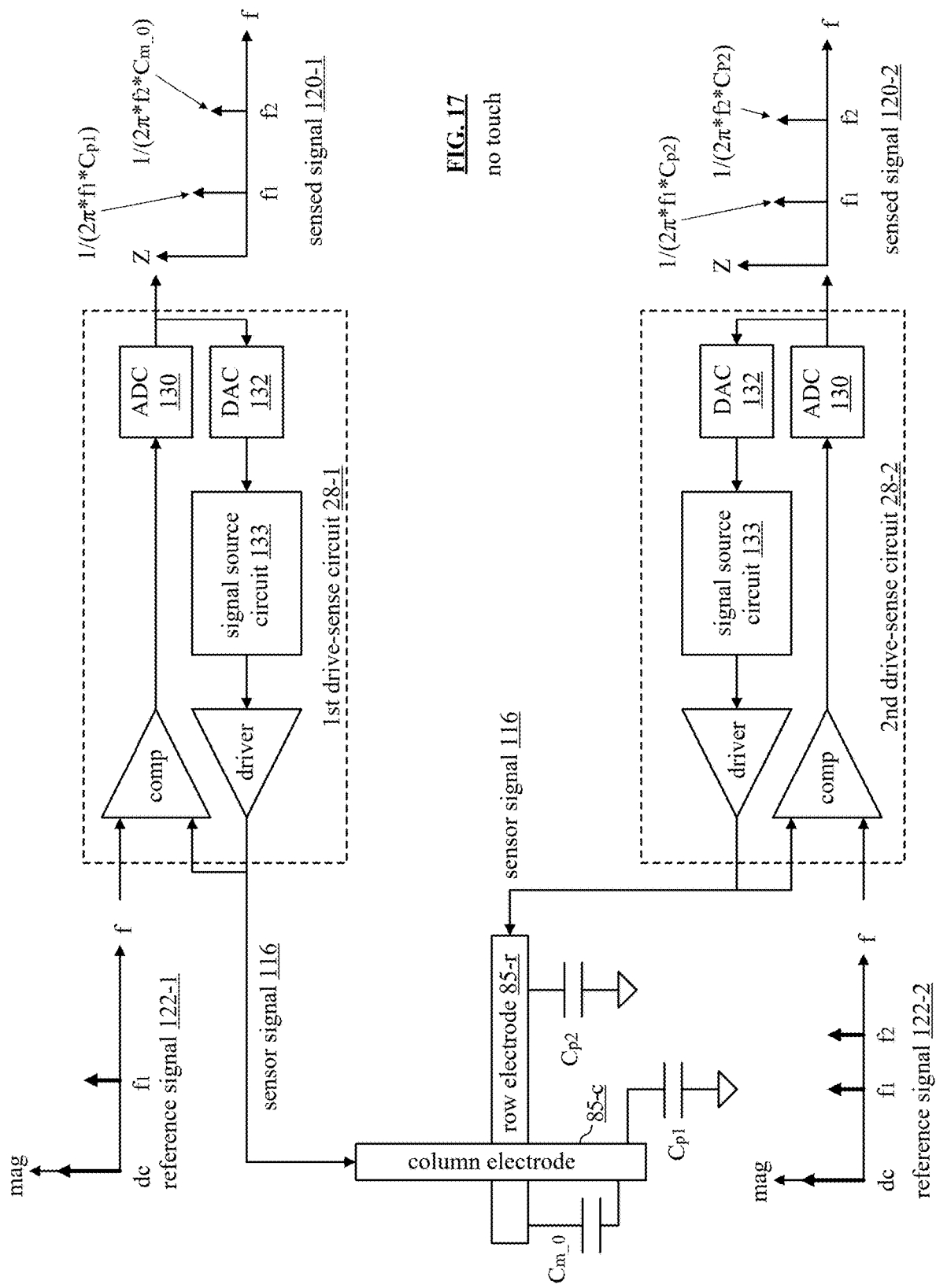
FIG. 17 no touch with touch computing device 36 sensing area 83 with in-cell touch sensors (OLED)

sensing area 83-1 with on-cell touch sensors no touch it = cv
c = Q/v series $Ct = C1*C2/(C1+C2)$
parallel $Ct = C1 + C2$ $i2Cm\_0 > i2Cm\_1$, v is constant,
t is constant, thus $Cm\_0 < Cm\_1$ touch

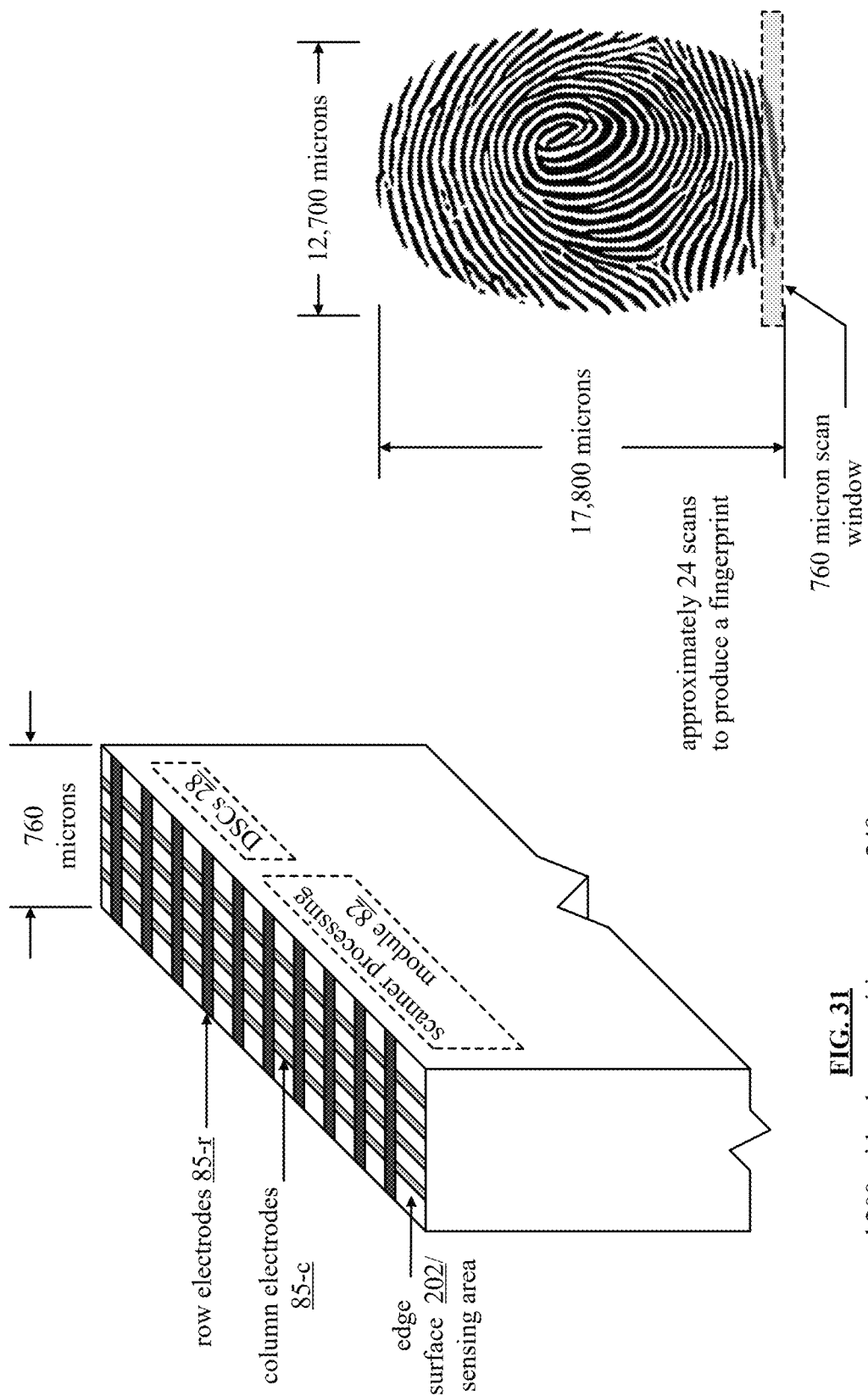

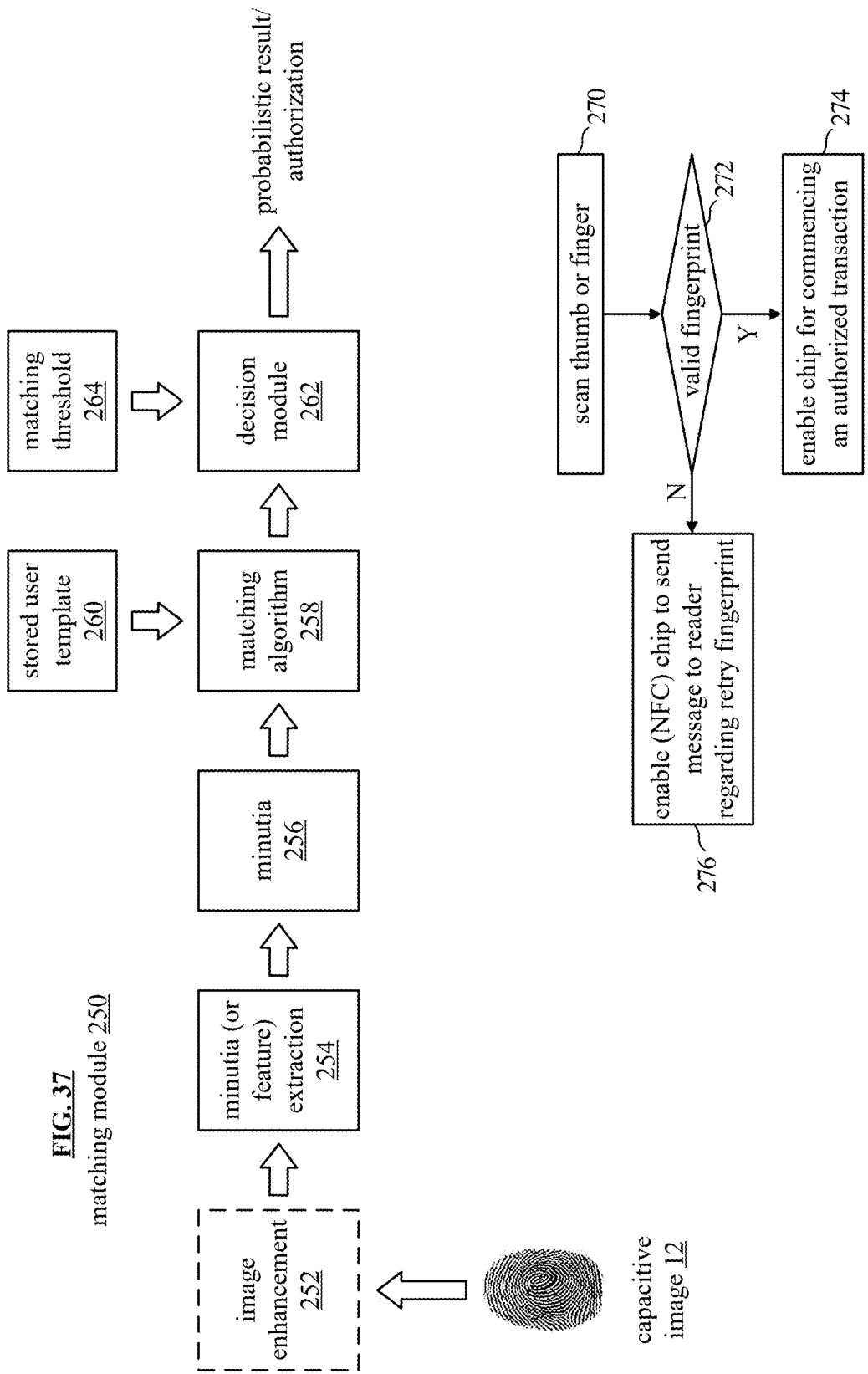

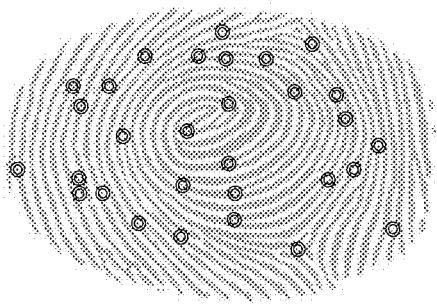
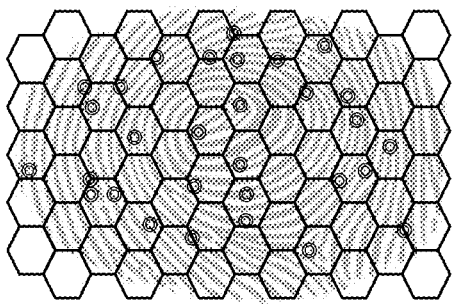
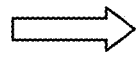
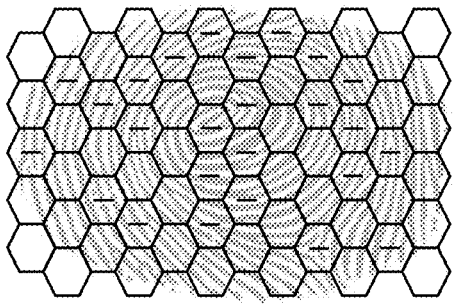
FIG. 39

FINGERPRINT IMAGING DEVICE INCORPORATING ELECTRODES AND DRIVE-SENSE CIRCUITRY

CROSS-REFERENCE TO RELATED APPLICATION(S)

The present U.S. Utility Patent Applications claims priority pursuant to 35 U.S.C. § 120 as a continuation of U.S. Utility application Ser. No. 17/448,286, entitled "FINGERPRINT SCANNING DEVICE INCORPORATING DRIVE-SENSE CIRCUITRY," filed Sep. 21, 2021, which is hereby incorporated herein by reference in its entirety and made part of the present U.S. Utility Patent Applications for all purposes.

BACKGROUND OF THE INVENTION

Technical Field of the Invention

This invention relates generally to biometric systems, and more particularly to fingerprint scanning devices.

Description of Related Art

Sensors are used in a wide variety of applications ranging from in-home automation to industrial systems, to health care, to transportation, and so on. For example, sensors are placed in bodies, automobiles, airplanes, boats, ships, trucks, motorcycles, cell phones, televisions, touch screens, industrial plants, appliances, motors, checkout counters, etc. for the variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is an electrode, a capacitor, a piezoelectric transducer, a piezoresistive transducer, a thermal transducer, a thermocouple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. A computing device is known to communicate data, process data, and/or store data. The computing device may be a smart phone, a cellular phone, a laptop, a tablet, an e-reader, a personal computer (PC), a workstation, a video game device, a server, a television, etc. The computing device processes the sensor signals for a variety of applications. For example, the computing device processes the sensor signals to determine a touch on a touch screen.

Biometric devices such as fingerprint scanners also utilize sensors. Various types of fingerprint scanners include, for example, optical scanners, solid state or CMOS capacitive scanners, ultrasonic fingerprint scanners and thermal scanners. Optical scanners typically use either charge-coupled-devices (CCD) detectors or CMOS based optical imagers. The quality of a fingerprint image captured by optical scanners can be affected by ambient light and surface contamination such as fingerprint residue from a previous user. Further, certain optical scanners can be deceived by latent prints or an imposter using a picture of a fingerprint. Capacitive scanners use an array of capacitor plates (e.g., in a semiconductor sensor chip) to capture an image. In particular, human skin is conductive enough to provide capacitive coupling to an individual capacitive plate of the array. Capacitive scanners typically have a smaller imaging area in relation to optical scanners, which can result in smaller image sizes and lower resolutions.

BRIEF DESCRIPTION OF THE SEVERAL VIEWS OF THE DRAWING(S)

FIG. 5 is a logic diagram of an embodiment of a method for sensing a touch on a sensing area of a fingerprint scanning device in accordance with the present disclosure.

FIG. 6 is a schematic block diagram of an embodiment of a drive-sense circuit in accordance with the present disclosure.

FIG. 7 is a schematic block diagram of another embodiment of a drive-sense circuit in accordance with the present disclosure.

FIG. 8 is a schematic block diagram of another embodiment of a drive-sense circuit in accordance with the present disclosure.

FIG. 13 is an example graph that plots condition verses capacitance for an electrode of a fingerprint scanning device in accordance with the present disclosure.

FIG. 14 is an example graph that plots impedance verses frequency for an electrode of a fingerprint scanning device in accordance with the present disclosure.

FIG. 15 is a time domain example graph that plots magnitude verses time for an analog reference signal in accordance with the present disclosure.

FIG. 16 is a frequency domain example graph that plots magnitude verses frequency for an analog reference signal in accordance with the present disclosure.

FIG. 17 is a schematic block diagram of an example of a first drive-sense circuit coupled to a first electrode and a second drive-sense circuit coupled to a second electrode without a touch proximal to the electrodes in accordance with the present disclosure.

FIG. 31 is a schematic block diagram of an embodiment of a card having an edge capacitive scanner in accordance with the present disclosure.

FIG. 32 is a diagram of an example of a fingerprint scanning process utilizing the edge capacitive scanner of the embodiment of FIG. 31.

FIG. 37 is a schematic block diagram of an embodiment of fingerprint matching module in accordance with the present disclosure.

FIG. 38 is a logic diagram of an embodiment of a method for authorizing a transaction in accordance with the present disclosure.

FIG. 39 is a diagram of an example of extracting fingerprint minutia data in accordance with an embodiment of the present disclosure.

Figure 44:
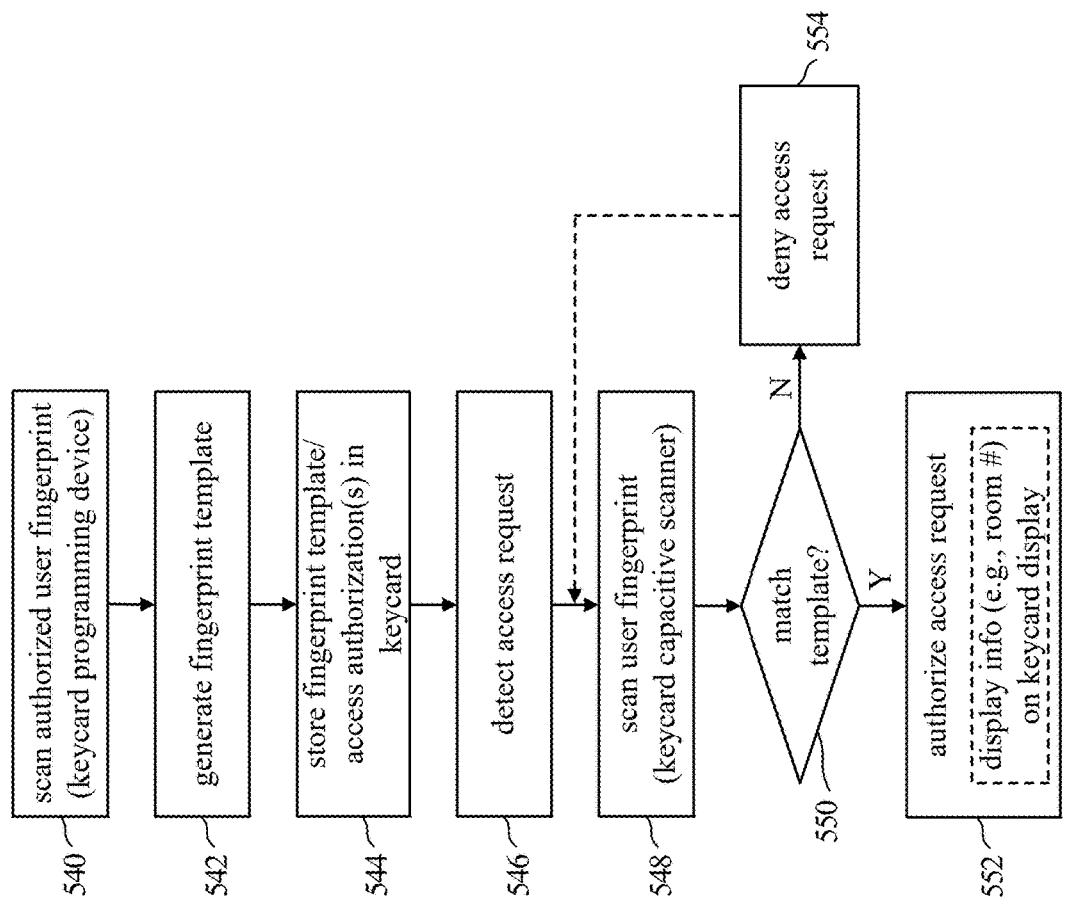

FIG. 44 a logic diagram of an embodiment of a method for authorizing an access request using a keycard in accordance with the present disclosure.

DETAILED DESCRIPTION OF THE INVENTION

Fingerprints are one of the most commonly utilized biometric identifiers for verifying the identity of individuals. In general, fingerprints consist of epidermal ridges and valleys having complex patterns that are unique to each person, making fingerprint biometrics a highly accurate and reliable approach to identity verification. The verification process typically consists of capturing a fingerprint image, extracting the distinguishing features (e.g., "minutia" points) of the fingerprint, and then storing a digital template of the fingerprint or comparing a live image against one or more stored fingerprint templates. An electronic device that captures a digital image of a fingerprint pattern is known as a fingerprint scanner or fingerprint reader.

Figure 1:
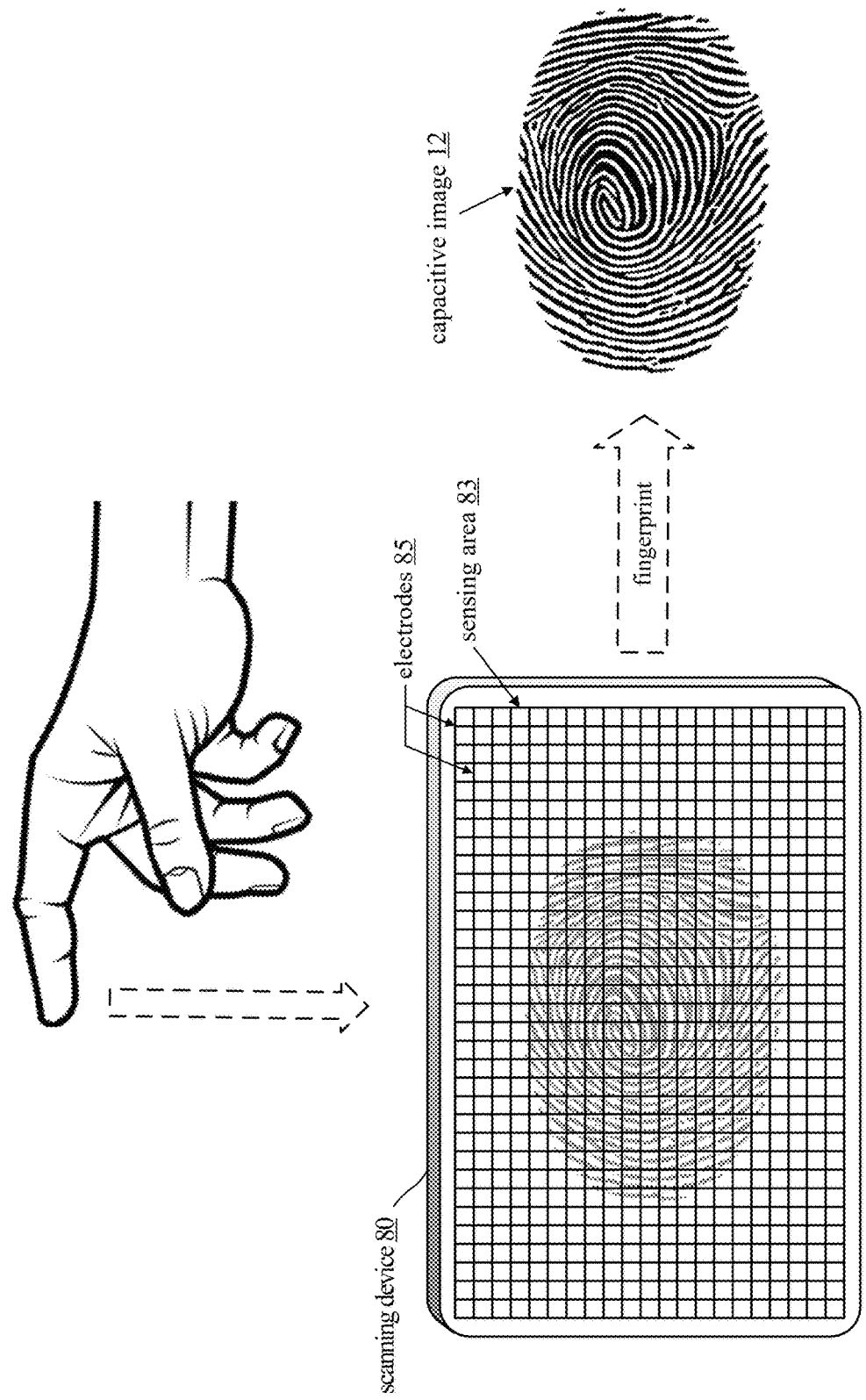
FIG. 1 is a diagram of an embodiment of a device having a fingerprint scanner that utilizes electrodes and drive-sense circuits in accordance with the present disclosure.

Referring now to FIG. 1, a diagram of an embodiment of a scanning device 80 incorporating a capacitive fingerprint scanner that utilizes electrodes 85 is shown. In the illustrated embodiment, the electrodes 85 are arranged in a crossing pattern in a sensing area 83 of the scanning device. As described more fully below, the electrodes 85 are individually coupled to drive-sense circuits (DSCs), which are operable to drive sensor signals on the electrodes. Each of the sensor signals generated by the DSCs includes a drive signal component and a receive signal component. Each of the DSCs generates the drive signal component and interprets the receive signal component to produce a representation of an impedance on an electrode coupled to the DSC.

The scanning device 80 further includes a processing module (not separately illustrated) coupled to the DSCs. In an example, the processing module is configured to sense, based on the sensor signals from the DSCs, one or more electrical characteristics (e.g., self-capacitance, mutual capacitance, change in impedance/capacitance, etc.) of the electrodes of the sensing area 83. In an example of operation, the processing module can determine the location of a finger touch to sensing area 83 based on the sensed electrical characteristics of the electrodes. As described more fully below, the sensed electrical characteristics are also utilized to generate a fingerprint capacitive image 12 such as shown in FIG. 1. In an example, the electrodes 85 have a width of approximately 2-10 microns and a spacing between electrodes of approximately 25-50 microns.

The scanning device 80 can take many forms. For example, the scanning device 80 can be a standalone fingerprint scanner, a mobile communication devices such as a smart phone, a tablet device, a personal video device, a handheld device such as a remote controller or gaming device, and the like. The concepts described herein can also be applied to devices such as wearables, virtual/augmented reality headsets, electronic signage, smart cards (such as an ATM card, a payment (debit/credit) card, an identification card, a keycard or a transit card), passports, locks, safes, etc.

In various embodiments, such as described in with reference to FIGS. 21-27, the sensing area 83 is integrated into a touch screen display configurable to display images while simultaneously performing touch sensing and fingerprint scanning operations. For example, the electrodes 85 of the sensing area 83 can be incorporated in a touch screen display of a scanning device 80 such as a computing device, tablet, smart phone, standalone display, television, etc. In further embodiments, such as described with reference to FIGS. 31-36 and FIGS. 43-44, the sensing area 83 is formed in a side or edge surface of a card or similarly thin device.

The terms "fingerprint" and "thumbprint" are used interchangeably in the following description. In addition, the term "fingerprint" may refer to a physical pattern of epidermal ridges and valleys of a human finger and/or an image generated therefrom as contextually appropriate in the description of a particular embodiment or example. Further, the terms "fingerprint scanner", "scanner" and "fingerprint reader" may be used interchangeably herein for convenience of description.

Figure 2:
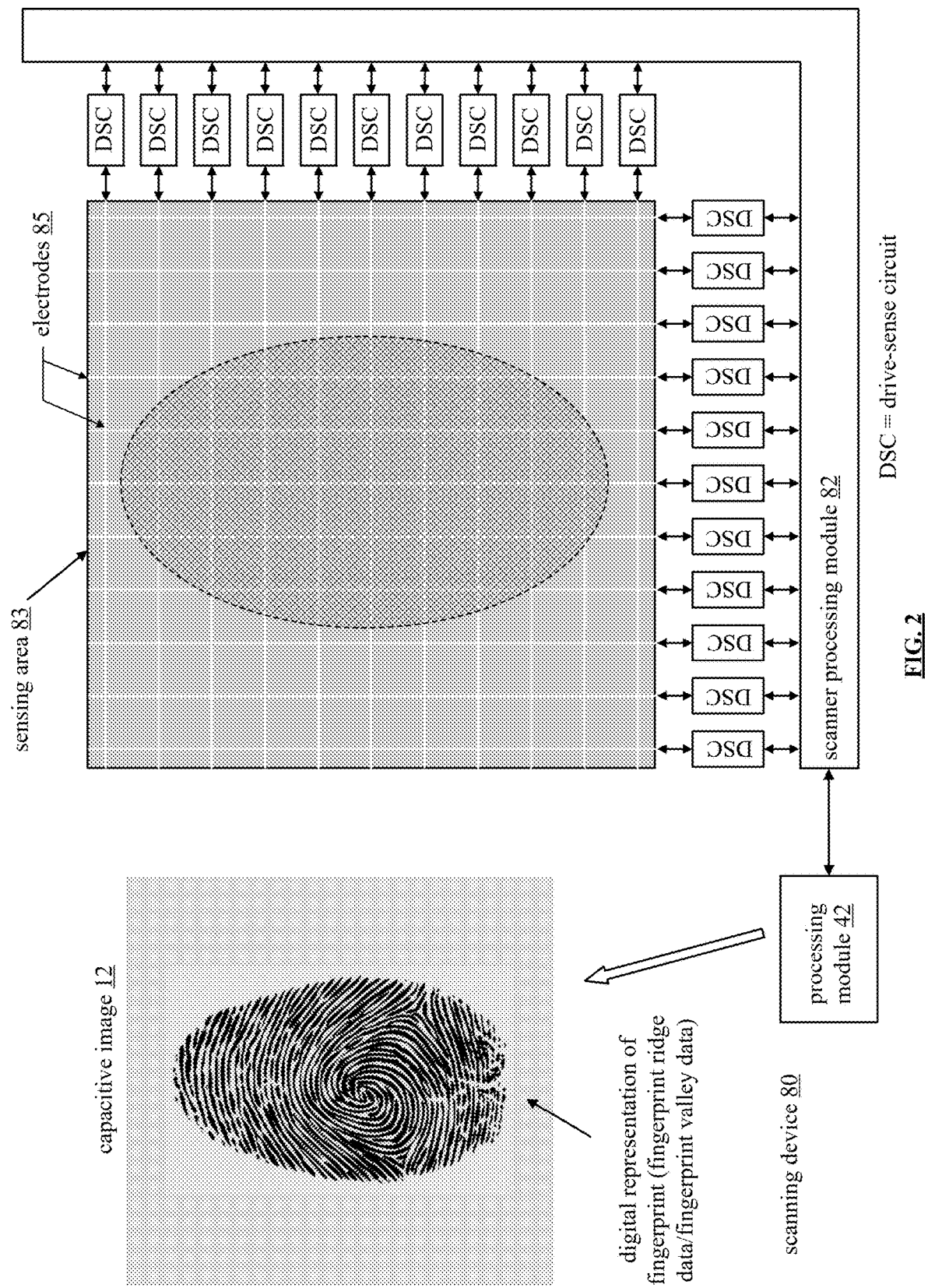
FIG. 2 is a schematic block diagram of an example of a scanning device generating a fingerprint capacitive image in accordance with the present disclosure.

FIG. 2 is a schematic block diagram of an example of a scanning device 80 generating a fingerprint capacitive image 12 in accordance with the present disclosure. In the illustrated example, the scanning device 80 includes a processing module 42, a scanner processing module 82, electrodes 85 arranged in a sensing area 83, and drive-sense circuits (DSCs). Depending on its implementation, the scanning device 80 further includes additional components and circuitry, examples of which are described with reference to FIGS. 3, 4, 21-23, 35, 36 and 42.

In an example of operation, the scanner processing module 82 receives sensed signals from the drive-sense circuits and interprets them to identify a finger touch and corresponding fingerprint features. The scanner processing module 82 provides touch information (which can include the location of a touch, if any, based on the row and column electrodes having an impedance change due to the touch(es)) to the processing module 42.

In the illustrated embodiment, a finger touch is present on the sensing area 83. The processing module 42 processes the touch information to produce a fingerprint capacitive image 12 corresponding to the finger touch. The fingerprint capacitive image 12 of this embodiment is essentially a digital representation of the fingerprint, including fingerprint ridge data and fingerprint valley data. When rendered, the refresh rate of the capacitive image may range from a few frames of capacitive images per second to a hundred or more frames of capacitive images per second.

Note that the capacitive image may be generated in a variety of ways. For example, the self-capacitance and/or mutual capacitance of each touch cell (e.g., intersection of a row electrode with a column electrode) is represented by a color. When the touch cells have substantially the same capacitance or change in capacitance, the representative color of the touch cells will be substantially the same. As another example, the capacitance image is topological mapping of differences between the capacitances of the touch cells. As another example in which a finger touch is present, each touch cell of the sensing area is associated (e.g., by comparing a sensed value or change in value in self-impedance and/or mutual impedance to one or more threshold levels) with a finger ridge, a finger valley, or no touch. In this example, finger ridges can be represented with black color while finger ridges and no touches are represented with a white color. In yet another example, a grayscale color scheme is used to generate the capacitive image.

As described more fully below, details of the fingerprint capacitive image 12 may be extracted and converted into a fingerprint template that can be matched against a stored template. Alternatively, the fingerprint template can be stored for matching against live fingerprint images.

Figure 3:
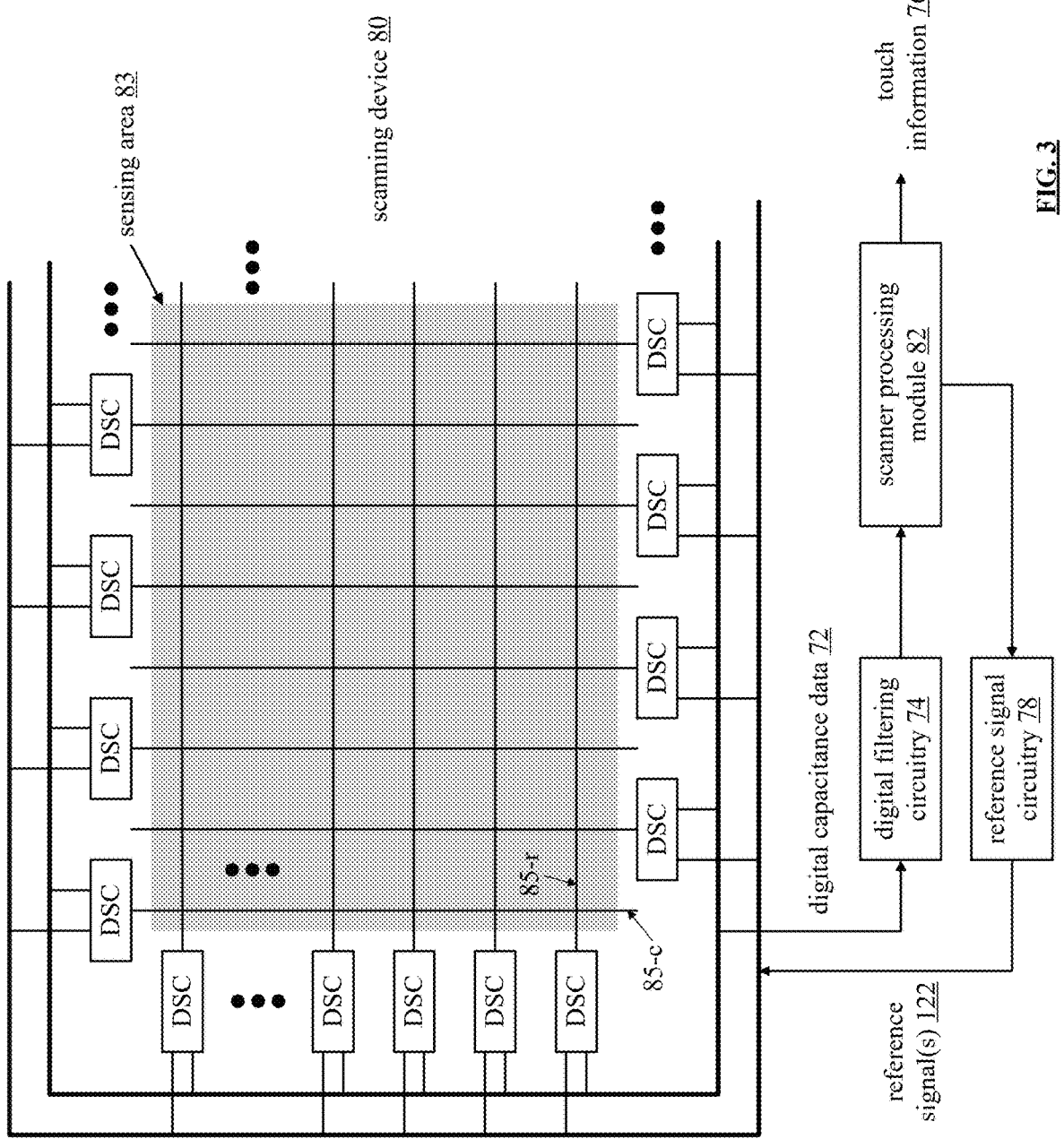
FIG. 3 is a schematic block diagram of an embodiment of touch screen circuitry in a fingerprint scanning device in accordance with the present disclosure.

FIG. 3 is a schematic block diagram of an embodiment of touch screen circuitry in a in a scanning device 80. The touch screen circuitry includes a plurality of drive-sense circuits (DSCs) coupled to a plurality of row electrodes 85-*r* and a plurality of column electrodes 85-*c*, digital filtering circuitry 74, reference signal circuitry 78, and scanner processing module 82. The touch screen circuitry of this example can be incorporated, for example, in the devices of FIGS. 1 and 2, as well as the various devices (e.g., cards) described below.

In the illustrated embodiment, a plurality of touch sensitive column electrodes 85-*c* and a plurality of row electrodes 85-*r* are integrated into and extend across a sensing area 83. The plurality of DSCs are operable, when enabled, to drive sensor signals on the plurality of column electrodes 85-*c* and the plurality of row electrodes 85-*r*. To generate the sensor signals, the DSCs utilize analog reference signal(s) 122 produced by the reference signal circuitry 78, an example of which is described in greater detail with reference to FIG. 15. In this example, the plurality of DSCs and the reference signal circuitry 78 may be selectively enabled/disabled by control signals generated by the scanner processing module 82.

As detailed elsewhere herein, each of the sensor signals generated by the DSCs includes a drive signal component and a receive signal component, wherein a DSC of the plurality of DSCs generates the drive signal component and interprets the receive signal component to produce a representation of an impedance on an electrode coupled to the DSC. For example, the plurality of DSCs generate digital capacitance data (e.g., touch information 76) based on the sensor signals. The digital capacitance data generally includes self-capacitance information, mutual capacitance information, and/or change in capacitance information indicative of the location of touches/proximal touches on the sensing area 83. In addition to indicating touches, the digital capacitance data can be utilized to generate a fingerprint capacitive image 12 as described more fully below.

The digital filtering circuitry 74 operates to filter the digital capacitance data 72 and provide the filtered data to the scanner processing module 82. The scanner processing module 82 senses, based on the sensor signals (i.e., based on the filtered digital capacitance data 72 in this example), an electrical characteristic of at least one row electrode 85-r and at least one column electrode 85-c and determines, based on the electrical characteristic, a proximal touch to sensing area 83. The scanner processing module 82 further generates corresponding touch information 76 for use by other processing circuitry of the scanning device 80. In various examples described herein, the scanner processing module 82 can be further configured to utilize information derived from the sensor signals (e.g., changes to the impedance of one or more electrodes) to sense features of a fingerprint corresponding to a touch and include this information as part of touch information 76.

The sensing area 83 of the embodiments of FIGS. 2 and 3 is not necessarily located on the on a front or back surface of a device or display. In an example, the sensing area 83 is included in a flexible touch screen or touch display. In another example, such as described with reference to FIGS. 31 and 36, the sensing area 83 is located on an edge or side surface of a card or device.

As described more fully below (e.g., with reference to FIGS. 24-27), the row electrodes and column electrodes of the embodiment of FIG. 3 may be constructed in various manners. In an example, the electrodes are "in-cell" touch sensors formed of conductive pads of a display. In another example, the electrodes can be "on-cell" touch sensors and/or line electrodes. In general, the row electrodes and the column electrodes are separated by a dielectric layer and arranged in a crossing pattern.

In various of the Figures, the electrodes 85 are shown in a first arrangement (e.g., as rows) and a second arrangement (e.g., as columns). Other patterns for the electrodes may be used to detect touches to a sensing area 83 and to generate digital capacitance data 72. For example, the some of the electrodes span only part of the way across the sensing area 83 and other electrodes span the remaining part of the sensing area 83. As another example, the electrodes are patterned at an angle different than 90 degrees with respect to each other.

Figure 4:
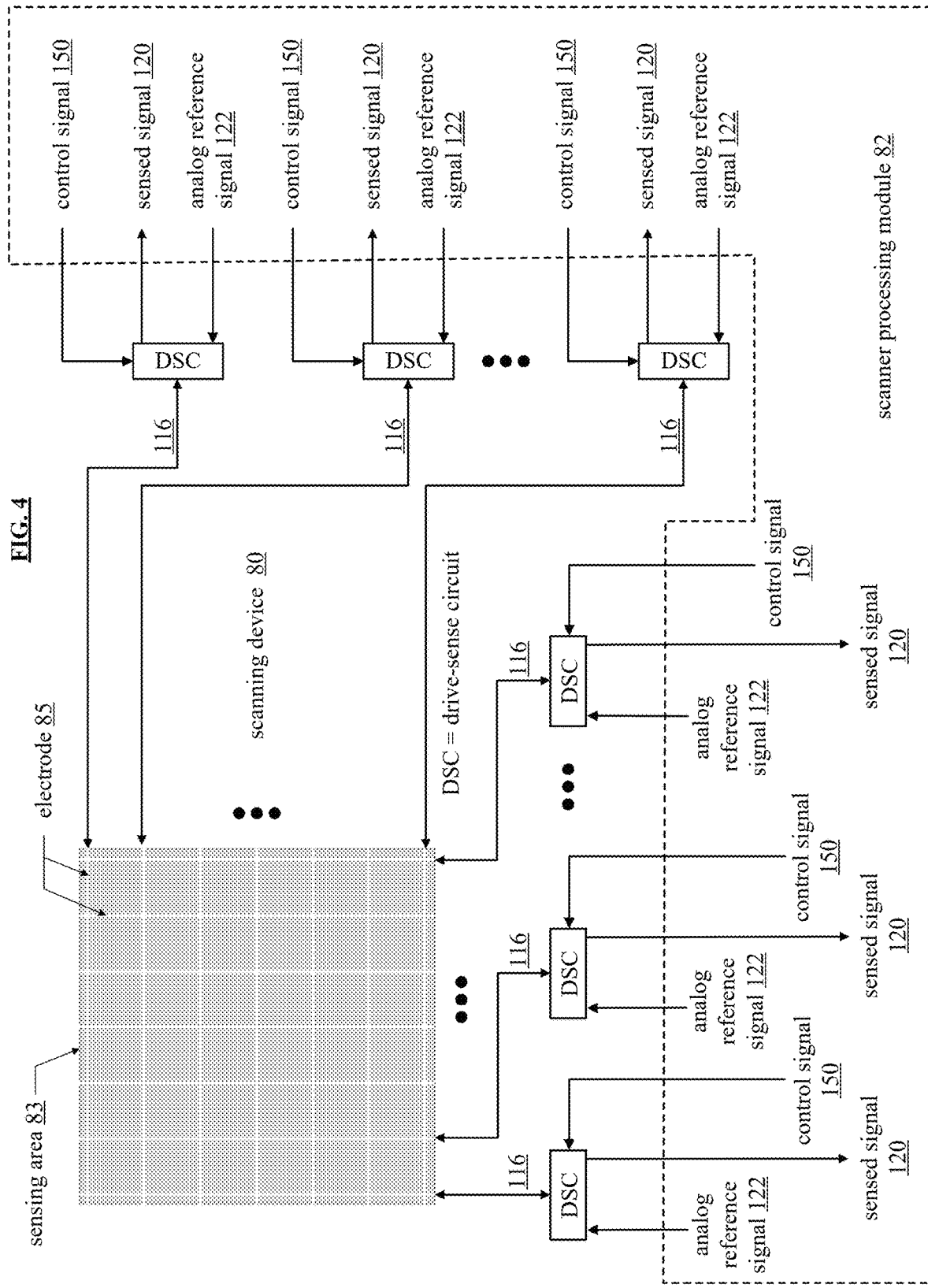
FIG. 4 is a schematic block diagram of another embodiment of touch screen circuitry in a fingerprint scanning device in accordance with the present disclosure.

FIG. 4 is a schematic block diagram of another embodiment of touch screen circuitry in a scanning device 80 that includes the sensing area 83, the electrodes 85, a plurality of drive-sense circuits (DSC), and the scanner processing module 82, which function as previously discussed. In addition, the scanner processing module 82 generates a plurality of control signals 150 to enable the drive-sense circuits (DSC) to monitor the sensor signals 116 on the electrodes 85. For example, the scanner processing module 82 provides an individual control signal 150 to each of the drive-sense circuits to individually enable or disable the drive-sense circuits. In an embodiment, the control signal 150 closes a switch to provide power to the drive-sense circuit. In another embodiment, the control signal 150 enables one or more components of the drive-sense circuit.

The scanner processing module 82 of the illustrated embodiment further provides analog reference signals 122 to the drive-sense circuits. In an embodiment, each drive-sense circuit receives a unique analog reference signal. In another embodiment, a first group of drive-sense circuits receive a first analog reference signal, and a second group of drive-sense circuits receive a second analog reference signal. In yet another embodiment, the drive-sense circuits receive the same analog reference signal. Note that the scanner processing module 82 may use a combination of analog reference signals with control signals to ensure that different frequencies are used for oscillating components of the analog reference signal.

The drive-sense circuits provide sensor signals 116 to the electrodes. The impedances of the electrodes affect the sensor signals, which the drive-sense circuits sense via the received signal components and generate the sensed signals 120 therefrom. The sensed signals 120 are essentially representations of the impedances of the electrodes, which are provided to the scanner processing module 82.

The scanner processing module 82 interprets the sensed signals 120 (e.g., the representations of impedances of the electrodes) to detect a change in the impedance of one or more electrodes. For example, a finger touch increases the self-capacitance of an electrode, thereby decreasing its impedance at a given frequency. As described more fully below, the increase in self-capacitance of an electrode 85 due to the finger touch will be greater for a fingerprint ridge as compared to a fingerprint valley. This difference can be measured by a processing module and used to discriminate between a fingerprint ridge and fingerprint valley for purposes of generating a fingerprint capacitive image 12.

As another example, a finger touch decreases the mutual capacitance of an electrode, thereby increasing its impedance at a given frequency. As described more fully below, the decrease in mutual capacitance due to the finger touch will be less for a fingerprint ridge as compared to a fingerprint valley. This difference can also be measured by a processing module and utilized to discriminate between a fingerprint ridge and fingerprint valley for purposes of generating a fingerprint capacitive image 12. In both of these examples, the scanner processing module 82 interprets the change(s) in the impedance(s) of one or more electrodes to indicate one or more touches of the sensing area 83 and/or to generate a capacitive image 12.

FIG. 5 is a logic diagram of an embodiment of a method for sensing a touch on a sensing area of a fingerprint scanning device that is executed by one or more processing modules (e.g., 42, 82). In this method, sensing a touch can include generating a digital representation/capacitive image of a fingerprint corresponding to the touch. The method begins at step 100 where the processing module generates a control signal (e.g., power enable, operation enable, etc.) to enable a drive-sense circuit to monitor the sensor signal on the electrode. The processing module generates additional control signals to enable other drive-sense circuits to monitor their respective sensor signals. In an example, the processing module enables all of the drive-sense circuits for continuous sensing for touches of the screen. In another example, the processing module enables a first group of drive-sense circuits coupled to a first group of row electrodes and enables a second group of drive-sense circuits coupled to a second group of column electrodes (e.g., electrodes corresponding to a fingerprint sensing area in a portion of a touch screen display).

The method continues at step 102 where the processing module receives a representation of the impedance on the electrode from a drive-sense circuit. In general, the drive-sense circuit provides a drive signal to the electrode. The impedance of the electrode affects the drive signal. The effect on the drive signal is interpreted by the drive-sense circuit to produce the representation of the impedance of the electrode. The processing module does this with each activated drive-sense circuit in serial, in parallel, or in a serial-parallel manner.

The method continues at step 104 where the processing module interprets the representation of the impedance on the electrode to detect a change in the impedance of the electrode. A change in the impedance is indicative of a touch. For example, an increase in self-capacitance (e.g., the capacitance of the electrode with respect to a reference (e.g., ground, etc.)) is indicative of a touch on the electrode. As another example, a decrease in mutual capacitance (e.g., the capacitance between a row electrode and a column electrode) is also indicative of a touch near the electrodes. The processing module does this for each representation of the impedance of the electrode it receives. Note that the representation of the impedance is a digital value, an analog signal, an impedance value, and/or any other analog or digital way of representing a sensor's impedance.

The method continues at step 106 where the processing module interprets the change in the impedance to indicate a touch of the touch screen display in an area corresponding to the electrode. In an example, for each change in impedance detected the processing module indicates a touch. Further processing may be done to determine if the touch is a desired touch or an undesired touch. In another example in which the processing module is configured for fingerprint scanning (e.g., generating a digital representation/capacitive image of a fingerprint corresponding to a touch), for each detected change in impedance the processing module determines whether the change corresponds to a fingerprint ridge or fingerprint valley. In this example, the processing module may detect fingerprint ridges and valleys in various manners. For instance, the processing module may compare a sensed value or change in value in impedance (self-impedance and/or mutual impedance) to one or more threshold levels, analyze differences in changes in impedance between neighboring or nearby electrodes, quantize the change in impedance to determine transitions between a ridge and valley, etc.

The method continues at step 109 where the processing module stores the interpretation of the change impedance in device memory. In an example, the processing module also stores location information relating to the interpretation. Such information can be used to identify the location of a touch or for use in generating a capacitive image of a fingerprint. Examples of generating capacitive images are discussed in greater detail with reference to one or more of FIGS. 1, 2, 32 and 33.

FIG. 6 is a schematic block diagram of an embodiment of a drive-sense circuit 28 that includes a first conversion circuit 110 and a second conversion circuit 112. The first conversion circuit 110 converts a sensor signal 116 into a sensed signal 120. The second conversion circuit 112 generates the drive signal component 114 from the sensed signal 120. As an example, the first conversion circuit 110 functions to keep the sensor signal 116 substantially constant (e.g., substantially matching a reference signal) by creating the sensed signal 120 to correspond to changes in a receive signal component 118 of the sensor signal. The second conversion circuit 112 functions to generate a drive signal component 114 of the sensor signal based on the sensed signal 120 to substantially compensate for changes in the receive signal component 118 such that the sensor signal 116 remains substantially constant.

In an example, the drive signal component 114 is provided to the electrode 85 as a regulated current signal. The regulated current (I) signal in combination with the impedance (Z) of the electrode creates an electrode voltage (V), where V=I*Z. As the impedance (Z) of electrode changes, the regulated current (I) signal is adjusted to keep the electrode voltage (V) substantially unchanged. To regulate the current signal, the first conversion circuit 110 adjusts the sensed signal 120 based on the receive signal component 118, which is indicative of the impedance of the electrode and change thereof. The second conversion circuit 112 adjusts the regulated current based on the changes to the sensed signal 120.

As another example, the drive signal component 114 is provided to the electrode 85 as a regulated voltage signal. The regulated voltage (V) signal in combination with the impedance (Z) of the electrode creates an electrode current (I), where I=V/Z. As the impedance (Z) of electrode changes, the regulated voltage (V) signal is adjusted to keep the electrode current (I) substantially unchanged. To regulate the voltage signal, the first conversion circuit 110 adjusts the sensed signal 120 based on the receive signal component 118, which is indicative of the impedance of the electrode and change thereof. The second conversion circuit 112 adjusts the regulated voltage based on the changes to the sensed signal 120.

FIG. 7 is a schematic block diagram of another embodiment of a drive-sense circuit 28 that includes a first conversion circuit 110 and a second conversion circuit 112. The first conversion circuit 110 includes a comparator (comp) and an analog to digital converter 130. The second conversion circuit 112 includes a digital to analog converter 132, a signal source circuit 133, and a driver.

In an example of operation, the comparator compares the sensor signal 116 to an analog reference signal 122 to produce an analog comparison signal 124. The analog reference signal 122 includes a DC component and an oscillating component. As such, the sensor signal 116 will have a substantially matching DC component and oscillating component. An example of an analog reference signal 122 will be described in greater detail with reference to FIG. 15.

The analog to digital converter 35 converts the analog comparison signal 124 into the sensed signal 120. The analog to digital converter (ADC) 35 may be implemented in a variety of ways. For example, the ADC 35 is one of: a flash ADC, a successive approximation ADC, a ramp-compare ADC, a Wilkinson ADC, an integrating ADC, a delta encoded ADC, and/or a sigma-delta ADC. The digital to analog converter (DAC) 132 may be a sigma-delta DAC, a pulse width modulator DAC, a binary weighted DAC, a successive approximation DAC, and/or a thermometer-coded DAC.

The digital to analog converter (DAC) 132 converts the sensed signal 120 into an analog feedback signal 126. The signal source circuit 133 (e.g., a dependent current source, a linear regulator, a DC-DC power supply, etc.) generates a regulated source signal 135 (e.g., a regulated current signal or a regulated voltage signal) based on the analog feedback signal 126. The driver increases power of the regulated source signal 135 to produce the drive signal component 114.

FIG. 8 is a schematic block diagram of another embodiment of a drive-sense circuit 28 that includes a comparator 84, a feedback circuit 86, a signal source circuit 88, an analog to digital converter 130, and a digital to analog converter 132. The comparator 84 (which may be implemented, for example, by an operational amplifier) and the analog to digital converter (ADC) 130 convert a sensor signal 116 into digital capacitance data 72 (e.g., sensed signal 120 in this example). The digital to analog converter (DAC) 132 converts the digital capacitance data 72 into an analog signal that is used by the feedback circuit 86 and signal source circuit 88 to generate the drive signal component 114. In another example, the feedback circuit 86 and the signal source circuit 88 generate a drive signal component 114 from the analog comparison signal 124 at the output of comparator 84.

As an example, the comparator 84 and ADC 130 function to keep the sensor signal 116 substantially constant (e.g., substantially matching an analog reference signal 122) by generating the digital capacitance data 72 to correspond to changes in a receive signal component 118 of the sensor signal. The feedback circuit 86 and signal source circuit 88 function to generate a drive signal component 114 of the sensor signal based on the digital capacitance data 72 to substantially compensate for changes in the receive signal component 118 such that the sensor signal 116 remains substantially constant.

In an example, the drive signal component 114 is provided to the electrode 85 as a regulated current signal. The regulated current (I) signal in combination with the impedance (Z) of the electrode creates an electrode voltage (V), where V=I*Z. As the impedance (Z) of electrode changes, the regulated current (I) signal is adjusted to keep the electrode voltage (V) substantially unchanged. To regulate the current signal, the comparator 84 and ADC 130 adjust the digital capacitance data 72 based on the receive signal component 118, which is indicative of the impedance of the electrode and change thereof. The feedback circuit 86 and signal source circuit 88 adjust the regulated current based on the changes to the digital capacitance data 72.

In a further example of operation, the comparator 84 compares the sensor signal 116 to an analog reference signal 122 to produce an analog comparison signal 124. The analog reference signal 122 includes a DC component and an oscillating component. As such, the sensor signal 116 will have a substantially matching DC component and oscillating component. An example of an analog reference signal 122 is described in greater detail with reference to FIG. 15.

The ADC 130 converts the analog comparison signal 124 into the digital capacitance data 72. The ADC 130 may be implemented in a variety of ways. For example, the ADC 130 is one of: a flash ADC, a successive approximation ADC, a ramp-compare ADC, a Wilkinson ADC, an integrating ADC, a delta encoded ADC, and/or a sigma-delta ADC. The DAC 132 may be a sigma-delta DAC, a pulse width modulator DAC, a binary weighted DAC, a successive approximation DAC, and/or a thermometer-coded DAC.

The DAC 132 and feedback circuit 86 convert the digital capacitance data 72 into an analog feedback signal. The signal source circuit 88 (e.g., a dependent current source, a linear regulator, a DC-DC power supply, etc.) generates a regulated source signal (e.g., a regulated current signal or a regulated voltage signal) based on the analog feedback signal from the feedback circuit 86. Although not separately illustrated, a driver may be provided at the output of the signal source circuit 88 to increase the power of the output of the signal source circuit 88 to produce the drive signal component 114.

Figure 9:
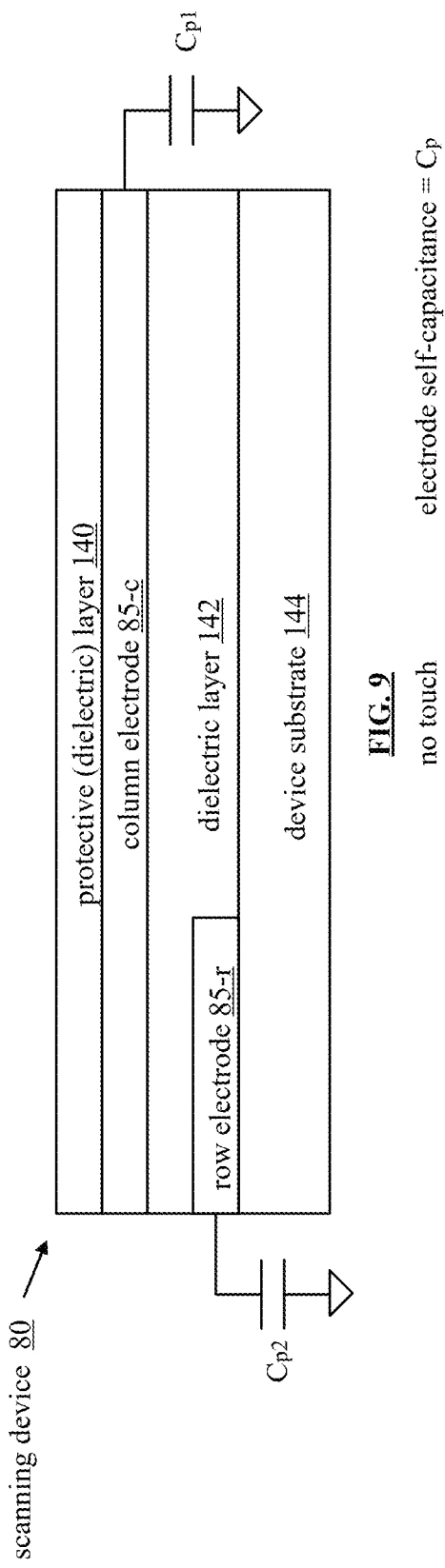
FIG. 9 is a cross section schematic block diagram of an example of electrode self-capacitance with no touch on a sensing area of a fingerprint scanning device in accordance with the present disclosure.

FIG. 9 is a cross section schematic block diagram of an example of electrode self-capacitance in a sensing area 23 of a scanning device 80 without a touch of a finger. The cross section is taken parallel to a column electrode 85-*c* and a perpendicular to a row electrode 85-*r*. The column electrode 85-*c* is positioned between a protective (dielectric) layer 140 and a dielectric layer 142. Alternatively, the column electrode 85-*c* is in the dielectric layer 142. The row electrode 85-*r* is positioned in the dielectric layer 142. Alternatively, the row electrode 85-*r* is positioned between the dielectric layer 142 and the device substrate 144. As another alternative, the row and column electrodes are in the same layer. In one or more embodiments, the row and column electrodes are formed as discussed in one or more of FIGS. 24-27.

Each electrode 85 has a self-capacitance, which corresponds to a parasitic capacitance created by the electrode with respect to other conductors in the device (e.g., ground, conductive layer(s), and/or one or more other electrodes). For example, row electrode 85-*r* has a parasitic capacitance $C_{p2}$ and column electrode 85-*c* has a parasitic capacitance $C_{p1}$. Note that each electrode includes a resistance component and, as such, produces a distributed R-C circuit. The longer the electrode, the greater the impedance of the distributed R-C circuit. For simplicity of illustration the distributed R-C circuit of an electrode will be represented as a single parasitic capacitance.

As shown, the scanning device 80 includes a plurality of layers 140-144. Each illustrated layer may itself include one or more layers. For example, protective (dielectric) layer 140 includes a surface protective encapsulating film, a glass protective film, one or more reflector layers, one or more polarizing layers, and/or one or more pressure sensitive adhesive (PSA) layers. As another example, the dielectric layer 142 includes a flexible glass cover, a polyester (PET) film, a support plate (glass or plastic) to support, or embed, one or more of the electrodes 85-*c* and 85-*r*, a base plate (glass, plastic, or PET), and one or more PSA layers. As yet another example, the device substrate 144 includes one or more OLED layers, a flexible glass substrate, and/or one or more PSA layers.

Figure 10:
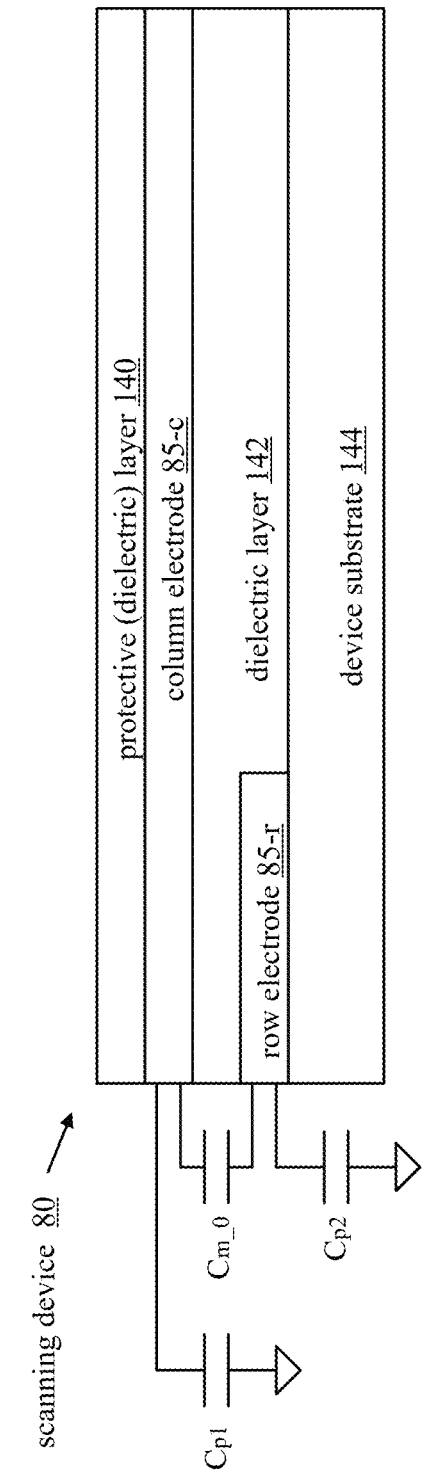
FIG. 10 is a cross section schematic block diagram of an example of electrode self-capacitance and mutual capacitance with no touch on a sensing area of a fingerprint scanning device in accordance with the present disclosure.

FIG. 10 is a cross section schematic block diagram of an example of electrode self-capacitance and mutual capacitance with no touch on a sensing area 23 of a scanning device 80, which is the same as in FIG. 9. This figure further includes a mutual capacitance ($C_{m\_0}$) between the electrodes when a touch is not present.

Figure 11:
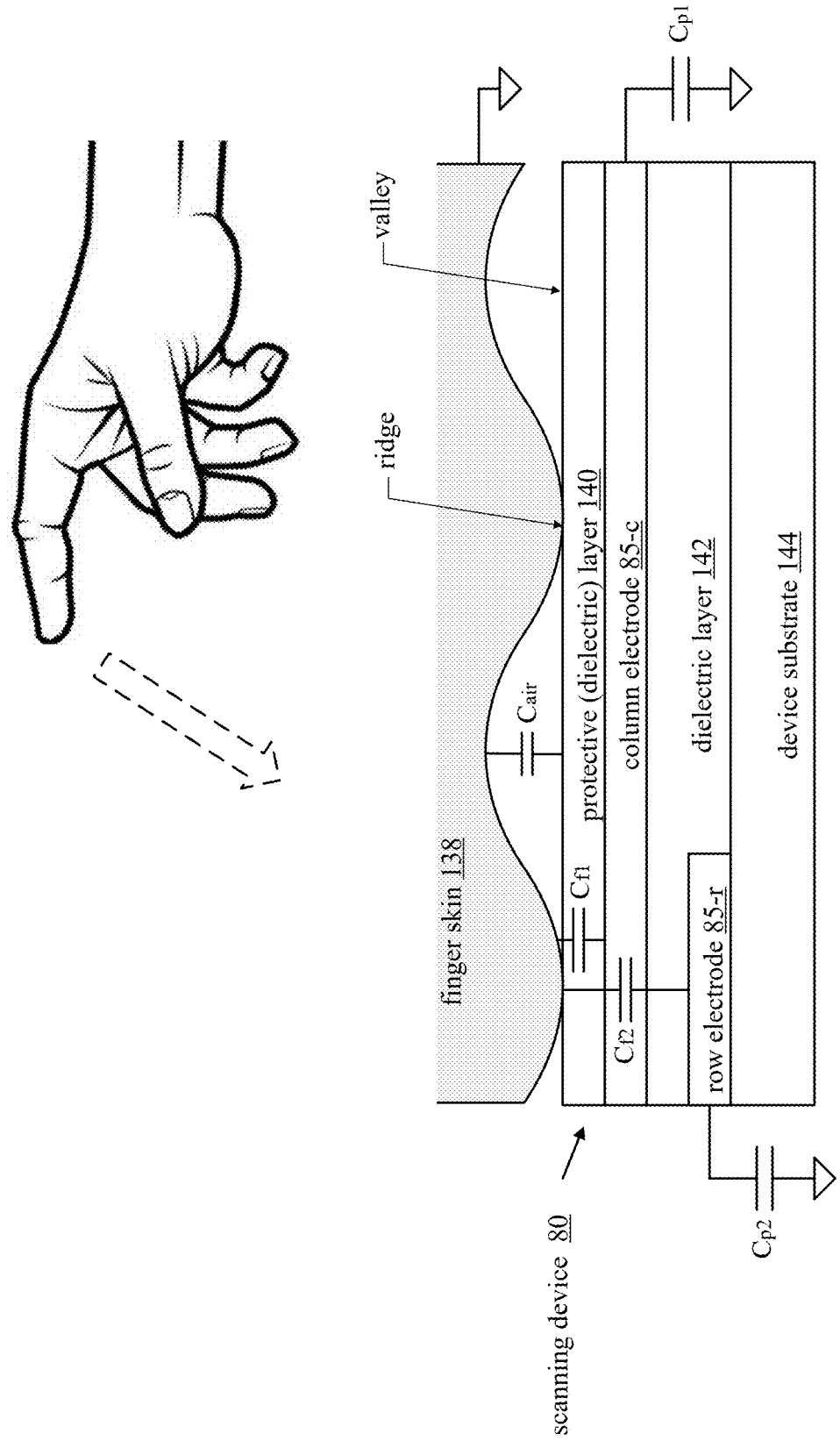
FIG. 11 is a cross section schematic block diagram of an example of electrode self-capacitance with a touch on a sensing area of a fingerprint scanning device in accordance with the present disclosure.

FIG. 11 is a cross section schematic block diagram of an example of electrode self-capacitance with a touch on a sensing area 23 of a scanning device 80, which is the same as in FIG. 9. This figure further includes a finger touch, which changes the self-capacitance of the electrodes. In essence, a finger touch creates a parallel capacitance with the parasitic self-capacitances. For example, the self-capacitance of the column electrode 85-*c* is $C_{p1}$ (parasitic capacitance)+$C_{f1}$ (finger capacitance) and the self-capacitance of the row electrode 85-*r* is $C_{p2}$+$C_{f2}$. As such, the finger capacitance increases the self-capacitance of the electrodes, which decreases the impedance for a given frequency. The change in impedance of the self-capacitance is detectable by a corresponding drive-sense circuit and is subsequently processed to indicate a screen touch and generate a portion of a fingerprint capacitive image.

In an example of operation in which a fingerprint scan is in progress, a change in impedance of the self-capacitance of column electrode 85-*c* and/or row electrode 85-*r* due to finger skin 138 is detected and processed (e.g., by scanner processing module 82) to identify a portion of a fingerprint ridge or fingerprint valley. In this example, the increase in self-capacitance of an electrode 85 due to the finger touch will be greater for a fingerprint ridge as compared to a fingerprint valley. This is due to the air capacitance $C_{air}$ that is present for a fingerprint valley, which effectively decreases the finger capacitance $C_f$ as compared to the finger capacitance $C_f$ of a fingerprint ridge. This difference can be measured by a processing module and used to discriminate between a fingerprint ridge and fingerprint valley for purposes of generating a fingerprint capacitive image 12.

Figure 12:
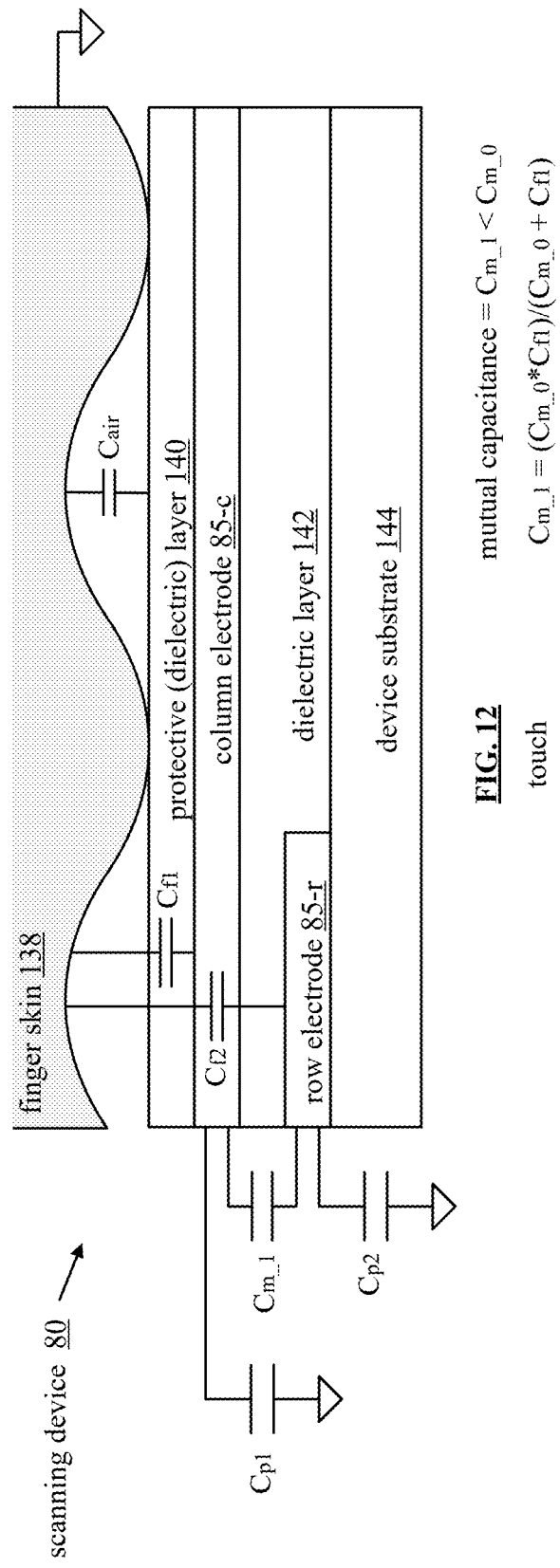
FIG. 12 is a cross section schematic block diagram of an example of electrode self-capacitance and mutual capacitance with a touch on a sensing area of a fingerprint scanning device in accordance with the present disclosure.

FIG. 12 is a cross section schematic block diagram of an example of electrode self-capacitance and mutual capacitance with a touch on a sensing area 23 of a scanning device 80, which is the same as in FIG. 11. This figure further includes a mutual capacitance ($C_{m\_1}$) between the electrodes when a touch is present. In this example, the finger capacitance is effectively in series with the mutual capacitance, which decreases the capacitance of the mutual capacitance. As the capacitance decreases for a given frequency, the impedance increases. The change in impedance of the mutual capacitance is detectable by a corresponding drive-sense circuit and is subsequently processed to indicate a screen touch.

In an example of operation in which a fingerprint scan is in progress, a change in impedance of the mutual capacitance between the electrodes due to finger skin 138 is detected and processed to identify a portion of a fingerprint ridge or fingerprint valley. In this example, the decrease in mutual capacitance due to the finger touch will be less for a fingerprint ridge as compared to a fingerprint valley. This is again due to the air capacitance $C_{air}$ that is present for a fingerprint valley, which effectively decreases the finger capacitance $C_f$ as compared to the finger capacitance $C_f$ of a fingerprint ridge. This difference can be measured by a processing module and utilized to discriminate between a fingerprint ridge and fingerprint valley for purposes of generating a fingerprint capacitive image 12 and/or touch information sufficient for fingerprint minutia/feature extraction. In a further example, changes to both electrode self-capacitance and mutual capacitance during a fingerprint scanning process are utilized to discriminate between a fingerprint ridge and fingerprint valley.

Note that, depending on the various properties (e.g., thicknesses, dielectric constants, electrode sizes, electrode spacing, etc.) of the sensing area, the parasitic capacitances, the mutual capacitances, and/or the finger capacitance are in the range of a few pico-Farads to tens of nano-Farads. In equation form, the capacitance (C) equals:

$$C = \epsilon \frac{A}{d}$$

where A is plate area, E is the dielectric constant(s),
and d is the distance between the plates.

FIG. 13 is an example graph that plots condition verses capacitance for an electrode of a scanning device 80. As shown, the mutual capacitance decreases with a touch and the self-capacitance increases with a touch. Note that the mutual capacitance and self-capacitance for a no-touch condition are shown to be about the same. This is done merely for ease of illustration. In practice, the mutual capacitance and self-capacitance may or may not be about the same capacitance based on the various properties of the sensing area discussed above.

As discussed with reference to FIG. 11, the increase in self-capacitance of an electrode 85 due to a finger touch will be greater when scanning a fingerprint ridge as compared to a fingerprint valley. As discussed with reference to FIG. 12, the decrease in mutual capacitance between electrodes due to a finger touch will be less when scanning a fingerprint ridge as compared to a fingerprint valley.

FIG. 14 is an example graph that plots impedance verses frequency for an electrode of a fingerprint scanning device. Since the impedance of an electrode is primarily based on its capacitance (self and/or mutual), as the frequency increases for a fixed capacitance, the impedance decreases based on $\frac{1}{2\pi f C}$, where f is the frequency and C is the capacitance.

FIG. 15 is a time domain example graph that plots magnitude verses time for an analog reference signal 122. As discussed with reference to FIG. 8, the analog reference signal 122 (e.g., a current signal or a voltage signal) is an input to a comparator and is compared to the sensor signal 116. The feedback loop of the drive-sense circuit 28 functions to keep the sensor signal 116 substantially matching the analog reference signal 122. As such, the sensor signal 116 will have a similar waveform to that of the analog reference signal 122.

In an example, the analog reference signal 122 includes a DC component 121 and/or one or more oscillating components 123. The DC component 121 is a DC voltage in the range of a few hundred milli-volts to tens of volts or more. The oscillating component 123 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component).

In another example, the frequency of the oscillating component 123 may vary so that it can be tuned to the impedance of the sensor and/or to be off set in frequency from other sensor signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

FIG. 16 is a frequency domain example graph that plots magnitude verses frequency for an analog reference signal 122. As shown, the analog reference signal 122 includes the DC component 121 at DC (e.g., 0 Hz or near 0 Hz), a first oscillating component 123-1 at a first frequency ($f_1$), and a second oscillating component 123-2 at a second frequency ($f_2$). In an example, the DC component is used to measure resistance of an electrode (if desired), the first oscillating component 123-1 is used to measure the impedance of self-capacitance, and the second oscillating component 123-2 is used to measure the impedance of mutual capacitance. Note that the second frequency may be greater than the first frequency.

FIG. 17 is a schematic block diagram of an example of a first drive-sense circuit 28-1 coupled to a first electrode 85-c and a second drive-sense circuit 28-2 coupled to a second electrode 85-r without a touch proximal to the electrodes. Each of the drive-sense circuits include a comparator (comp), an analog to digital converter (ADC) 130, a digital to analog converter (DAC) 132, a signal source circuit 133, and a driver. The functionality of this embodiment of a drive-sense circuit was described with reference to FIG. 7. For additional embodiments of a drive-sense circuit see U.S. Pat. No. 11,099,032, entitled, "Drive Sense Circuit with Drive-Sense Line".

As an example, a first reference signal 122-1 (e.g., analog, or digital) is provided to the first drive-sense circuit 28-1 and a second reference signal 122-2 (e.g., analog or digital) is provided to the second drive-sense circuit 28-2. The first reference signal includes a DC component and/or an oscillating at frequency $f_1$. The second reference signal includes a DC component and/or two oscillating components: the first at frequency $f_1$ and the second at frequency $f_2$.

The first drive-sense circuit 28-1 generates a sensor signal 116 based on the first reference signal 122-1 and provides the sensor signal to the column electrode 85-c. The second drive-sense circuit generates another sensor signal 116 based on the reference signal 122-2 and provides the sensor signal to the column electrode.

In response to the sensor signals being applied to the electrodes, the first drive-sense circuit 28-1 generates a first sensed signal 120-1, which includes a component at frequency $f_1$ and a component a frequency $f_2$. The component at frequency $f_1$ corresponds to the self-capacitance of the column electrode 85-c and the component a frequency $f_2$ corresponds to the mutual capacitance between the row and column electrodes 85-c and 85-r. The self-capacitance is expressed as $1/(2\pi f_1 C_{p1})$ and the mutual capacitance is expressed as $1/(2\pi f_2 C_{m\_0})$.

Also, in response to the sensor signals being applied to the electrodes, the second drive-sense circuit 28-2 generates a second sensed signal 120-2, which includes a component at frequency $f_1$ and a component a frequency $f_2$. The component at frequency $f_1$ corresponds to a shielded self-capacitance of the row electrode 85-r and the component a frequency $f_2$ corresponds to an unshielded self-capacitance of the row electrode 85-r. The shielded self-capacitance of the row electrode is expressed as $1/(2\pi f_1 C_{p2})$ and the unshielded self-capacitance of the row electrode is expressed as $1/(2\pi f_2 C_{p2})$.

With each active drive-sense circuit using the same frequency for self-capacitance (e.g., $f_1$), the row and column electrodes are at the same potential, which substantially eliminates cross-coupling between the electrodes. This provides a shielded (i.e., low noise) self-capacitance measurement for the active drive-sense circuits. In this example, with the second drive-sense circuit transmitting the second frequency component, it has a second frequency component in its sensed signal but is primarily based on the row electrode's self-capacitance with some cross coupling from other electrodes carrying signals at different frequencies. The cross coupling of signals at other frequencies injects unwanted noise into this self-capacitance measurement and hence it is referred to as unshielded. Note that the drive-sense circuits 28 can be configured to use a relatively low sampling rate (e.g., approximately 10-50 Hz) to process sensed signals in order to improve the signal-to-noise ratio of the scanning device 80.

Figure 18:
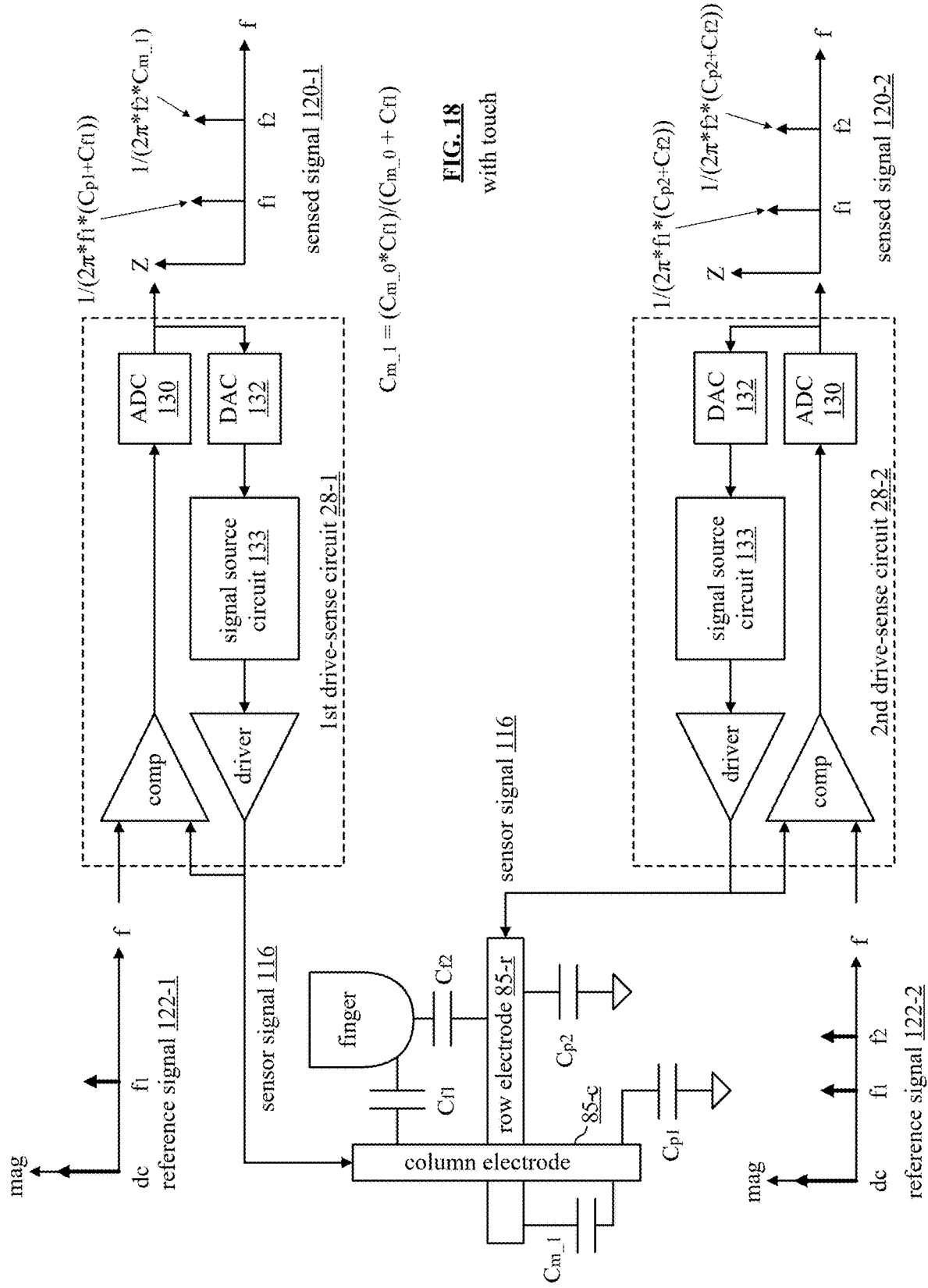
FIG. 18 is a schematic block diagram of an example of a first drive-sense circuit coupled to a first electrode and a second drive-sense circuit coupled to a second electrode with a finger touch proximal to the electrodes in accordance with the present disclosure.

FIG. 18 is a schematic block diagram of an example of a first drive-sense circuit 28-1 coupled to a first electrode 85-c and a second drive-sense circuit 28-2 coupled to a second electrode 85-r with a finger touch proximal to the electrodes. This example is similar to the one of FIG. 17 with the difference being a finger touch proximal to the electrodes (e.g., a touch that shadows the intersection of the electrodes or is physically close to the intersection of the electrodes). With the finger touch, the self-capacitance and the mutual capacitance of the electrodes are changed.

In this example, the impedance of the self-capacitance at $f_1$ of the column electrode 85-c now includes the effect of the finger capacitance. As such, the impedance of the self-capacitance of the column electrode equals $1/(2\pi f_1 *(C_{p1}+C_{f1}))$, which is included in the sensed signal 120-1. The second frequency component at $f_2$ corresponds to the impedance of the mutual capacitance at $f_2$, which includes the effect of the finger capacitance. As such, the impedance of the mutual capacitance equals $1/(2\pi f_2 C_{m\_1})$, where $C_{m\_1}=(C_{m\_0}*C_{f1})/(C_{m\_0}+C_{f1})$.

Continuing with this example, the first frequency component at $f_1$ of the second sensed signal 120-2 corresponds to the impedance of the shielded self-capacitance of the row electrode 85-r at $f_1$, which is affected by the finger capacitance. As such, the impedance of the capacitance of the row electrode 85-r equals $1/(2\pi_{f1}*(C_{p2}+C_{f2}))$. The second frequency component at $f_2$ of the second sensed signal 120-2 corresponds to the impedance of the unshielded self-capacitance at $f_2$, which includes the effect of the finger capacitance and is equal to $1/(2\pi f_2 *(C_{p2}+C_{f2}))$.

Figure 19:
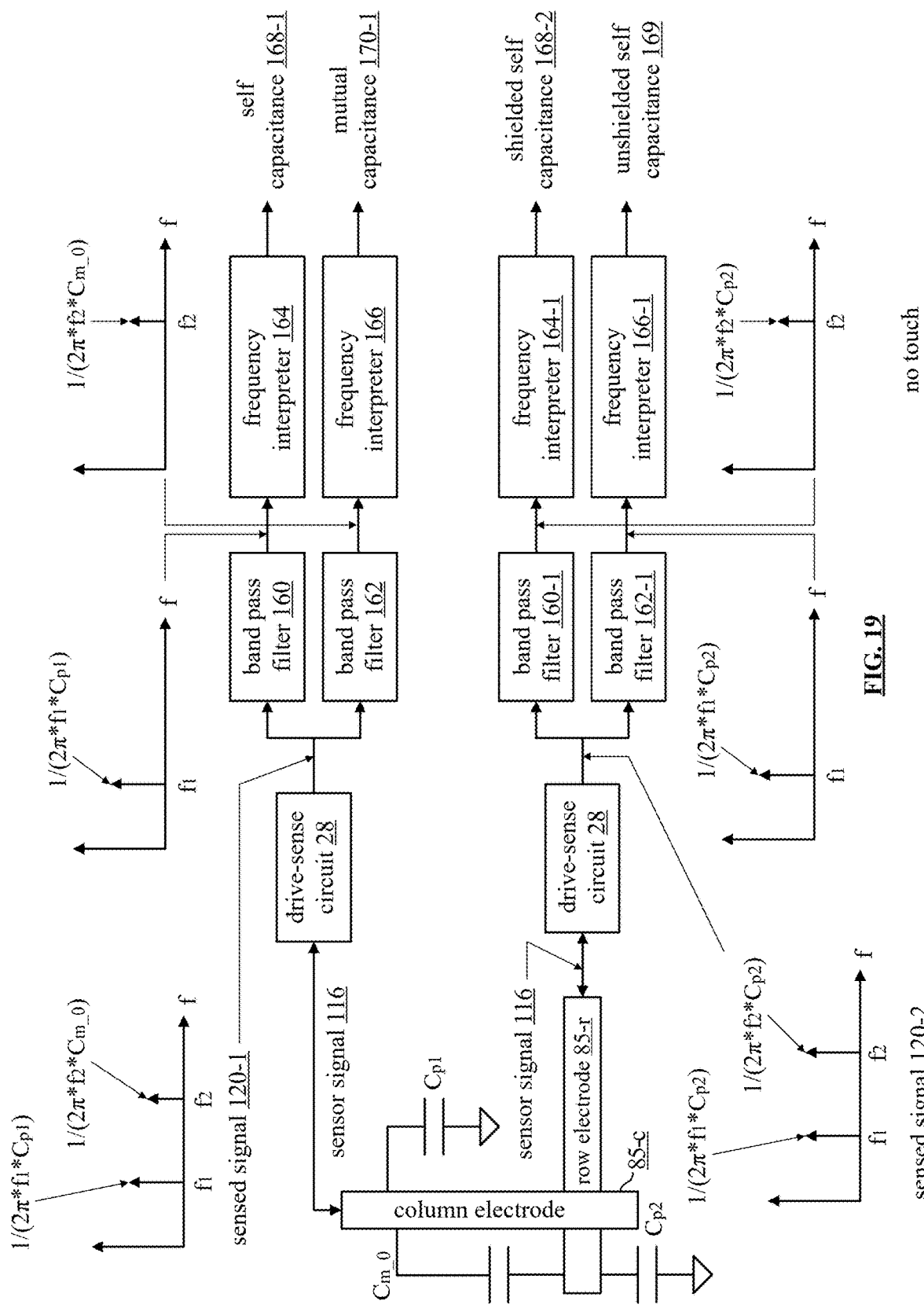
FIG. 19 is a schematic block diagram of a touchless example of a few drive-sense circuits and a portion of the scanner processing module of a fingerprint scanning device in accordance with the present disclosure.

FIG. 19 is a schematic block diagram of a touchless example of a few drive-sense circuits 28 and a portion of the scanner processing module 82 of a scanning device 80. The portion of the scanner processing module 82 includes band pass filters 160, 162, 160-1, and 162-1, frequency interpreters 164 and 164-1, and 166 and 166-1. As previously discussed, a first drive-sense circuit 28 is coupled to column electrode 85c and a second drive-sense circuit 28 is coupled to a row electrode 85r.

The drive-sense circuits provide sensor signals 116 to their respective electrodes 85 and produce therefrom respective sensed signals 120. The first sensed signal 120-1 includes a first frequency component at $f_1$ that corresponds to the self-capacitance of the column electrode 85c and a second frequency component at $f_2$ that corresponds to the mutual capacitance of the column electrode 85c. The second sensed signal 120-2 includes a first frequency component at $f_1$ that corresponds to the shielded self-capacitance of the row electrode 85r and/or a second frequency component at $f_2$ that corresponds to the unshielded self-capacitance of the row electrode 85r. In an embodiment, the sensed signals 120 are frequency domain digital signals.

The first bandpass filter 160 passes (i.e., substantially unattenuated) signals in a bandpass region (e.g., tens of Hertz to hundreds of thousands of Hertz, or more) centered about frequency $f_1$ and attenuates signals outside of the bandpass region. As such, the first bandpass filter 160 passes the portion of the sensed signal 120-1 that corresponds to the self-capacitance of the column electrode 85c. In an embodiment, the sensed signal 120-1 is a digital signal, thus, the first bandpass filter 160 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 164 receives the first bandpass filter sensed signal and interprets it to render a self-capacitance value 168-1 for the column electrode. As an example, the frequency interpreter 164 is a processing module, or portion thereof, that executes a function to convert the first bandpass filter sensed signal into the self-capacitance value 168-1, which is an actual capacitance value, a relative capacitance value (e.g., in a range of 0-100), or a difference capacitance value (e.g., is the difference between a default capacitance value and a sensed capacitance value). As another example, the frequency interpreter 164 is a look up table where the first bandpass filter sensed signal is an index for the table.

The second bandpass filter 162 passes, substantially unattenuated, signals in a second bandpass region (e.g., tens of Hertz to hundreds of thousands of Hertz, or more) centered about frequency $f_2$ and attenuates signals outside of the bandpass region. As such, the second bandpass filter 160 passes the portion of the sensed signal 120-1 that corresponds to the mutual capacitance of the column electrode

85c and the row electrode 85r. In an embodiment, the sensed signal 120-1 is a digital signal, thus, the second bandpass filter 162 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 166 receives the second bandpass filter sensed signal and interprets it to render a mutual capacitance value 170-1. As an example, the frequency interpreter 166 is a processing module, or portion thereof, that executes a function to convert the second bandpass filter sensed signal into the mutual capacitance value 170-1, which is an actual capacitance value, a relative capacitance value (e.g., in a range of 0-100), and/or a difference capacitance value (e.g., is the difference between a default capacitance value and a sensed capacitance value). As another example, the frequency interpreter 166 is a look up table where the first bandpass filter sensed signal is an index for the table.

For the row electrode 85r, the drive-sense circuit 28 produces a second sensed signal 120-2, which includes a shielded self-capacitance component and/or an unshielded self-capacitance component. The third bandpass filter 160-1 is similar to the first bandpass filter 160 and, as such, passes signals in a bandpass region centered about frequency $f_1$ and attenuates signals outside of the bandpass region. In this example, the third bandpass filter 160-1 passes the portion of the second sensed signal 120-2 that corresponds to the shielded self-capacitance of the row electrode 85r.

The frequency interpreter 164-1 receives the second bandpass filter sensed signal and interprets it to render a second and shielded self-capacitance value 168-2 for the row electrode. The frequency interpreter 164-1 may be implemented similarly to the first frequency interpreter 164 or an integrated portion thereof. In an embodiment, the second self-capacitance value 168-2 is an actual capacitance value, a relative capacitance value (e.g., in a range of 0-100), or a difference capacitance value (e.g., is the difference between a default capacitance value and a sensed capacitance value).

The fourth bandpass filter 162-2, if included, is similar to the second bandpass filter 162. As such, it passes, substantially unattenuated, signals in a bandpass region centered about frequency $f_2$ and attenuates signals outside of the bandpass region. In this example, the fourth bandpass filter 162-2 passes the portion of the second sensed signal 120-2 that corresponds to the unshielded self-capacitance of the row electrode 85r.

The frequency interpreter 166-1, if included, receives the fourth bandpass filter sensed signal and interprets it to render an unshielded self-capacitance value 168-2. The frequency interpreter 166-1 may be implemented similarly to the first frequency interpreter 166 or an integrated portion thereof. In an embodiment, the unshielded self-capacitance value 169 is an actual capacitance value, a relative capacitance value (e.g., in a range of 0-100), or a difference capacitance value (e.g., is the difference between a default capacitance value and a sensed capacitance value). Note that the unshielded self-capacitance may be ignored, thus band pass filter 162-1 and frequency interpreter 166-1 may be omitted. In addition, the bandwidths of the bandpass filters 160, 162, 160-1, and 162-1 can be set to only pass narrow bands of frequencies in order to improve the resolution of the scanning device 80 during fingerprint scanning operations.

Figure 20:
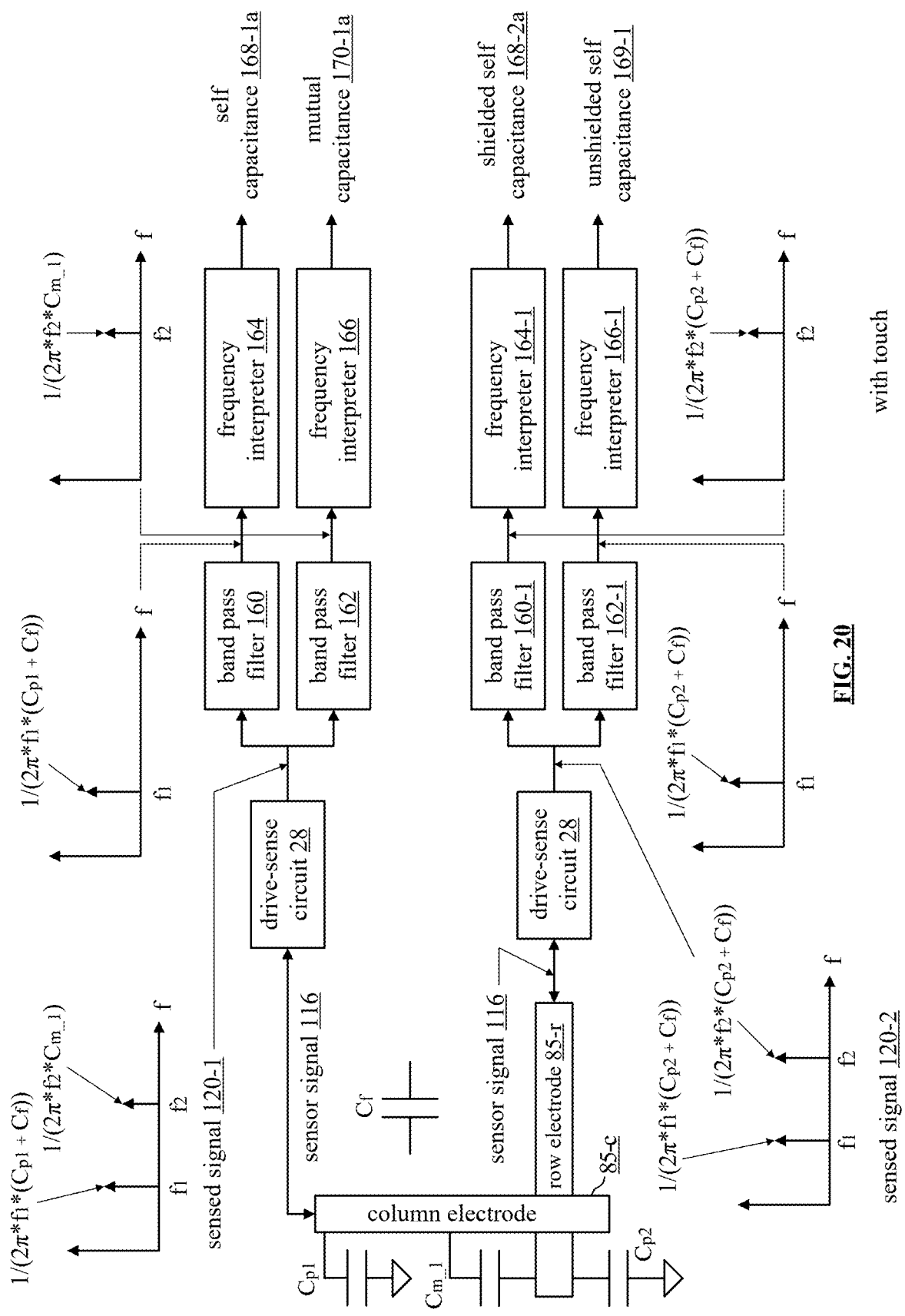
FIG. 20 is a schematic block diagram of a finger touch example of a few drive-sense circuits and a portion of the touch screen processing module of a fingerprint scanning device in accordance with the present disclosure.

FIG. 20 is a schematic block diagram of a finger touch example of a few drive-sense circuits and a portion of the scanner processing module 82 of a scanning device 80 that is similar to FIG. 19, with the difference being a finger touch as represented by the finger capacitance $C_f$. In this example, the self-capacitance and mutual capacitance of each electrode is affected by the finger capacitance.

The affected self-capacitance of the column electrode 85c is processed by the first bandpass filter 160 and the frequency interpreter 164 to produce a self-capacitance value 168-1a. The mutual capacitance of the column electrode 85c and row electrode is processed by the second bandpass filter 162 and the frequency interpreter 166 to produce a mutual capacitance value 170-1a.

The affected shielded self-capacitance of the row electrode 85r is processed by the third bandpass filter 160-1 and the frequency interpreter 164-1 to produce a self-capacitance value 168-2a. The affected unshielded self-capacitance of the row electrode 85r is processed by the fourth bandpass filter 162-1 and the frequency interpreter 166-1 to produce an unshielded self-capacitance value 169-1.

Figure 21:
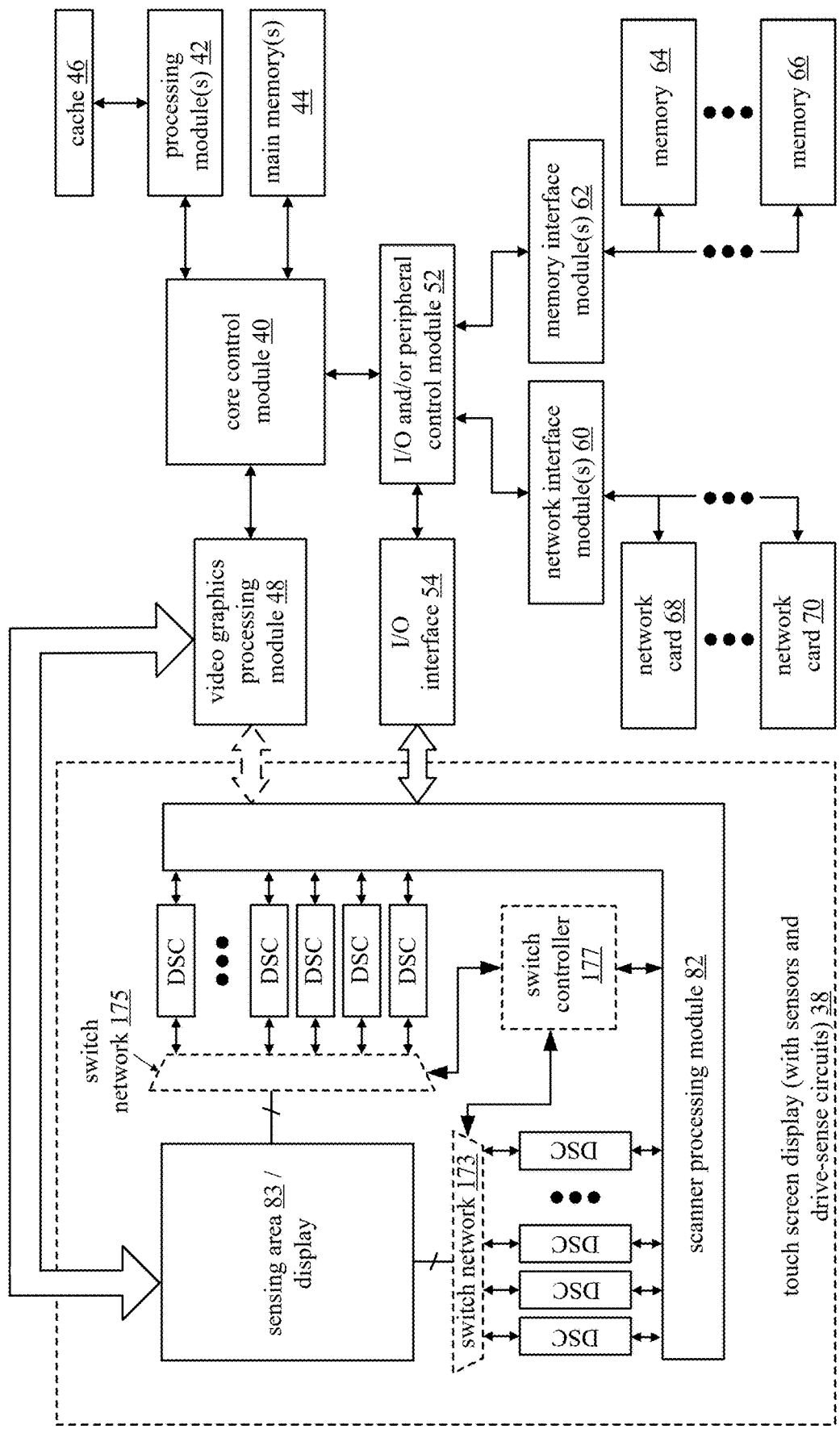
FIG. 21 is a schematic block diagram of an embodiment of a computing device including a touch screen display configurable for fingerprint imaging in accordance with the present disclosure.

FIG. 21 is a schematic block diagram of an embodiment of a computing device 36 including a touch screen display 38 with sensors and drive-sense circuits configurable for fingerprint imaging/scanning. The computing device 36 includes a sensing area 83/display (or "display 83"), a core control module 40, one or more processing modules 42, one or more main memories 44, cache memory 46, a video graphics processing module 48, an Input-Output (I/O) peripheral control module 52, one or more network interface modules 60, one or more memory interface modules 62, and one or more input/output interface modules (not separately illustrated). A processing module 42 is described in greater detail below and, in an alternative embodiment, has a direct connection to the main memory 44. In an alternate embodiment, the core control module 40 and the I/O and/or peripheral control module 52 are one module, such as a chipset, a quick path interconnect (QPI), and/or an ultra-path interconnect (UPI).

The touch screen display 38 includes a sensing area 83/display, a plurality of drive-sense circuits (DSCs), one or more switch networks 173 and 175, a switch controller 177, and a touch screen/scanner processing module 82. In general, the sensors (e.g., electrodes) function to enable fingerprint scanning and to detect proximal touches to the sensing area 83. In the illustrated embodiment, switch controller 177 selects particular sensors to be coupled to particular drive-sense circuits (DSCs) to adjust a touch resolution, sometimes referred to herein as "touch granularity" or simply "granularity," of all or part of the scanning device 80. For example, a touch resolution can be adjusted (e.g., increased) for fingerprint scanning operations. Switch controller 177 can receive information from any or all of the processing modules and use that information as a basis for selecting sensors/DSC coupling arrangements. Switch controller 177 then transmits control signals to the switch network(s) causing the switch networks to selectively couple the selected sensors to the selected drive-sense circuits. For example, when one or more fingers touches the screen, capacitance of sensors proximal to the touch(es) are affected (e.g., impedance changes). The drive-sense circuits (DSCs) coupled to the affected sensors detect the change and provide a representation of the change to the scanner processing module 82, which may be a separate processing module or integrated into the processing module 42. By changing the coupling of sensors to DSCs, a touch resolution of the touch screen display can be changed. By using different coupling arrangements in different areas of the touch screen display, multiple different touch screen resolutions can be realized concurrently in those different areas.

The scanner processing module 82 processes the representative signals from the drive-sense circuits (DSCs) to generate a fingerprint capacitive image(s) and to determine the location of the touch(es). This information can be provided to the processing module 42 for processing as an input. For example, a touch represents a selection of a button on screen, a scroll function, a zoom in-out function, etc. In another example, a fingerprint capacitive image (which may alternatively be generated by the processing module 42 based on fingerprint data provided by the scanner processing module 82) is processed by the processing module 42 to extract fingerprint minutia and/or features and to perform fingerprint matching and/or verification operations.

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieved from memory 64-66 are the data and/or operational instructions requested by the processing module or will the instructions most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface module 62 is in accordance with a Serial Advanced Technology Attachment (SATA) port.

The core control module 40 coordinates data communications between the processing module(s) 42 and one or more external networks via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, a near-field communication (NFC) device and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) via an input interface module(s) (not separately illustrated) and the I/O and/or peripheral control module 52. An input device includes a keypad, a keyboard, control switches, a touchpad, a microphone, a camera, etc. An input interface module can include a software driver and a hardware connector for coupling an input device to the I/O and/or peripheral control module 52. In an embodiment, an input interface module is in accordance with one or more Universal Serial Bus (USB) protocols.

The core control module 40 coordinates data communications between the processing module(s) 42 and output device(s) via an output interface module(s) (not separately illustrated) and the I/O and/or peripheral control module 52. An output device can include a speaker, etc. An output interface module includes a software driver and a hardware connector for coupling an output device to the I/O and/or peripheral control module 52. In an embodiment, an output interface module is in accordance with one or more audio codec protocols.

The processing module 42 communicates directly with a video graphics processing module 48 to display data on the touch screen display 38. In an example, the sensing area 83 includes an organic light emitting diode (OLED) display, such as an active-matrix OLED (AMOLED) or passive-matrix OLED (PMOLED) display, and may have a flexible substrate. Other types of displays may be utilized in other embodiments. The display has a resolution, an aspect ratio, and other features that affect the quality of the display. The video graphics processing module 48 receives data from the processing module 42, processes the data to produce rendered data in accordance with the characteristics of the display, and provides the rendered data to the display. In various embodiments, scanner processing module 82 can receive touch-related image information, rate of motion information, content meta-data and/or other video content-related information from the video graphics processing module 48.

Figure 22:
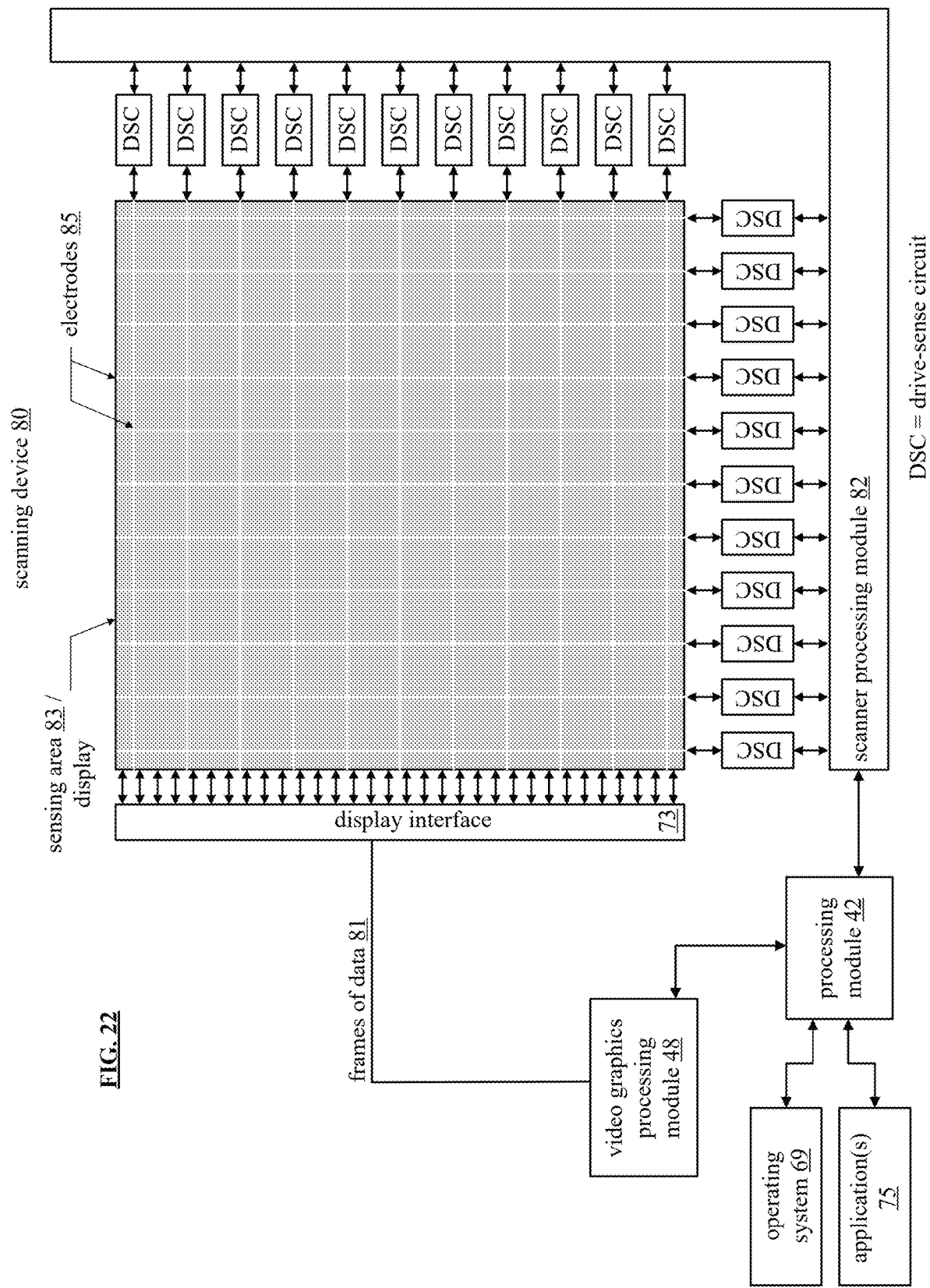
FIG. 22 is a schematic block diagram of an embodiment of a scanning device having a touch screen display with sensors in accordance with the present disclosure.

FIG. 22 is a schematic block diagram of an embodiment of a scanning device 80 having a touch screen display with sensors. The scanning device 80 of this example includes a sensing area 83/display, a plurality of drive-sense circuits (DSCs), a touch screen/scanner processing module 82, and a plurality of electrodes 85. The sensing area 83 (alternatively referred to herein as display 83) is coupled to a processing module 42, a video graphics processing module 48, and a display interface 73, which are components of a computing device (e.g., computing device 36), an interactive display, a biometric device, a communication device, or other device that includes a touch screen display. The display 83 functions to provide users with an interactive experience (e.g., touch the screen to verify a user identity via fingerprint matching, obtain information, command actions to be initiated remotely, provide process initiation, termination, and control, be entertained, etc.).

There are a variety of other devices that can include a touch screen display with fingerprint scanning capabilities, including those mentioned above. In another example, a store provides interactive displays for customers to find certain products, to obtain coupons, to enter contests, etc. In a further example, a vending machine includes a touch screen display used to select and/or pay for an item. Another example of a device having a touch screen display with fingerprint scanning capabilities is an Automated Teller Machine (ATM). As yet another example, an automobile includes a touch screen display for entertainment media control, navigation, climate control, etc.

In various implementations, the scanning device 80 can include a large display that has a resolution equal to or greater than full high definition (HD), an aspect ratio of a set of aspect ratios, and a screen size equal to or greater than thirty-two inches. The following table lists various combinations of resolution, aspect ratio, and screen size for the display 83, but the table is not an exhaustive list.

| Resolution | Width (lines) | Height (lines) | pixel aspect ratio | screen aspect ratio | screen size (inches) |
|---|---|---|---|---|---|
| HD (high definition) | 1280 | 720 | 1:1 | 16:9 | 32, 40, 43, 50, 55, 60, 65, 70, 75, and/or >80 |
| Full HD | 1920 | 1080 | 1:1 | 16:9 | 32, 40, 43, 50, 55, 60, 65, 70, 75, and/or >80 |
| HD | 960 | 720 | 4:3 | 16:9 | 32, 40, 43, 50, 55, 60, 65, 70, 75, and/or >80 |
| HD | 1440 | 1080 | 4:3 | 16:9 | 32, 40, 43, 50, 55, 60, 65, 70, 75, and/or >80 |
| HD | 1280 | 1080 | 3:2 | 16:9 | 32, 40, 43, 50, 55, 60, 65, 70, 75, and/or >80 |
| QHD (quad HD) | 2560 | 1440 | 1:1 | 16:9 | 32, 40, 43, 50, 55, 60, 65, 70, 75, and/or >80 |
| UHD (Ultra HD) or 4K | 3840 | 2160 | 1:1 | 16:9 | 32, 40, 43, 50, 55, 60, 65, 70, 75, and/or >80 |
| 8K | 7680 | 4320 | 1:1 | 16:9 | 32, 40, 43, 50, 55, 60, 65, 70, 75, and/or >80 |
| HD and above | 1280->=7680 | 720->=4320 | 1:1, 2:3, etc. | 2:3 | 50, 55, 60, 65, 70, 75, and/or >80 |

In other implementations, display 83 can be a smaller display, such as those included in handheld devices such as remote controls, smart phones, foldable tablets, rollable screens, wearable devices, such as those intended to be worn on a user's wrist or other appendage, and the like.

The display of the illustrated embodiment is one of a variety of types of displays that is operable to render frames of data into visible images. For example, the display is one or more of: an active matrix organic light emitting diode (AMOLED) display, a passive matrix organic light emitting diode (PMOLED) display, a quantum dot (QLED) display, a light emitting diode (LED) display, a microLED display, a phosphorescent OLED (PHOLED) display, a top-emitting OLED display (having a substrate that is either opaque or reflective), an electroluminescent conductive polymer OLED display, an electroluminescent display (ELD), a plasma display panel (PDP), a liquid crystal display (LCD), an LCD high performance addressing (HPA) display, an LCD thin film transistor (TFT) display, a surface conductive electron emitter (SED) display, a field emission display (FED), a laser TV display, a carbon nanotubes display, an interferometric modulator display (IMOD), and a digital microshutter display (DMS). The display is active in a full display mode or a multiplexed display mode (i.e., only part of the display is active at a time).

The display 83 further includes integrated electrodes 85 that provide the sensors for the touch sense part of the touch screen display. The electrodes 85 are distributed throughout the display area or where touch screen functionality is desired. For example, a first group of the electrodes are arranged in rows and a second group of electrodes are arranged in columns. As discussed in greater detail with reference to one or more of FIGS. 24-27, the row electrodes are separated from the column electrodes by a dielectric material.

The electrodes 85 may be comprised of a transparent conductive material and are in-cell or on-cell with respect to layers of the display. For example, a conductive trace is placed in-cell or on-cell of a layer of the touch screen display. The transparent conductive material, which is substantially transparent and has negligible effect on video quality of the display with respect to the human eye. For instance, an electrode 85 is constructed from one or more of: Indium Tin Oxide (ITO), Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 42 is executing an operating system 69 and one or more user applications 75. The user application 75 includes, but is not limited to, an e-commerce application, a video playback application, a spreadsheet application, a word processing application, a computer aided drawing application, a photo display application, an image processing application, a database application, etc. While executing a user application 75, the processing module generates data for display (e.g., video data, image data, text data, etc.). The processing module 42 sends the data to the video graphics processing module 48, which converts the data into frames of video 81.

The video graphics processing module 48 sends the frames of video 81 (e.g., frames of a video file, refresh rate for a word processing document, a series of images, etc.) to the display interface 73. The display interface 73 provides the frames of video to the display 83, which renders the frames of video into visible images.

While the display 83 is rendering the frames of video into visible images, the drive-sense circuits (DSC) provide sensor signals to the electrodes 85. When the screen is touched, capacitance of the electrodes 85 proximal to the touch (i.e., directly, or close by) is changed. The DSCs detect the capacitance change for affected electrodes and provide the detected change to the scanner processing module 82. As described in greater detail elsewhere herein, the display 83 can also be configured to capture fingerprint image data.

The scanner processing module 82 processes the capacitance change of the affected electrodes to determine one or more specific locations of touch and/or fingerprint image data and provides this information to the processing module 42. In an example, the processing module 42 processes one or more specific locations of touch to determine if an operation of the application is to be altered. For example, the touch may be indicative of a pause command, a fast forward command, a reverse command, an increase volume command, a decrease volume command, a stop command, a select command, a delete command, etc.

With the touch screen circuitry disclosed herein, effective and efficient large touch screen displays can be practically realized. For instance, the touch screen circuitry uses very low voltage signaling (e.g., 25-250 milli-volt RMS of the oscillating component of the sensor signal or power signal), which reduces power requirements and substantially reduces adverse effects of cross-coupling between the leads. For example, when the oscillating component is a sinusoidal signal at 25 milli-volt RMS and each electrode (or at least some of the electrodes) is driven by oscillating components of different frequencies, the cross-coupling is reduced and, what cross-coupled does exist, is easily filtered out. Continuing with the example, with a 25 milli-voltage signal and increased impedance of longer electrodes, the power requirement is dramatically reduced. As a specific example, for conventional touch screen circuitry operating with a power supply of 1.5 volts and the touch screen circuitry operating with 25 milli-volt signaling, the power requirements are reduced by as much as 60 times.

In another example, some of the electrodes 85 are incorporated within a control panel area/fingerprint sensing area (not separately illustrated) while other electrodes are in a display data area. The processing module, knowing which electrodes and hence which touch sense cells are part of the control panel area/fingerprint sensing area, can readily distinguish between touches in the control panel area/fingerprint sensing area and touches in the display data area.

As mentioned above, to reduce the adverse effects of cross-coupling, the drive-sense circuits 28 use a common frequency component for self-capacitance measurements and use different frequencies components for mutual capacitance measurements. In an example, there are eleven equally spaced different frequencies f2-f10 used for mutual capacitance measurements. The frequency spacing is dependent in part on the filtering of the sensed signals. For example, the frequency spacing is in the range of 10 Hz to 10 s of thousands of Hz. Note that the spacing between the frequencies does not need to be equal or that every frequency does not need to be used. Further note that, for very large touch screen displays having tens to hundreds of thousands of electrodes, a frequency reuse pattern may be utilized. In another example, the frequencies used to determine mutual capacitance can be transmitted individually or in groups (e.g., for a sensing area) at different times, allowing for reuse of frequencies.

Figure 23:
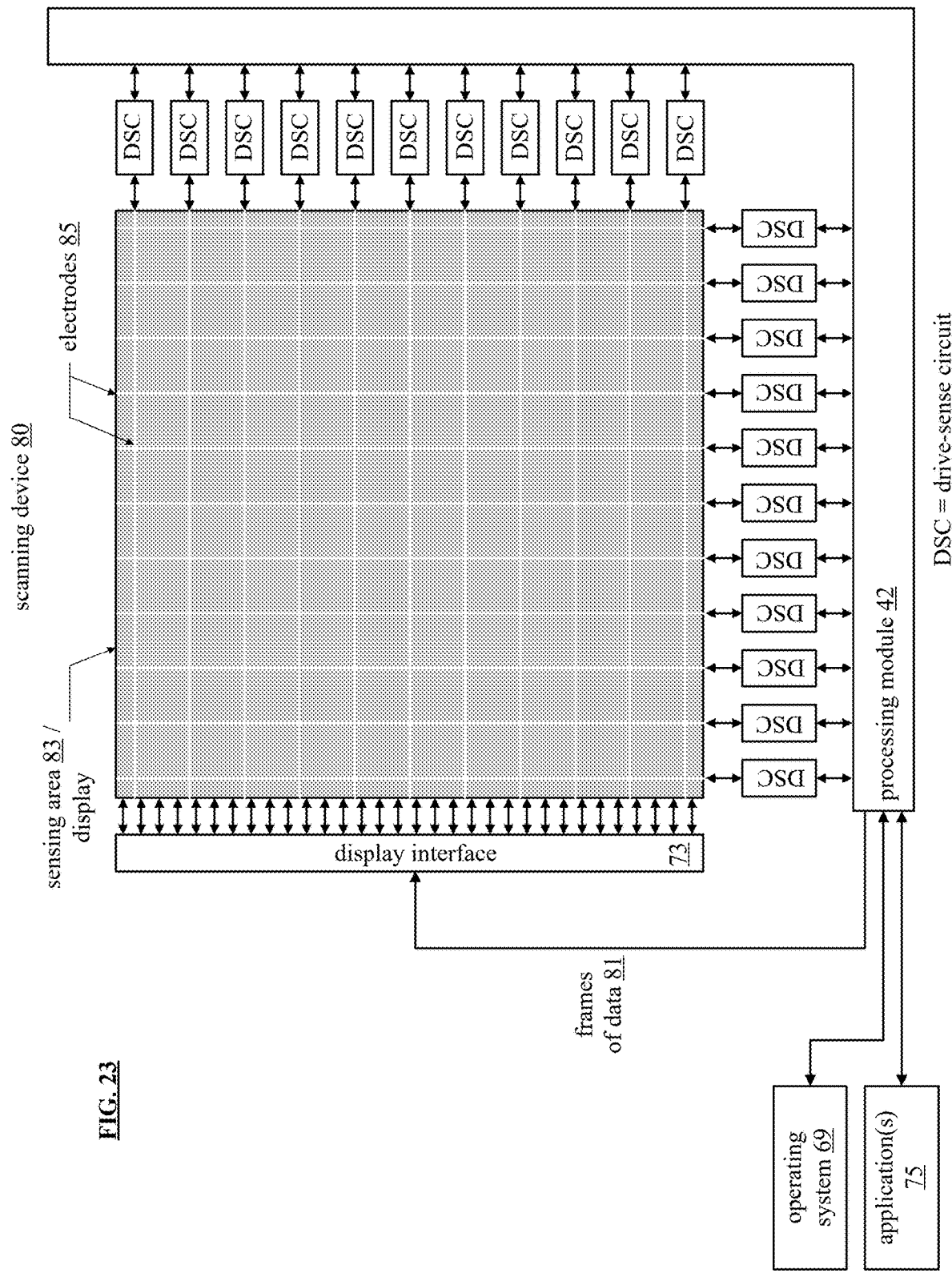
FIG. 23 is a schematic block diagram of another embodiment of a scanning device having a touch screen display with sensors in accordance with the present disclosure.

FIG. 23 is a schematic block diagram of another embodiment of a scanning device 80 having a touch screen display with sensors. The scanning device 80 of this example includes a plurality of drive-sense circuits (DSCs), the processing module 42, a sensing area 83/display, and a plurality of electrodes 85. The processing module 42 of this embodiment is executing an operating system 69 and one or more user applications 75 to produce frames of data 81. The processing module 42 provides the frames of data 81 to the display interface 73. The scanning device 80 operates similarly to the scanning device 80 of FIG. 22 with the above noted differences.

Figure 24:
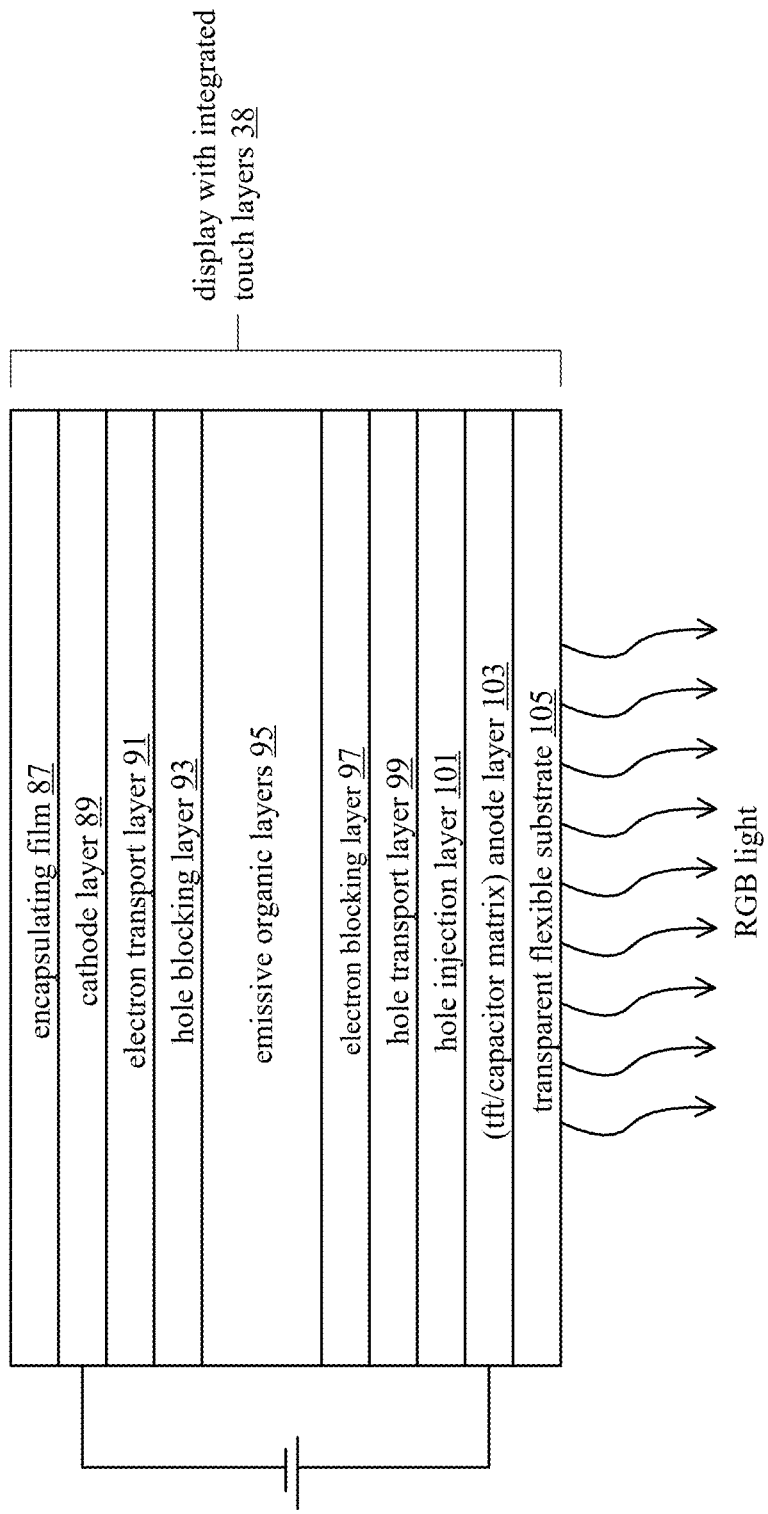
FIG. 24 is a cross section schematic block diagram of an example of a touch screen display with in-cell touch sensors in accordance with the present disclosure.

FIG. 24 is a cross section schematic block diagram of an example of a touch screen display 38 having a sensing area 83 with integrated in-cell touch sensors/layers. In particular, an example of an Active Matrix Organic Light Emitting Diode (AMOLED) display with integrated touch layers is shown. In general, the main component of an AMOLED display is a matrix of OLED emitters formed in the emissive organic layers 95, which include organic (i.e., carbon-based) materials that emit light/luminescence when a current is applied. The emissive organic layers 95 are sandwiched between a cathode (which injects electrons) and an anode (which removes electrons). The AMOLED display further includes a thin-film transistor (TFT) array, which functions as a series of switches to control the current flowing to each individual (sub-)pixel. The TFT array also includes storage capacitors which allow for larger displays. In an example, an AMOLED display consists of a storage capacitor and two TFTs at each sub-pixel—one to start and stop the charging of storage capacitors and the other to provide a steady voltage or current to the pixel. An example of a touch screen display with on-cell electrodes is described with reference to FIG. 27.

Referring more specifically to the example of FIG. 24, the sensing area 83 with integrated touch layers includes an encapsulating film 87 that provides oxygen and moisture protection, a cathode layer 89, an electron transport layer 91, a hole blocking layer 93, emissive organic layers 95, an electron blocking layer 97, a hole transport layer 99, a hole injection layer 101, an anode layer(s) 103 including a TFT/capacitor matrix, and a transparent substrate 105 through which RGB light generated by the emissive organic layer(s) 95 is emitted.

In this example, an electrode 85 may be formed of a variety of materials of the cathode layer 89 and/or anode layer 103, including without limitation a conductive oxide such as indium tin oxide (ITO), indium zinc oxide (IZO), zinc oxide (ZnO), indium oxide ($In_2O_3$), indium gallium oxide (IGO), aluminum zinc oxide (AZO), polycrystalline silicon (poly-Si), amorphous silicon (a-Si), etc., and may include multiple layers.

The plurality of pixels (e.g., 1440×1080) of the touch screen display are defined by the deposition of organic materials in a continuous, discrete "dot" pattern in the emissive organic layers 95. In an example, each pixel includes three sub-pixels: a sub-pixel having a chemical composition that emits red light when stimulated, a sub-pixel having a chemical composition that emits green light when stimulated, and a sub-pixel having a chemical composition that emits blue light when stimulated. The varying brightness of the three sub-pixel colors (red, green, and blue), collectively produce a single color to the human eye. For example, a blue shirt has a 12% red component, a 20% green component, and 55% blue component. In other examples, a pixel may have a differing number of sub-pixels and/or sub-pixel(s) that emit a color other than red, green, and blue (e.g., yellow or white sub-pixels). Note also that the encapsulating film 87 may further include a polarizing layer(s).

The in-cell touch sense functionality uses the existing layers of the display layers 79 to provide capacitance-based sensors. For instance, one or more of the transparent cathode layer 89 and the transparent anode layer 103 are used to provide row electrodes and column electrodes. Examples of creating row and column electrodes from one or more of the transparent cathode layer 89 and the transparent anode layer 103 are discussed with reference to FIGS. 25 and 26.

Figure 25:
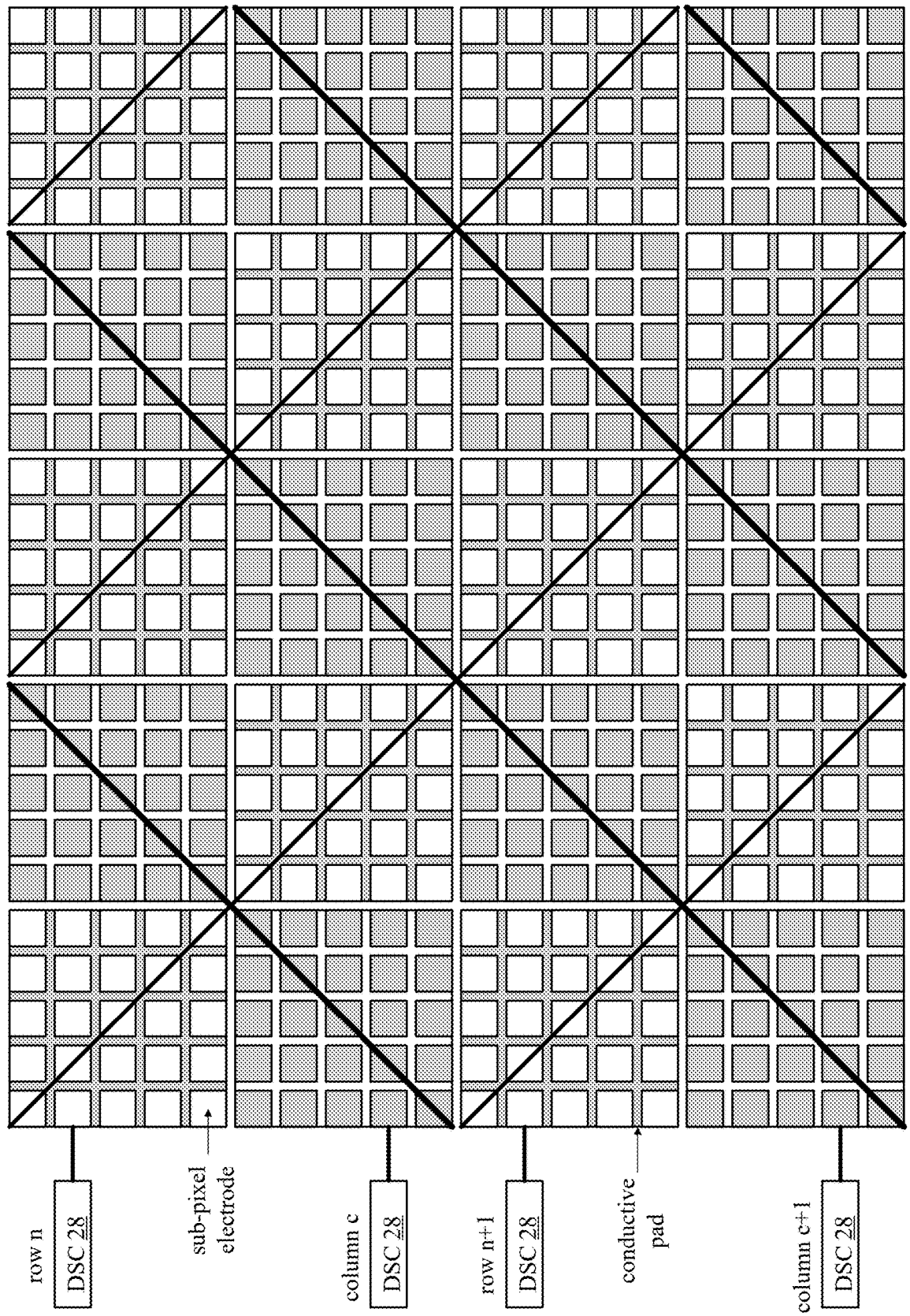
FIG. 25 is a schematic block diagram of an example of sub-pixel electrodes coupled together to form row electrodes and column electrodes of a touch screen sensor in accordance with the present disclosure.

FIG. 25 is a schematic block diagram of an example of sub-pixel electrodes coupled together to form row electrodes and column electrodes of a sensing area 83 on one of the (transparent) cathode layer 89 or anode layer 103. In this example, 5×5 sub-pixel electrodes are coupled together to form a square (or diamond, depending on orientation), or other geometric shape. The 5×5 squares are then cross coupled together to form a row electrode or a column electrode.

Continuing with this example, white sub-pixel sub-electrodes with a grey background are grouped to form a row electrode for touch sensing and the grey sub-pixels with the white background are grouped to form a column electrode. Each row electrode and column electrode is coupled to a drive-sense circuit (DSC) 28. As shown, the row and column electrodes for touch sensing are diagonal. Note that the geometric shape of the row and column electrodes may be of a different configuration (e.g., zig-zag pattern, lines, etc.) and that the number of sub-pixel electrodes per square (or other shape) may include more or less than 25. Each such square (or other shape) is referred to herein as a conductive pad. In a further example, the row electrodes may be formed on one of the cathode layer 89 or anode layer 103 and the column electrodes are formed on the other. In this instance, differential signaling is used for display functionality of sub-pixel electrodes and a common mode voltage is used for touch sensing on the row and column electrodes. This allows for concurrent display and touch sensing operations with negligible adverse effect on display operation.

In the illustrated embodiment, the smallest conductive pad includes a group of 25 sub-pixel electrodes, but the actual number of sub-pixel electrodes included in the smallest conductive pad for any particular implementation may be different and can range from millimeters (or larger) in size to as small as a single sub-pixel electrode.

In some embodiments, the size of the smallest conductive pad is fixed, for example by permanently coupling a given number of sub-pixel electrodes together via a semiconductor trace or other conductor. In embodiments employing a fixed-size smallest conductive pad, sizing of the smallest conductive pad can be selected based on size of the touch screen, based on an intended use of the touch screen (e.g., fingerprint scanning), based on a display resolution of the touch screen, based on a type manufacturing process used to form the sub-pixel electrodes, or the like. For example, in some embodiments employing a fixed-size conductive pad, a smallest conductive pad of a 50 inch, lower display resolution touch display may include an 8×8 array of sub-pixel electrodes coupled together, while the smallest conductive pad of an 8 inch, higher display resolution touch display may include a 2×2 array of sub-pixel electrodes coupled together.

In other implementations, the size of the smallest conductive pad can be adjusted by selectively coupling different combinations of sub-pixel electrodes together using a switch network. For example, a touch screen can be dynamically configured to use a smaller conductive pad during periods of use when scanning a fingerprint or knowing a precise location of a touch is imperative, and later configured to use a larger conductive pad when sensing the precise location of a touch is less important than sensing the presence of a touch. Regardless of whether the smallest conductive pad is fixed or variable, different sizes of conductive pads can be used for different portions of a touch screen.

Figure 26:
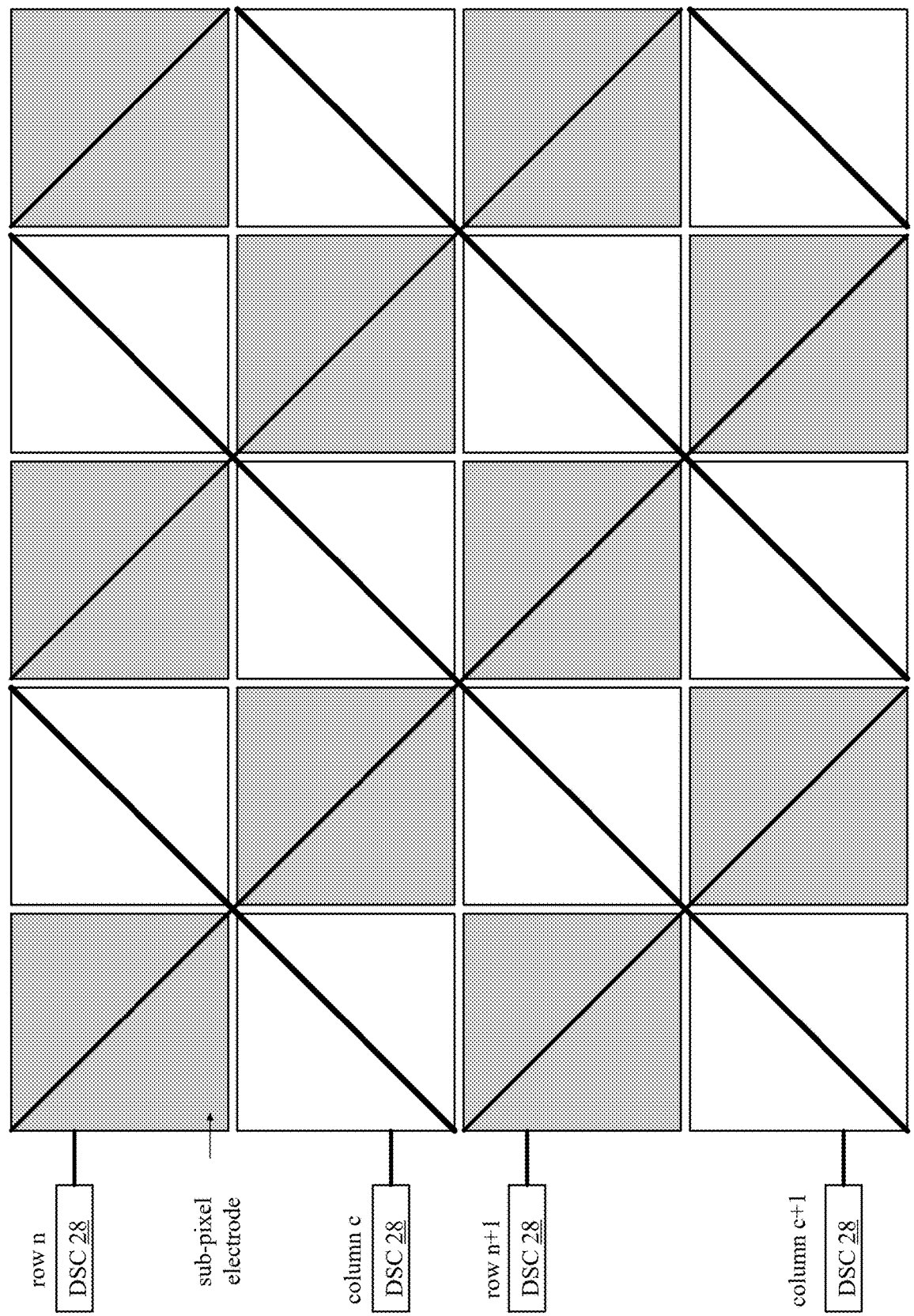
FIG. 26 is a schematic block diagram of an example of a segmented common ground plane forming row electrodes and column electrodes of a touch screen sensor in accordance with the present disclosure.

FIG. 26 is a schematic block diagram of an example of a segmented common ground plane forming row electrodes and column electrodes of a sensing area 83 on the cathode layer 89. In this instance, each square (or other shape) corresponds to a segment of a common ground plane that services a group of sub-pixel electrodes on the anode layer 103. The squares (or other shape) are coupled together to form row electrodes and column electrodes. The white segmented common ground planes are coupled to form column electrodes and the grey segmented common ground planes are coupled together to form row electrodes. By implementing the touch screen row and column electrodes in the common ground plane, display and touch sense functionalities may be concurrently executed with negligible adverse effects on the display functionality. It is noted that various arrangements of the components of the active matrix array of an AMOLED display may be utilized without departing from the spirit of the disclosure.

Figure 27:
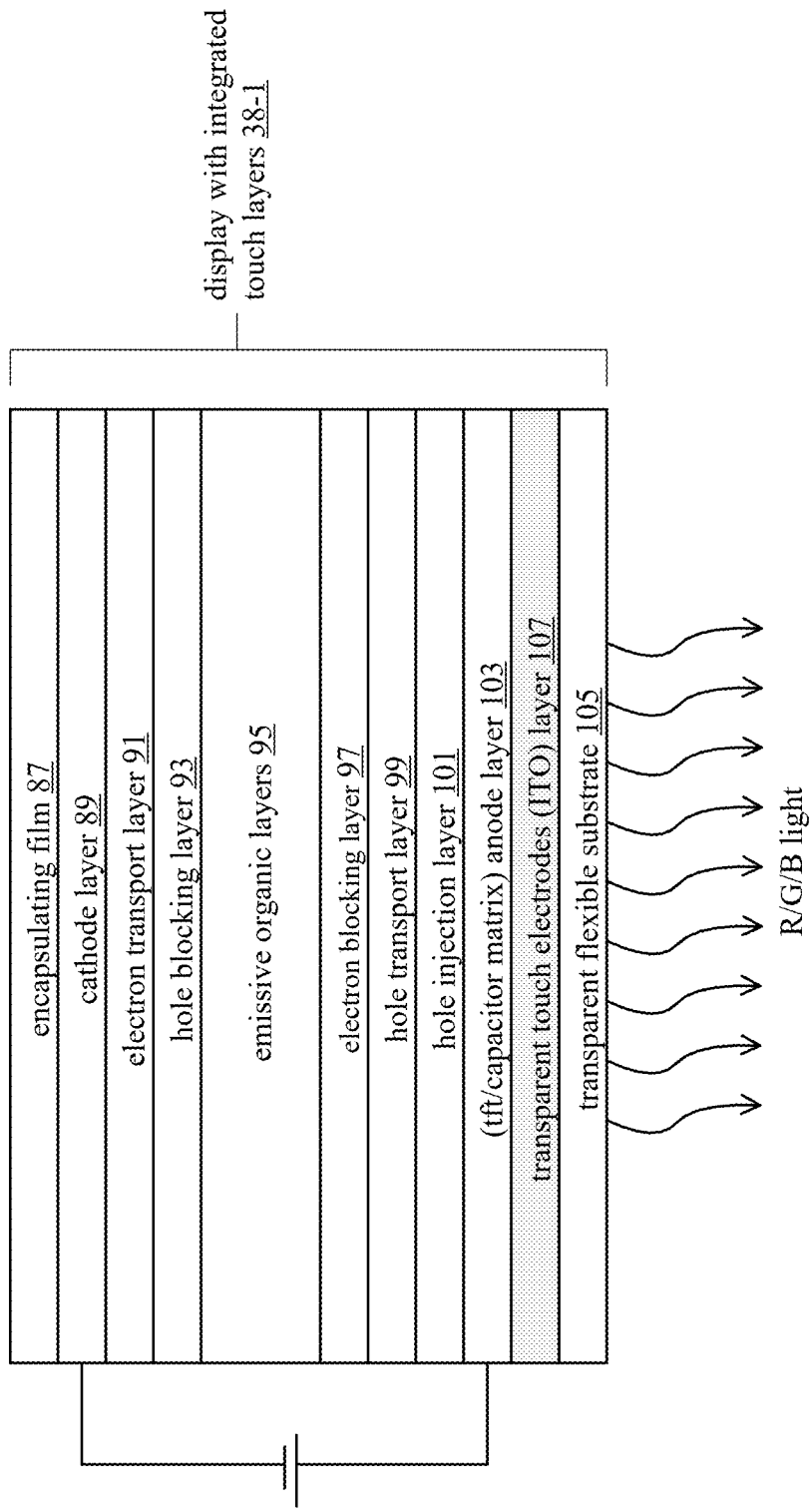
FIG. 27 is a cross section schematic block diagram of an example of a touch screen display with on-cell touch sensors in accordance with the present disclosure.

FIG. 27 is a cross section schematic block diagram of an example of a touch screen display 38-1 having a sensing area 83 with integrated on-cell touch sensors/layers, which includes an encapsulating film 87, a cathode layer 89, an electron transport layer 91, a hole blocking layer 93, emissive organic layer(s) 95, an electron blocking layer 97, a hole transport layer 99, a hole injection layer 101, an anode layer(s) 103 including a TFT/capacitor matrix, a transparent substrate 105 through which RGB light generated by the emissive organic layer(s) 95 is emitted, and a transparent touch electrodes (ITO) layer 107.

The layers 87-105 and the display with integrated touch sensing layers 79-1 function as described with reference to FIG. 24 for generating a display. A difference lies in how on-cell touch sensing of this embodiment is configured in comparison to the in-cell touch sensing of FIG. 24. In particular, this embodiment includes an extra transparent touch electrodes (ITO) layer 107 to provide, or assist, with capacitive-based touch sensing. For example, the extra transparent touch electrodes (ITO) layer 107 includes row and column electrodes (e.g., line electrodes) that can be configured in a similar manner to the electrodes shown in FIG. 26. As another example, the transparent touch electrodes (ITO) layer 107 includes row electrodes or column electrodes and another one of the cathode layer 89 or anode layer 103 includes the other electrodes (e.g., column electrodes if the extra transparent layer includes row electrodes).

Figure 28:
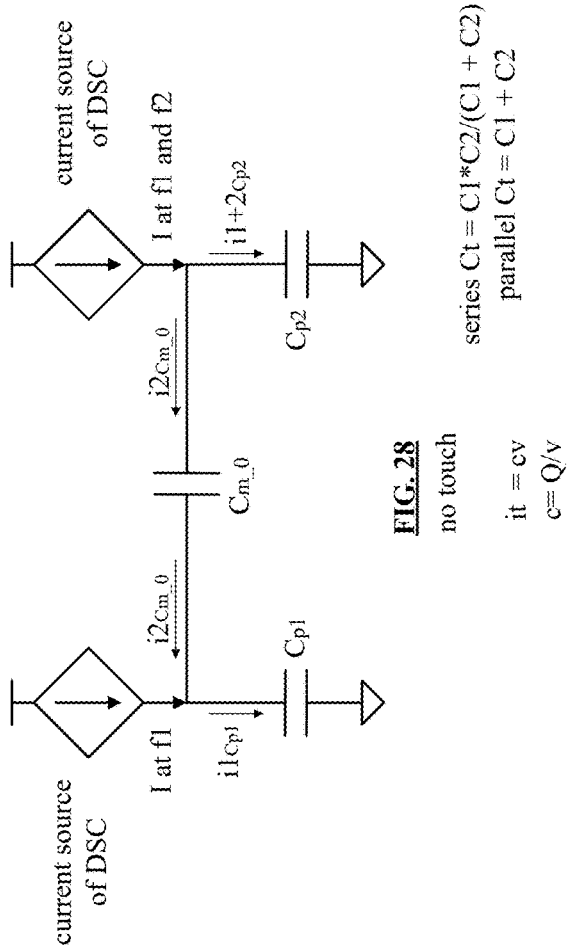
FIG. 28 is a schematic block diagram of an electrical equivalent circuit of two drive-sense circuits coupled to two electrodes without a finger touch in accordance with an embodiment of the present disclosure.

FIG. 28 is a schematic block diagram of an electrical equivalent circuit of two drive-sense circuits 28 coupled to two electrodes 85 without a finger touch. The drive sense circuits 28 are represented as dependent current sources, the self-capacitance of a first electrode is referenced as Cp1, the self-capacitance of the second electrode is referenced as Cp2, and the mutual capacitance between the electrodes is referenced as Cm_0. In this example, the current source of the first drive sense circuit is providing a controlled current (I at f1) that includes a DC component and an oscillating component, which oscillates at frequency f1. The current source of the second drive sense circuit is providing a controlled current (I at f1 and at f2) that includes a DC component and two oscillating components at frequency f1 and frequency f2.

The first controlled current (I at f1) has one component i1Cp1 and the second controlled current (I at f1 and f2) has two components: i1+2Cp2 and i2Cm_0. The current ratio between the two components for a controlled current is based on the respective impedances of the two paths.

Figure 29:
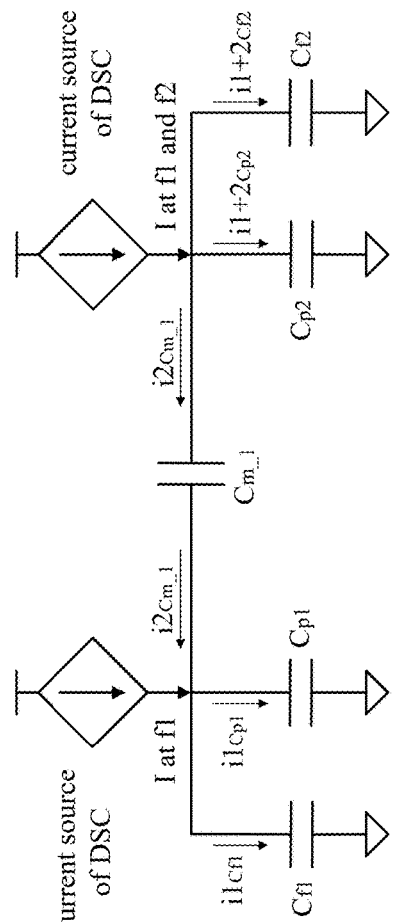
FIG. 29 is a schematic block diagram of an electrical equivalent circuit of two drive-sense circuits coupled to two electrodes as shown in the embodiment of FIG. 28, but with a finger touch.

FIG. 29 is a schematic block diagram of an electrical equivalent circuit of two drive-sense circuits 28 coupled to two electrodes 85 as shown in the embodiment of FIG. 28, but with a finger touch. The finger touch is represented by the finger capacitances (Cf1 and Cf2), which are in parallel with the self-capacitance (Cp1 and Cp2). The dependent current sources are providing the same levels of current as in FIG. 28 (I at f1 and I at f1 and f2).

In this example, however, more current is being directed towards the self-capacitance in parallel with the finger capacitance than in FIG. 28. Further, less current is being directed towards the mutual capacitance (Cm_1) (i.e., taking charge away from the mutual capacitance, where C=Q/V). With the self-capacitance effectively having an increase in capacitance due to the finger capacitance, its impedance decreases and, with the mutual capacitance effectively having a decrease in capacitance, its impedance increases. As noted above, the increase in self-capacitance generally be greater when sensing a fingerprint ridge as compared to a fingerprint valley, while the decrease in mutual capacitance will generally be greater when sensing a fingerprint ridge as compared to a fingerprint valley.

The drive sense circuits can detect the change in the impedance of the self-capacitance and of the mutual capacitance when the change is within the sensitivity of the drive sense circuits. For example, V=I*Z, I*t=C*V, and Z=½πfC (where V is voltage, I is current, Z is impedance, t is time, C is capacitance, and f is the frequency), thus V=I*½πfC. If the change between C is small, then the change in V will be small.

Figure 30:
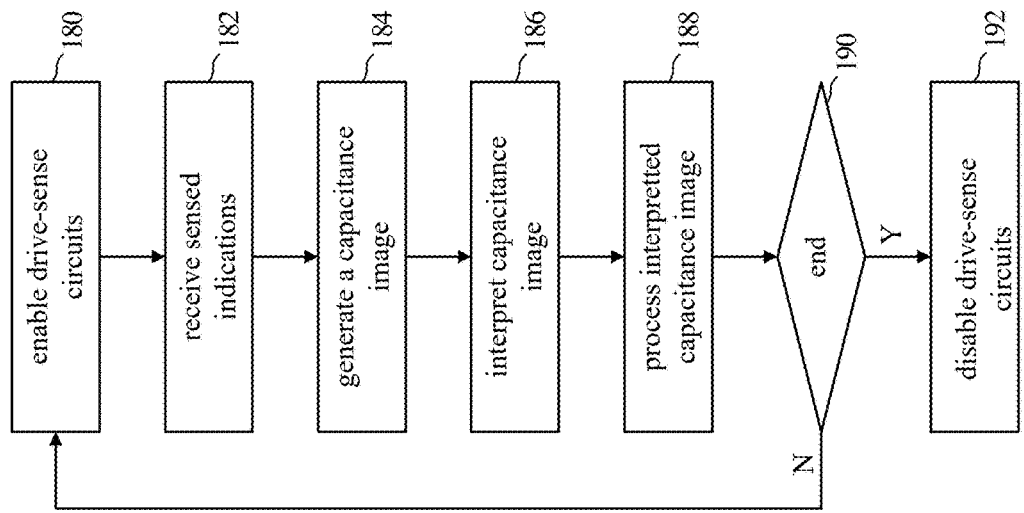
FIG. 30 is a logic diagram of an embodiment of a method for generating a capacitive image (e.g., fingerprint) from a touch screen display in accordance with the present disclosure.

FIG. 30 is a logic diagram of an embodiment of a method for generating a capacitive image (e.g., fingerprint) from a touch screen display or dedicated sensing area. In this example, the method is performed by the processing module 42 and/or 82. The method begins at step 180 where the processing module enables (for continuous or periodic operation) the drive-sense circuits to provide sensor signals to the electrodes. For example, the processing module 42 and/or 82 provides an enabling control signal to the drive-sense circuits. The control signal allows power to be supplied to the drive-sense circuits, to turn-on one or more of the components of the drive-sense circuits, and/or close a switch coupling the drive-sense circuits to their respective electrodes.

The method continues at step 182 where the processing module receives, from the drive-sense circuits, sensed indications regarding (self and/or mutual) capacitance of the electrodes. The method continues at step 184 where the processing module generates a capacitive image of at least a portion of the display based on the sensed indications. As part of step 184, the processing module stores the capacitive image in memory. In an example, the capacitive image includes a fingerprint capacitive image. The method continues at step 186 where the processing module interprets the capacitive image. Interpreting the capacitive image may include identifying one or more proximal touches (e.g., actual physical contact or near physical contact) of the touch screen display. In another example, interpreting the capacitive image includes processing the capacitive image to produce (or sharpen/enhance) an image of a fingerprint scanned by touching the display. Continuing with this example, processing the capacitive image may include converting the capacitive image from grayscale data to black and white data.

The method continues at step 188 where the processing module processes the interpreted capacitance image to determine an appropriate action. For example, if the touch(es) corresponds to a particular part of the screen, the appropriate action is a select operation. As another example, if the touches are in a sequence, then the appropriate action is to interpret the gesture and then determine the particular action. As yet another example in which the capacitive image includes a fingerprint capacitive image, the processing module determines to match the fingerprint capacitive image against a stored user fingerprint template, such as described in greater detail with reference to FIG. 37.

The method continues at step 190 where the processing module determines whether to end the capacitance image generation and interpretation. If so, the method continues to step 192 where the processing module disables the drive-sense circuits. If the capacitance image generation and interpretation is to continue, the method reverts to step 180.

FIG. 31 is a schematic block diagram of an embodiment of a card 200 having an edge capacitive scanner 248. Examples of generating a fingerprint capacitive image via the edge capacitive scanner 248 are described with reference to FIGS. 32-34. In the illustrated embodiment, the edge capacitive scanner 248 includes a plurality of row electrodes 85-r, a plurality of column electrodes 85-c, a scanner processing module 82, and a plurality of drive-sense circuits (DSCs) 28.

In various embodiments, the card 200 can include a variety of additional components and perform a wide range of functions. For example, the card can be manufactured as a payment card (ATM card, credit card, debit card, etc.), an identification card, a transit card, a retail loyalty card, or a keycard. Examples of such cards (which may be referred to as smart cards or chip cards) and functions are described below with refence to FIGS. 36-44.

The card 200 has a substrate with opposing sides and edge surfaces (top, bottom, or side) including an edge surface 202. The plurality of column electrodes 85-c and the plurality of row electrodes 85-r are separated by a dielectric material and disposed in a crossing pattern along the edge surface 202 of the card substrate to form a sensing area. For example, the electrodes 85 are disposed in a crossing pattern along substantially all of the edge surface 202. In another example, the electrodes 85 are disposed along a portion of the edge surface 202 (e.g., a portion of the edge surface having a length of approximately 10-20 millimeters). In an example, the plurality of column electrodes 85-c and the plurality of row electrodes 85-r are spaced to provide high resolution sensing in the range of 50×50 microns.

In operation, the electrodes 85, the scanner processing module 82, and the plurality of drive-sense circuits (DSCs) 28 generally function as described above to generate capacitive images. In an example, each of the DSCs 28 is configured, when enabled, to drive a sensor signal on at least one electrode of the plurality of column electrodes 85-c or the plurality of row electrodes 85-r, the sensor signal including a drive signal component and a receive signal component. The DSCs 28 are further configured to generate, based on the receive signal component, a sensed signal representative of an impedance of at least one electrode. The scanner processing module 82 is configured to process sensed signals generated by the plurality of DSCs 28 to detect a touch to the sensing area of the edge surface 202 by at least a portion of a surface of finger (or another object with a surface having varying capacitance) and generate a capacitive image of the portion of the surface. In an example, the scanner processing module 82 uses a relatively low sampling rate (e.g., approximately 10-50 Hz) to process sensed signals in order to improve the signal-to-noise ratio of the edge capacitive scanner 248.

In an example, to allow for simultaneous self-capacitance sensing and mutual capacitance sensing of the electrodes the DSCs 28 use different frequencies to simulate the electrodes. In an example of measuring self-capacitance, all of the DSCs 28 use the f1 frequency component. This creates near zero potential difference between the electrodes, thereby eliminating cross coupling between the electrodes. In this manner, the self-capacitance measurements made by the drive-sense circuits are effectively shielded (i.e., low noise, yielding a high signal-to-noise ratio).

For mutual capacitance, the column electrodes also transmit a frequency component at another frequency. As a specific example, a first column DSC 28 transmits a signal with frequency components at f1 and at f2; a second column DSC 28 transmits a signal with frequency components at f1 and at f3; a third column DSC 28 transmits a signal with frequency components at f1 and at f4; and so on. The additional frequency components allow the row DSCs 28 to determine mutual capacitance at the touch cells (e.g., intersections of a row electrode with a column electrode). With concurrent sensing of self-capacitance and mutual capacitance, touches and fingerprint features are detectable with a high degree of accuracy.

In the illustrated embodiment, the card 200 has an ISO/IEC standardized payment card form factor with dimensions of 85.60 millimeters (width)×53.98 (height) millimeters× 0.76 millimeters (thickness). This form factor allows the card 200 to fit easily into a user wallet or pocket. In other examples, the card 200 may have a different form factor with a similar thickness. In still further examples, the electrodes of the capacitive edge scanner described above are disposed on the edge of relatively thin device other than a card, such as a key, a key fob, a work ID badge, a trigger, etc.

In an example, the body/substrate of the card 200 is manufactured of a plastic such as polyvinyl chloride, polyethylene terephthalate-based polyesters, acrylonitrile butadiene styrene, polycarbonate, etc. The plurality of column electrodes 85-$c$ and the plurality of row electrodes 85-$r$ can be formed of a substantially transparent metal, graphene, or indium tin oxide (ITO). Other suitably conductive materials, transparent or not, may be utilized to construct the electrodes. The card 200 may also have a protective layer disposed over the plurality of row electrodes 85-$r$ and the plurality of column electrodes 85-$c$ such that the protective layer forms an outermost surface of the sensing area.

FIG. 32 is a diagram of an example of a fingerprint scanning process utilizing the edge capacitive scanner of the embodiment of FIG. 31. In this example, a fingerprint capacitive image 12 is generated by capturing a series of non-overlapping images ("windows" or "scan windows") of a finger over period of time as the finger moves across the electrodes 85 on the edge surface 202 of a card 200.

The average size of an adult fingerprint is approximately 0.5 inches×0.7 inches (or 12,700 microns×17,800 microns). Accordingly, with an edge capacitive scanner having a sensing area dimension that corresponds to a card edge thickness of 760 microns, approximately 24 scan windows are required to produce a complete fingerprint capacitive image 12. A method for generating a fingerprint capacitive image utilizing an edge capacitive scanner is described below with reference to FIG. 34.

Figure 33:
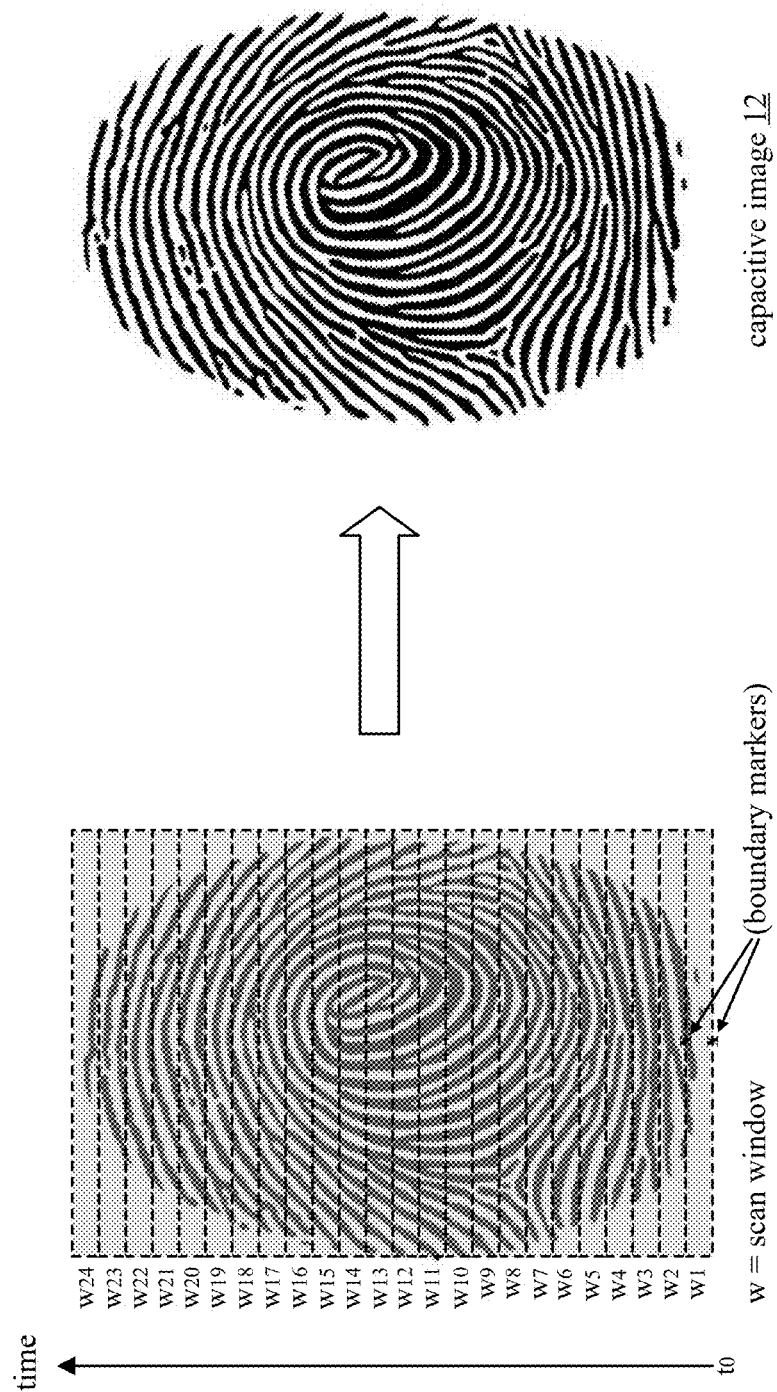
FIG. 33 is a diagram of an example of generating a fingerprint capacitive image utilizing an edge capacitive scanner in accordance with the present disclosure.

Referring now to FIG. 33, a diagram of an example of generating a complete fingerprint capacitive image 12 utilizing an edge capacitive scanner is shown. In the illustrated example, the edge capacitive scanner (such as described with reference to FIG. 31), captures 24 scan windows w1-w24 over a period of time as a finger moves across the scanner. In particular, each of the scan windows is a capacitive image of a distinct portion of a fingerprint. Following completion of the scanning process, the 24 scan windows are compiled to generate fingerprint capacitive image 12.

In the illustrated embodiment, boundary markers are utilized to generate scan windows that are substantially non-overlapping. For example, a marker is placed on an initial portion of a scanned image and tracked to determine when the corresponding portion of a finger has moved across the scanning area of the edge capacitive scanner 248. In this example, placing a marker includes identifying a particular feature(s) in a scanned image and tracking the identified feature from a first boundary of a window to a second boundary of the window. In another example, scan windows are captured on a periodic basis and sorted through post processing by the scanner processing module 82 to identify a sufficient number of non-overlapping windows to generate a complete fingerprint capacitive image 12. In another example, the fingerprint capacitive image 12 is a partial fingerprint image (e.g., including a core portion of the fingerprint) that captures sufficient distinguishing features to enable a verification/matching procedure.

It is noted that the orientation and direction of fingerprint scanning could be different than illustrated. For example, the fingerprint capacitive image 12 can be captured from a diagonal or side-to-side motion of a fingertip across an edge capacitive scanner. In another example, the direction of a finger movement and angle of a resulting capacitive image is made part of a user verification/security process.

Figure 34:
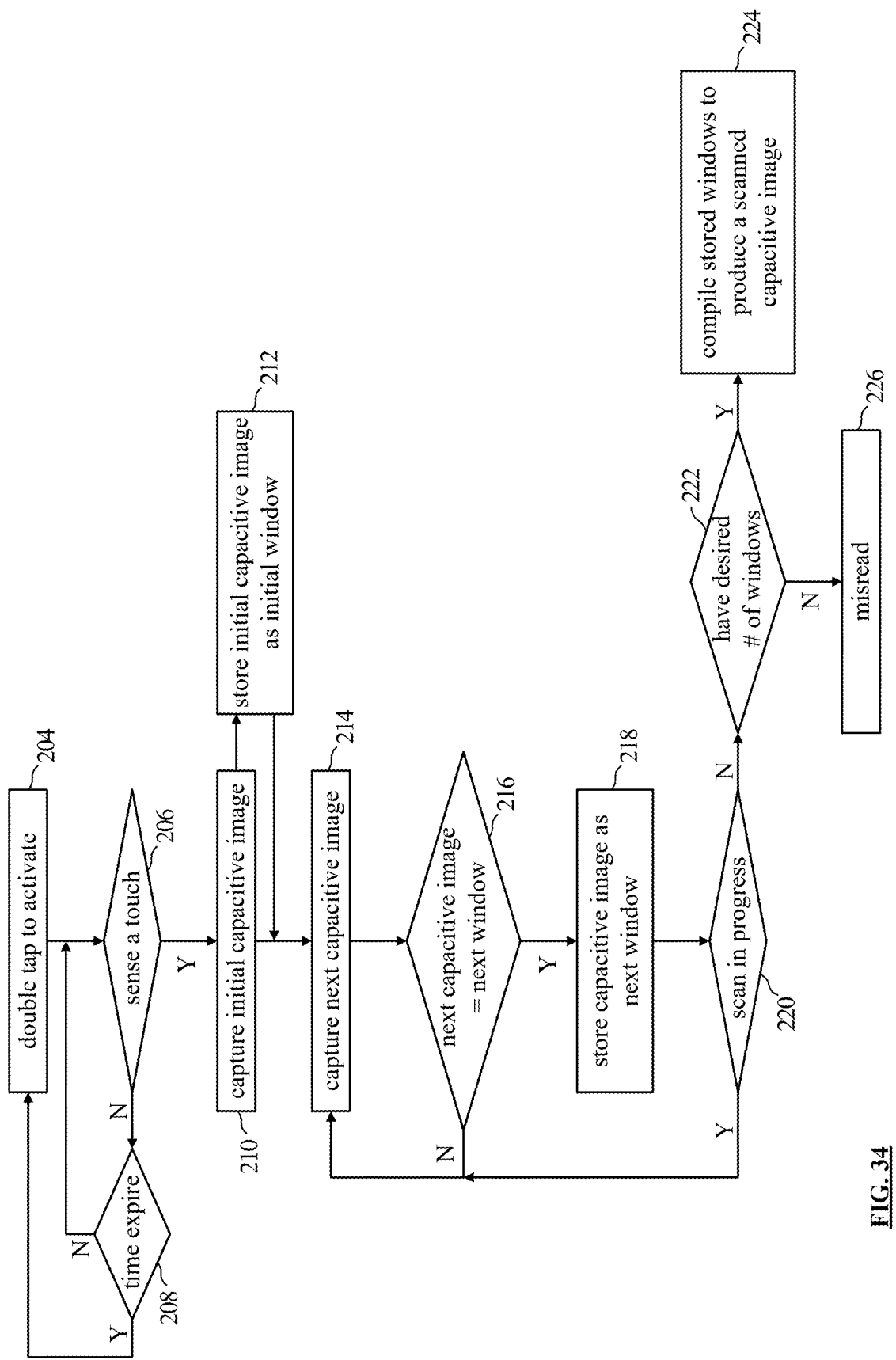
FIG. 34 is a logic diagram of an embodiment of a method for generating a fingerprint capacitive image utilizing an edge capacitive scanner in accordance with the present disclosure.

FIG. 34 is a logic diagram of an embodiment of a method for generating a fingerprint capacitive image utilizing an edge capacitive scanner. In this embodiment, the method is executed by a processing module such as processing module 82 and other elements of card 200 (or other device) incorporating an edge capacitive scanner. The method begins at step 180 where the edge capacitive scanner is activated by a double tap to its sensing area on an edge surface of the card. In another example, the edge capacitive scanner is activated by a power on/off button of the card. In a further example, the edge capacitive scanner is activated via a wireless communication such as an NFC communication from a card reader. In the illustrated method, the processing module further initiates a timer in response to an activation event.

The method continues at step 206 where the processing module determines if there is a touch, by a portion of an object or finger, present on the sensing area. If no touch is sensed, the illustrated method continues at step 208 where the processing module determines if the timer has expired. If so, the scanning process is terminated pending a new activation event. If the timer has not expired, the processing module continues to determine if there is a touch present on the sensing area.

In response to sensing a touch at step 206, the method continues at step 210 where the processing module captures an initial capacitive image of the portion of the finger or object touching the sensing area, and (step 212) stores the initial capacitive image as an initial scan window (or "window"). In an example, the size of a scan window corresponds to the size of the sensing area.

The method continues at step 214 where the processing module captures the next capacitive image as the finger or object continues to move across the sensing area. In an example, the scanner processing module uses a sampling rate of approximately 10-50 Hz when capturing capacitive images. In this step, the processing module further determines if the next capacitive image corresponds to the next scan window (e.g., is substantially non-overlapping with the preceding scan window).

The method continues at step 216 where the processing module determines if the next capacitive image corresponds to a next portion/scan window of the finger or object. In an example, the processing module utilizes boundary markers to generate scan windows with capacitive images that are substantially non-overlapping. In this example, a marker is placed on an initial portion of a scanned image and tracked to determine when the corresponding portion of a finger has moved across the scanning area of the edge capacitive scanner. Placing a marker can include identifying a one or more features in a scanned image and tracking (e.g., through a series of capacitive images) the identified feature(s) from a first boundary of a window to a second boundary of the window. If the next capacitive image does not correspond to a next scan window, the method reverts to step 214.

In response to determining that the next capacitive image corresponds to a next scan window, the method continues at step 218 where the processing module stores the next capacitive image as a next window. The method continues at step 220 where the processing module determines if the scan is still in progress. For example, the processing module senses that there is still a finger touch to the sensing area, and verifies (e.g., through markers) that the finger is still moving. If the processing module determines that a scan is still in progress, the method continues at step 214.

The method continues at step 220 where the processing module determines if a desired number of scan windows have been stored. In an example of fingerprint scanning wherein the width of a scan window is approximately 760 microns, the desired number of windows is 24-26. The desired number of windows can be more or less (e.g., when only a partial fingerprint capacitive image including a core portion of a fingerprint is required).

In response to determining that a desired number of scan windows has not been stored, the method continues at step 226 and the processing module generates a notification of a misread or invalid scan. In an example, the card includes an LED (e.g., a red LED) or display that is activated to indicate an invalid scan. In response to determining that a desired number of scan windows have been stored, the method continues at step 224 and the processing module compiles the stored scan windows to produce a scanned capacitive image.

Figure 35:
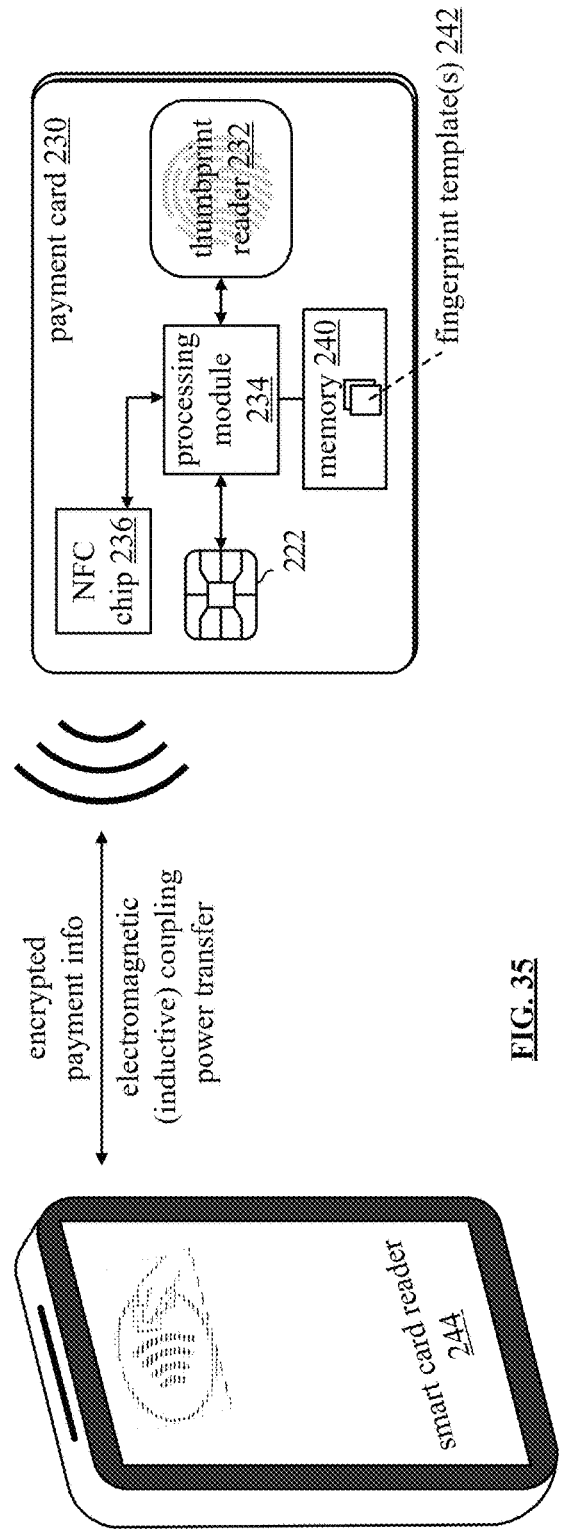
FIG. 35 is a schematic block diagram of an example of payment transactions utilizing a capacitive fingerprint scanner in accordance with the present disclosure.

FIG. 35 is a schematic block diagram of an example of payment transactions utilizing a capacitive fingerprint scanner. In this example, payment transactions are performed by a payment card 230 and a smart card reader 244. The payment card 230 includes a substrate having an EMV chip 222, a thumbprint reader 232, a processing module 234, and memory 240 for storing one or more fingerprint templates 242. In the illustrated embodiment, the payment card 230 further includes a near-field-communication (NFC) chip 236. In other examples, the payment card 230 includes either the EMV chip 222 (which is NFC-enabled) or the NFC chip 236. In each of these examples, use of the EMV chip 222 and/or the NFC chip 236 for completing a transaction is conditioned on a valid fingerprint capacitive image produced by thumbprint reader 232 as described more fully below.

The thumbprint reader 232 includes a plurality of integrated column electrodes and a plurality of integrated row electrodes coupled a plurality of drive-sense circuits, and operates to generate fingerprint/thumbprint capacitive images as described above with reference to FIGS. 1-20, with the processing module 234 configured to perform the functions of a scanner processing module 82. In the illustrated example, the sensing area formed by the plurality of electrodes is sized appropriately for the payment card 230.

In an example, the payment card 230 has an ISO/IEC standardized payment card form factor with dimensions of 85.60 millimeters (width)×53.98 (height) millimeters×0.76 millimeters (thickness), and the thumbprint reader 232 has a sensing area with dimensions of approximately 12.7 millimeters×17.8 millimeters in order to accommodate an average size adult fingerprint in a single scan. In another example, the dimensions of the sensing area of the thumbprint reader 232 are approximately 1 centimeter×1 centimeter. In yet another example, the payment card 230 includes an edge capacitive scanner 248 in lieu of a thumbprint reader 232 disposed on a front or back surface of the card. An example of such a card is described with reference to FIG. 36.

The EMV (short for Europay, MasterCard, and Visa) chip 222 of the payment card 230 makes it much more difficult to steal sensitive credit card data and initiate a fraudulent transaction as compared to magnetic stripe credit cards. The security technology of the EMV standard is used worldwide for all payments done with credit, debit, and prepaid EMV smart cards to verify the legitimacy of a card. The EMV chip 222 is essentially a small, embedded computer system with a microprocessor, memory, and application software, and also includes a secure vault that holds unique cryptography keys specific to the payment card 230.

The payment card 230 can communicate with and receive power from the smart card reader 244 by two methods: (1) by establishing a physical contact with the EMV chip 222 pins (e.g., at a point-of-sale terminal or ATM) and (2) via NFC short range (~0-4 cm) wireless communications with the EMV chip 222 and/or NFC chip 236. Touchless transactions involving NFC communications—sometimes referred to as "contactless" or "tap to pay"—involve the payment card 230 being tapped against or waved in front of the smart card reader 244. In such transactions, inductive coupling is used to exchange encrypted payment information and power for the circuitry of payment card 230, including the thumbprint reader 232. Although not specifically illustrated, the payment card 230 can include additional or alternate power harvesting circuitry (e.g., coils) arranged on the substrate to obtain wireless power from an external source.

In the illustrated embodiment, the smart card reader 244 may come preloaded with keys to authenticate payment cards such as payment card 230. When used for electronic payment, the smart card reader 244 may be located near a PIN pad, a cash register, or other payment devices. When used for public transit, the smart card reader 244 may be located on a ticket machine, fare box, turnstile, station platform, etc. When used for security, the smart card reader 244 may be located by a door, gate, lock, etc.

In an example of a payment transaction, when the payment card 230 placed near (or inserted into) a contactless or tap to pay smart card reader 244, the EMV chip 222 generates a unique authorization/transaction code each time it is used. This code, or encrypted payment information, is based on a private key infrastructure. In certain applications, the code eliminates the need to enter a PIN code at a point-of-sale terminal to perform a payment transaction (in either contact mode or contactless mode). In an example of operation involving an EMV transaction, the smart card reader 244 and the EMV chip 222 make an application choice and the smart card reader 244 reads data from that application. The data may be authenticated offline to verify that the payment card 230 is not a counterfeit. The smart card reader 244 then confirms the transaction and the EMV chip 222. A cardholder verification method (CVM) is then performed. In this example, the CVM can be performed (or predicated) through fingerprint verification that utilizes the thumbprint reader 232 and stored fingerprint template(s) 242. The smart card reader 244 then checks limits and requests approval from the card. Once approved, an online authorization request and authentication are completed and sent to a payment authorizer. The transaction is finalized, and an issuing scrip is sent to the payment card 230.

The payment card 230 of the embodiment of FIG. 35 includes fingerprint "match-on-card" capabilities that utilize the thumbprint reader 232 to generate a live fingerprint capacitive image that is compared against one or more stored fingerprint templates 242. In an example, an authorized user stores multiple fingerprint templates 242 in memory 240 pertaining to different portions of a user's fingerprint, fingerprints of differing fingers (e.g., including thumbprints), differing angles, fingerprints of multiple authorized users, etc. The use of multiple templates may introduce computational overhead, but also provide more accurate results. The fingerprint template(s) 242 are stored in the memory 240 during a user enrollment process, which may or may not involve the thumbprint reader 232.

In an example of operation, the processing module 234 detects a pending transaction and scans a thumbprint or fingerprint (e.g., using thumbprint reader 232 or edge capacitive scanner 248). The processing module 234 then performs a fingerprint matching operation against a stored fingerprint template 242 to determine if the scanned fingerprint capacitive image is valid. In an example, the processing module 234 performs matching steps such as described with reference to FIG. 37.

If the scanned fingerprint capacitive image is determined to be valid, the processing module 234 enables a chip of the payment card 230 to commence with an authorized transaction. In an example, the processing module 234 enables an NFC chip 236 and/or EVM chip 222 to commence with or continue an authorized payment transaction. If the scanned fingerprint capacitive image is determined to be invalid, the processing module 234 enables the NFC chip 236 and/or EVM chip 222 to send a message to a reader regarding retry of the fingerprint scanning process. Alternatively, the processing module 234 can disable the NFC chip 236 and/or EVM chip 222 for a particular transaction.

In another embodiment, either of payment card 230 or payment card 246 may include a separate display (e.g., a small OLED or similar display) for displaying information such as a credit card number, a cardholder name, an expiration date, a CVC/CVV, etc. In an example, the sensors of the thumbprint reader 232 are embedded into the display. In this embodiment, the display can be configured to display information only when a user fingerprint is successfully matched to a stored fingerprint template 242.

Figure 36:
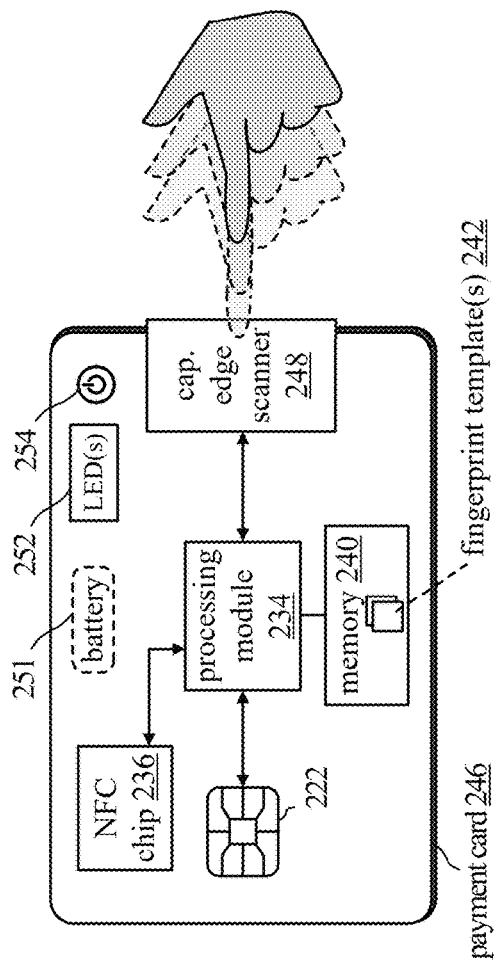
FIG. 36 is a schematic block diagram of an embodiment of a payment card having an edge capacitive scanner in accordance with the present disclosure.

FIG. 36 is a schematic block diagram of an embodiment of a payment card 246 having an edge capacitive scanner 248. The payment card 246 includes similar components to the payment card 230 of FIG. 36 and operates in a similar manner. In the illustrated embodiment, the payment card 246 includes an edge capacitive scanner 248 in place of the thumbprint reader 232, and further includes a battery 251, LED(s) 252, and a power button on/off 254.

The edge capacitive scanner 248 includes a plurality of integrated column electrodes and a plurality of integrated row electrodes coupled a plurality of drive-sense circuits, and operates to generate fingerprint/thumbprint capacitive images as described above with reference to FIGS. 1-20 and FIGS. 31-34, with the processing module 234 configured to perform the functions of a scanner processing module 82. Although illustrated on a side edge of the payment card 246, edge capacitive scanner 248 can be located on a top or bottom edge of the card.

The battery 251 is disposed in the substrate of the payment card 246. In an example, the battery is a fixed lifespan/charge battery. Alternatively, the battery 251 is coupled to and configured to receive power from power harvesting circuitry. For example, the battery 251 can receive and store power from the NFC chip 236 and/or EMV chip 222 while the payment card 246 is proximate to a card reader or wireless charging device. The battery 251 is coupled to and provides power to the processing module 234 and the edge capacitive scanner 248. The power button on/off 254 of this example enables/disables the supply of power from the battery 251.

The payment card 246 further includes LED(s) 252 that can provide an indication of a successful payment transaction, including a successful fingerprint verification process. For example, the LED(s) 252 include a green LED that provides visual indications of successful transactions and a red LED that provides indications of failed transactions.

FIG. 37 is a schematic block diagram of an embodiment of fingerprint matching module 250 operable to perform verification of a capacitive image 12. The matching module 250 can be implemented in any of the devices/cards described in conjunction with FIGS. 31, 36, 41 and 43. Briefly, the matching module 250 executes a matching algorithm 258 that compares minutia extracted from a fingerprint image to minutia information in a stored user template to determine a number of matches. Examples of minutia are described more fully below with reference to FIG. 39. If a scanned fingerprint image matches a threshold number of these minutia, it will be considered a match. As opposed to comparing whole fingerprint images, comparing minutia reduces the amount of processing power required to verify a fingerprint. This approach also helps avoid errors when a scanned fingerprint image is smudged or has a less than ideal orientation angle. In some cases, when a fingerprint image is off-center, matching can be performed using only a partial fingerprint capacitive image.

In operation, the matching module 250 receives a fingerprint capacitive image 12. The fingerprint capacitive image 12 may be optionally enhanced to improve the clarity of fingerprint ridge and fingerprint valley structures to simplify minutia extraction. For example, ridges can be thinned to aid in determining precise locations of endings and bifurcations. In another example, if the capacitive image is a grayscale image, areas that are lighter than a threshold (or areas for which no finger touch is detected) can be discarded while darker areas are made black.

Minutia (or feature) extraction 254 is then performed on the fingerprint capacitive image to generate discriminative properties of fingerprint. At a high level, minutia are essentially points that identify the terminations, intersections, and bifurcations of the fingerprint ridge lines that constitute a fingerprint pattern. The extracted minutia 254 are provided to a matching algorithm 258, which compares the minutia against a stored user template(s) 260 to determine the degree to the template and minutia are matching. In an example, minutia extraction 254 is part of the matching algorithm 258. In this example, the matching algorithm 258 marks minutia points on the fingerprint capacitive image 12, compares it with the stored user template 260, and returns the number of matched minutia (or similarity score) to a decision module 262, which may also be part of the matching algorithm 258.

The decision module 262 determines if the extracted fingerprint minutia 256 matches the stored user template 260 and generates a probabilistic result or authorization. In the illustrated embodiment, the decision module 262 utilizes a matching threshold 264. The matching threshold 264 establishes the smallest allowable deviation used by the decision module 262 to determine a match. In an example, only 30% of the available minutia are required for matching. In another example, the matching threshold 264 can be adjusted depending on a desired level of security or particular application, or in instances in which only a partial fingerprint capacitive image 12 is available.

A range of matching algorithms that vary in speed and accuracy are available to manufacturers, and various other approaches to fingerprint matching than described above may be employed by the matching module 250 without departing from the spirit of the disclosure.

FIG. 38 is a logic diagram of an embodiment of a method for authorizing a transaction using a fingerprint capacitive scanner as described above. In this embodiment, the method is executed by a processing module such as processing module 234 of the payment cards of FIGS. 35 and 36. The method begins at step 270 where the processing module scans a thumbprint or fingerprint (e.g., using thumbprint reader 232 edge capacitive scanner 248). The method continues at step 272 where the processing module performs a fingerprint matching operation against a stored user template to determine if the scanned fingerprint capacitive image is valid. In an example, the processing module performs matching steps such as described with reference to FIG. 37.

If the scanned fingerprint capacitive image is determined to be valid, the method continues at step 274 where the processing module enables a chip of the card to commence with an authorized transaction. In an example, the processing module enables an NFC chip 236 and/or EVM chip 222 to commence with or continue an authorized payment transaction. If the scanned fingerprint capacitive image is determined to be invalid, the method continues at step 276 where the processing module enables the chip to send a message to a reader regarding retry of the fingerprint scanning process. Alternatively, the processing module can disable the chip for a particular transaction.

By requiring a valid user fingerprint to proceed with use of a card, an additional layer of security is provided. In an example of use, many unattended point-of-sale terminals do not require a customer verification method such as a PIN or signature. A valid user fingerprint can function as the de facto customer verification method in such scenarios.

FIG. 39 is a diagram of an example of extracting fingerprint minutia 14 from a fingerprint capacitive image 12. As noted, minutia 14 are essentially points that identify the terminations, intersections, bifurcations, etc. of the fingerprint ridge lines that constitute a fingerprint pattern. Examples of various types of minutia are illustrated, including: a bifurcation, a ridge ending, a ridge crossing, a spur, a core, an island, a short ridge, and a bridge. Depending on the matching algorithm that is used, many other types of minutia can be utilized.

In general, the average fingerprint will have more than 15 identifiable minutia. In the illustrated example, the minutia points are located (e.g., by a matching algorithm or user enrollment algorithm) and mapped or localized to their relative placement on the fingerprint. For instance, once a minutia point has been identified, its location can be indicated by a distance from an identified core of the fingerprint (with the core serving as 0,0 on an X-Y axis). In addition to location, an angle of the minutia can be determined (e.g., when a ridge ends, the direction of the ridge at the point of termination establishes the angle). Further, minutia can be classified by type and/or quality to improve searching speed in certain applications.

Following mapping or localization of the fingerprint minutia 14, the resulting fingerprint minutia data can be formatted for comparison to a stored user template. In an example, the fingerprint minutia data is formatted into an array of values (e.g., hashes of minutia relationships, etc.) that can be readily processed by a matching module 250. In addition to the example of FIG. 39, various other approaches to minutia extraction can be employed, including approaches that provide improved matching results against partial or off-center fingerprint images (e.g., less than approximately 0.5 inches×0.7 inches).

Figure 40:
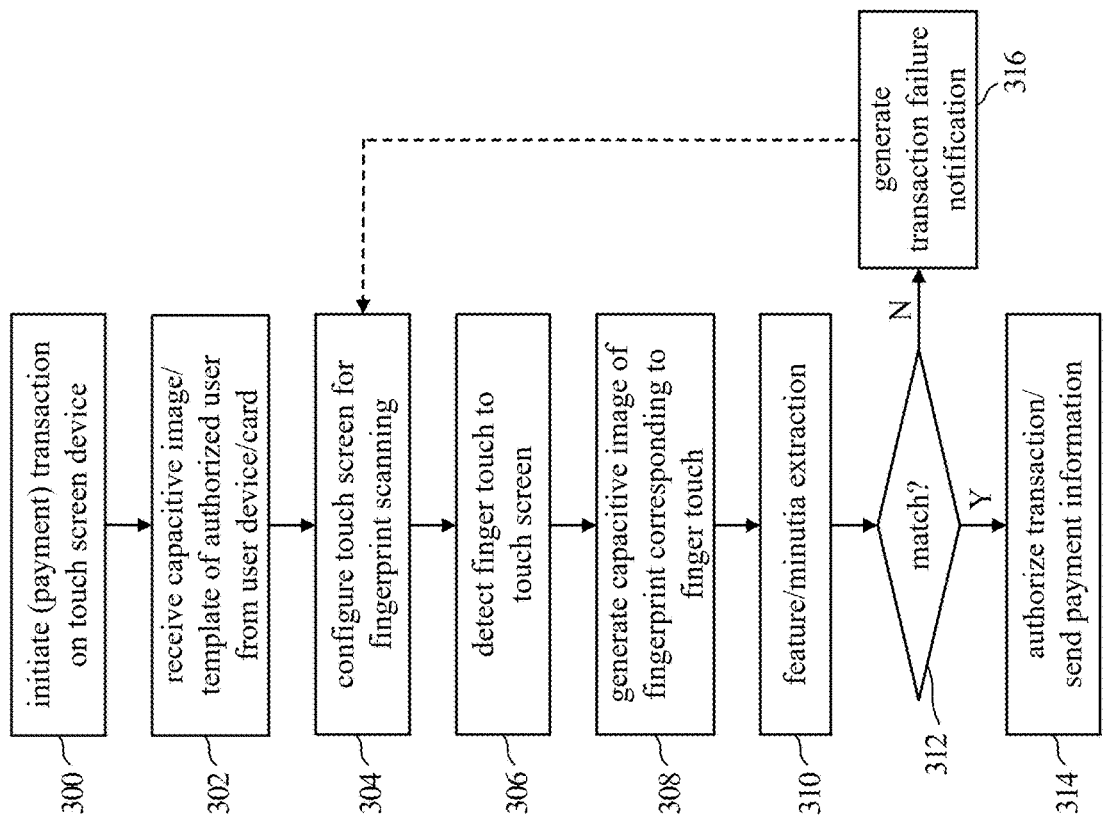
FIG. 40 is a logic diagram of an embodiment of a method for authorizing an on-line transaction via a fingerprint capacitive image in accordance with the present disclosure.

FIG. 40 is a logic diagram of an embodiment of a method for authorizing an on-line transaction via a fingerprint capacitive image. In this embodiment, the method is performed by a processing module of a touch screen device such as the computing device 36 of FIG. 41.

The method begins at step 300 where an on-line payment transaction or other type of transaction requiring user verification is initiated on the touch screen device. The method continues at step 302 where the processing module of the touch screen device requests and receives a fingerprint capacitive image/fingerprint template of an authorized user from a user device such as a payment card or mobile communication device. In an example, the touch screen device receives a fingerprint template from a mobile communication device via an NFC communication. In another example, the touch screen device receives a fingerprint capacitive image from a proximate payment card via a wireless touch screen communication (e.g., a magnetic field is created via touch screen electrodes or other componentry of the touch screen device to enable an NFC chip on the card).

The method continues at step 304 where the processing module configures the touch screen for fingerprint scanning. In an example, the entire touch screen is configured for fingerprint scanning as described above. In another example, the electrodes of a portion of the touch screen are configured as a sensing area for fingerprint scanning. The method continues at step 306 where the processing module senses a finger touch to a sensing area of the touch screen. Next, at step 308, the processing module generates a fingerprint capacitive image corresponding to the finger touch.

The method continues at step 310 where the processing module (and/or a matching module of the touch screen device) extracts fingerprint minutia or other features from the fingerprint capacitive image for use in matching against the fingerprint template. The processing module (and/or matching module) performs the matching operation at step 312. Examples of step 310 and step 312 are described with reference to FIGS. 37 and 39.

If the fingerprint capacitive image captured on the touch screen is determined to match the received fingerprint template, the illustrated method continues at step 314 where the processing module authorizes the pending transaction. For example, the processing module sends credit card payment information (e.g., a unique code or token for an EMV payment) to an on-line vendor. If the fingerprint capacitive image captured on the touch screen is determined not to match the received fingerprint template, the method continues at step 316 where the processing module generates a transaction failure notification. In an example, the processing module notifies a bank or vendor of a transaction failure. In another example, the processing module causes a failure notification to appear on the touch screen.

Figure 41:
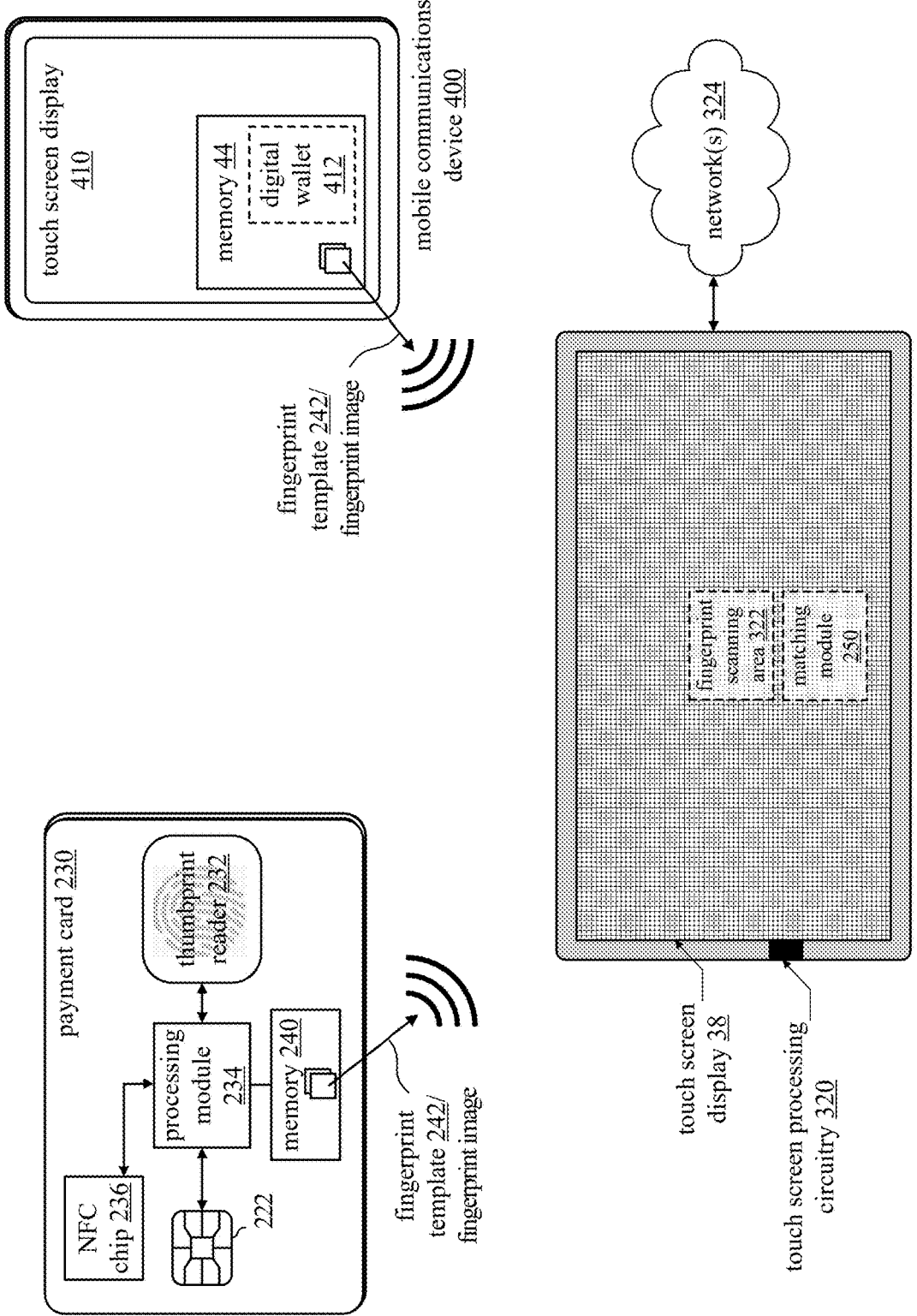
FIG. 41 is a block diagram of embodiments of authorizing an on-line transaction using fingerprint verification in accordance with the present disclosure.

FIG. 41 is a block diagram of embodiments of authorizing an on-line transaction using fingerprint verification. In one embodiment, the authorization occurs between a payment card (such as the payment card 230 of FIG. 35) and a computing device 36 having a touch screen display 38. In another embodiment, the authorization occurs between a mobile communications device 400 (an example of which is described with reference to FIG. 42) and the computing device 36.

The mobile communications device 400 may be a smartphone, tablet device, computing device, gaming device, e-reader, etc. In the illustrated example, the mobile communications device 400 componentry that includes a touch screen display (which can include fingerprint scanning capabilities as described herein) and a memory 22. The memory 22 of this example includes one or more fingerprint templates 242 corresponding to a fingerprint of an authorized user. The memory 22 further includes a secure digital wallet 412 and/or mobile EMV token, such as may be supported by various Android and iOS devices, to facilitate mobile payments for card-not-present transactions.

The computing device 36 may be a laptop, a tablet, a personal computer (PC), a workstation, a video game device, a television, etc. The computing device 36 of the illustrated embodiment includes a touch screen display 38, touch screen processing circuitry 320, a matching module 250, a fingerprint scanning area 322, and other components similar to or the same as those of the computing device of FIG. 21. The touch screen processing circuitry 320 is operable to provide touch functionality for the touch screen display 38 such as described with reference to the preceding Figures. For example, the touch screen processing circuitry 320 can sense, based on sensor signals from integrated drive-sense circuits, electrical characteristics (e.g., self-capacitance, mutual capacitance, change in impedance/capacitance, etc.) of row and column electrodes. Based on the electrical characteristics, the touch screen processing circuitry 320 can determine the location of a finger touch to a sensing area of the touch screen display 38 and generate a corresponding fingerprint capacitive image. Note that the sensing area can encompass the entire touch screen display 38. In the illustrated embodiment, electrodes 85 of the touch screen display 38 in the fingerprint scanning area 322 are configured (e.g., upon sensing a proximate finger touch) as a sensing area for a fingerprint scanning operations. An example of a matching module 250 is described with reference to FIG. 37.

In an example of operation, an on-line payment transaction or other type of transaction requiring user verification is initiated on the computing device 36. The computing device 36 then requests and receives a fingerprint capacitive image/fingerprint template 242 of an authorized user from a user device. In an example, the computing device 36 receives a fingerprint template 242 of an authorized user from the mobile communication device 400 via an NFC communication. In another example, the computing device 36 receives a fingerprint capacitive image of an authorized user from a proximate payment card 230 via a wireless touch screen communication (e.g., a magnetic field is created by touch screen electrodes or other componentry of the computing device 36 to enable an NFC chip 236 on the payment card 230).

The computing device 36 next configures (as necessary) the touch screen display 38 for fingerprint scanning. In an example, the entire touch screen display 38 is configured for fingerprint scanning as described above. In another example, the electrodes of a portion of the touch screen display 38 are configured as a sensing area for fingerprint scanning. A processing module of the computing device 36 then senses a finger touch to a sensing area of the touch screen display 38 and generates a fingerprint capacitive image corresponding to the finger touch.

The processing module (and/or the matching module of the computing device 36) extracts fingerprint minutia or other features from the fingerprint capacitive image for use in matching against the fingerprint template 242. Examples of a matching operation and minutia extraction are described with reference to FIGS. 37 and 39. If the fingerprint capacitive image captured on the touch screen display 38 is determined to match the received fingerprint template 242, the computing device 36 authorizes the pending transaction. For example, the computing device sends credit card payment information (e.g., a unique code or token for an EMV payment) to an on-line vendor via a network(s) 324. If the fingerprint capacitive image captured on the touch screen is determined not to match the received fingerprint template 242, the computing device 36 generates a transaction failure notification. In an example, the computing device 36 notifies a bank or vendor of a transaction failure. In another example, the computing device 36 causes a failure notification to appear on the touch screen display 38. In a differing implementation, an online transaction is initiated and completed on the mobile communication device 400 using an integrated fingerprint scanner to perform payment card verification and payment authorization.

Figure 42:
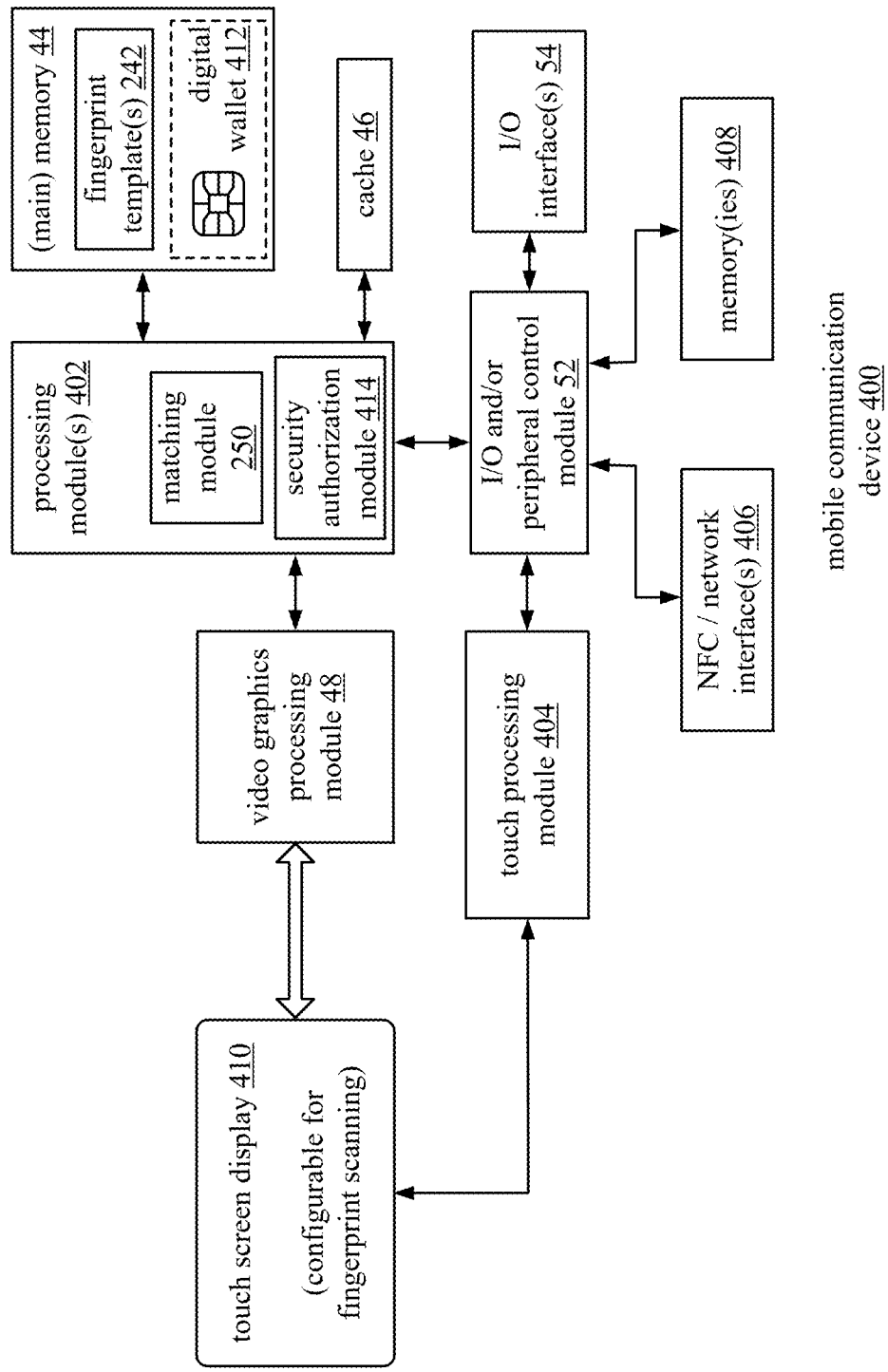
FIG. 42 is a schematic block diagram of an embodiment of a mobile communication device having a touch screen display configurable for fingerprint scanning in accordance with the present disclosure.

FIG. 42 is a block diagram of an embodiment of a mobile communication device 400 having a touch screen display configurable for fingerprint scanning. The mobile communication device 400 of FIG. 42 includes components consistent with a cellular telephone, small format tablet device, and/or another portable communication device. Thus, the mobile communication device 400 includes one or more wired and/or wireless network interfaces 406 to support wireless communications, including NFC communications. Further, the mobile communication device 400 includes one or more processing modules 402 and memories 408 tailored to support the mobile communication device 400.

The mobile communication device 400 includes a case, within and upon which its other components are formed/housed. Similar to the computing device of FIG. 2, the mobile communication device 400 includes a touch processing module 404 that couples to a touch screen display 410 that has touch sensors and drive-sense circuits, and which is located on a front surface or foldable surface of the case. The touch screen display 410 includes the touch area sensor(s) that can be selectively configured by the touch processing module 404 to sense touches to the touch screen display 410 and perform fingerprint scanning operations such as those described herein.

The mobile communications device 400 of the illustrated embodiment further includes (main) memory 44 that stores one or more fingerprint templates 242 that can be used by a matching module 250 to perform operations such as described in conjunction with FIG. 37. In an example, the matching module 250 utilizes a fingerprint template 242 to authenticate a fingerprint capacitive image scanned on the touch screen display 410. A security authorization module 414 provides a secure hardware/software environment for performing additional operations, such as two-factor authentication operations that utilize the results generated by the matching module 250.

The mobile communications device 400 may further include a digital wallet 412. A user of the mobile communication device 400 can add credit/debit cards to the digital wallet 412, which replaces actual card numbers with unique digital card numbers that can be used (via NFC communications) at contactless point of sale terminals, ATMs, etc. In another example, the digital wallet 412 can be used for payments when shopping online or in certain applications executed by the mobile communication device 400 without revealing full card numbers. Use of the digital wallet 412 can be preconditioned by a verified user fingerprint scan performed on the touch screen display 410.

Figure 43:
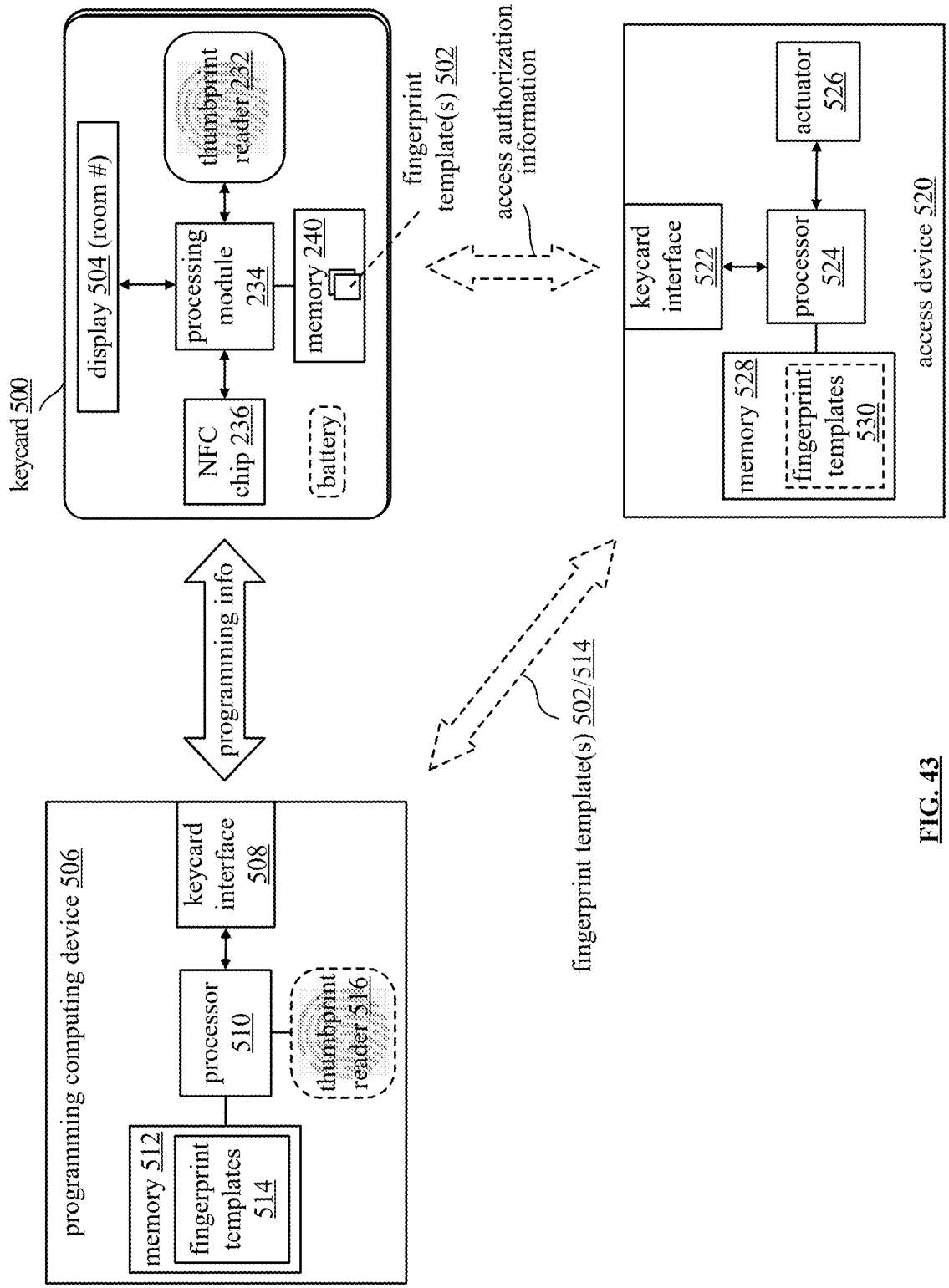
FIG. 43 is a schematic block diagram of an embodiment of a keycard incorporating a capacitive thumbprint reader in accordance with the present disclosure.

FIG. 43 is a schematic block diagram of an embodiment of a keycard 500 incorporating a capacitive thumbprint reader 232. The keycard 500 further includes a processing module 234, a memory 240 for storing one or more user (fingerprint) templates 502, a near-field-communication (NFC) chip 236, and a display 504. In other examples, the keycard 500 further includes an optional battery and power on/off button. As described more fully below, authorized access to an access device 520 is conditioned on a valid fingerprint capacitive image produced by thumbprint reader 232.

The thumbprint reader 232 includes a plurality of integrated column electrodes and a plurality of integrated row electrodes coupled a plurality of drive-sense circuits, and operates to generate fingerprint/thumbprint capacitive images as described above with reference to FIGS. 1-20, with the processing module 234 configured to perform various functions of a scanner processing module 82. In the illustrated example, the sensing area formed by the plurality of electrodes is sized appropriately for the keycard 500.

In an example, the keycard 500 has a form factor with dimensions of 85.60 millimeters (width)×53.98 (height) millimeters×0.76 millimeters (thickness), and the thumbprint reader 232 has a sensing area with dimensions of approximately 12.7 millimeters×17.8 millimeters in order to accommodate an average size adult fingerprint in a single scan. In another example, the dimensions of the sensing area of the thumbprint reader 232 are approximately 1 centimeter×1 centimeter. In yet another example, the keycard 500 includes an edge capacitive scanner 248 in lieu of a thumbprint reader 232 disposed on a front or back surface of the card. An example of such a card having an edge capacitive scanner 248 is described with reference to FIG. 36.

In the illustrated embodiment, programming of the keycard 500 is performed by a programming computing device 506. The programming computing device 506 includes a keycard interface 508, a processor 510, a memory 512 for storing fingerprint templates 514, and a thumbprint reader 516 of similar construction to thumbprint reader 232.

The keycard 500 functions to provide physical access control to a secured resource such as hotel room, laboratory, storage facility, corporate office, security system, information system, etc. In this embodiment, the keycard 500 is used to access an access device 520 such as a door lock. The access device 520 includes a keycard interface 522 (e.g., a wireless interface such as an NFC or Bluetooth interface), a processor 524, an actuator 526 (e.g., a door lock actuator), and a memory 528. In an example, the memory 528 includes fingerprint templates 530 for authorized users of the access device 520.

In an example of operation, the programming computing device 506 scans an authorized user fingerprint using the thumbprint reader 516 to produce a fingerprint capacitive image, and generates a corresponding fingerprint template 514. The programming computing device 506 next stores the fingerprint template 514 in memory of the keycard 500 (shown as fingerprint template(s) 502). In an example, the programming computing device 506 communicates with the keycard 500 via an NFC link during a keycard programming procedure to send programming information including the fingerprint template. The programming information may further include access permissions, levels of access, access device/system identification information, authorized user identification information, etc. In another example, the programming computing device 506 communicates multiple fingerprint templates 514 corresponding to different portions of an authorized user's fingerprint, fingerprint templates for multiple fingers of an authorized user (e.g., including a thumbprint), differing angles of a fingerprint, fingerprints of multiple authorized users, etc. for storage in the keycard 500. In yet another example of a keycard programming procedure, the programming computing device 506 enables the thumbprint reader 232 of the keycard 500 to scan an authorized user fingerprint to produce a fingerprint capacitive image that is then used to generate the fingerprint template(s) 502.

In an example of using the keycard 500, the processing module 234 of the keycard 500 detects a request to access the access device 520. The access device 520 (e.g., a door lock) operates to control access to a secured resource such as hotel room, laboratory, storage facility, corporate office, security system, computer network or database, etc. Continuing with this example, detecting an access request can include receiving a wireless communication (e.g., an NFC communication) or wireless power from a proximate access device 520.

In response to detecting the access request, the processing module 234 of the keycard 500 enables the thumbprint reader 232 to sense a finger touch, and generates a capacitive image/digital representation of the fingerprint. The processing module 234 next determines if the capacitive image/digital representation matches the stored fingerprint template 502 that corresponds to the authorized user. In response to determining that the capacitive image substantially matches the stored fingerprint template 502, the processing module 234 authorizes the access request. In an example, authorization of an access request includes enabling the NFC chip 236 of the keycard to transmit access authorization information for the access device 520. In another example in which the keycard 500 includes a display 504, the processing module 234 causes the display 504 to show information such as a room number, authorized user identification information, an indication of a successful scan, a credit balance, an account number, or other information that may be related to the access device 520.

If the capacitive image generated by the thumbprint reader 232 does not match the stored fingerprint template 502, the processing module 234 denies the access request. For example, the processing module 234 disables the wireless interface used to communicate with the keycard interface 522 of the access device 520. In another example, the processing module 234 does not transmit the access authorization information. Following the denial of an access request, the processing module 234 may enable the thumbprint reader 232 to allow a keycard holder to attempt another fingerprint matching operation.

In another example of use, the keycard 500 is utilized to authorize point-of-sale transactions in a similar manner to the payment card 230 of FIG. 35. For example, the keycard 500 can be used in a hotel for gift shop purchases, restaurant purchases, rentals, activity reservations, etc. In this example, cardholder verification can be performed by an on-card matching of a user fingerprint using the thumbprint reader 232 and user fingerprint template 502. Alternatively, a fingerprint capacitive image generated by the thumbprint reader 232, or a corresponding fingerprint template 502, is transmitted to the access device 520 (e.g., point-of-sale terminal) by the keycard 500 for matching against a fingerprint template(s) 530. In this example, the fingerprint template(s) 530 can be provided to the access device 520 by the programming computing device 506, or through a separate user enrollment process.

FIG. 44 a logic diagram of an embodiment of a method for authorizing an access request using a keycard having a thumbprint reader such as described with reference to FIG. 35. In this embodiment, the method is primarily performed by a processing module of a keycard device, such as the keycard 500 of FIG. 43, that operates in conjunction with other devices such as a keycard programming device and an access control device.

The method begins at step 540 where a keycard programming device scans an authorized user fingerprint. In an example, the keycard programming device scans the user fingerprint using a thumbprint reader (such as the thumbprint reader 232 described with reference to FIG. 35) to produce a fingerprint capacitive image. The method continues at step 542 where the keycard programming device generates a fingerprint template corresponding to the scanned authorized user fingerprint.

The method continues at step 544 where the fingerprint template is stored in a memory of the keycard. In an example, the programming computing device communicates with the keycard via an NFC link during a keycard programming procedure to send programming information including the fingerprint template. The programming information may further include access permissions, levels of access, access device/system identification information, authorized user identification information, etc. In another example, the programming computing device communicates multiple fingerprint templates corresponding to different portions of an authorized user's fingerprint, fingerprint templates for multiple fingers of an authorized user (e.g., including a thumbprint), differing angles of a fingerprint, fingerprints of multiple authorized users, etc. for storage in the keycard.

The method continues at step 546 where the processing module of the keycard detects a request to access an access device. In various examples, the access device (e.g., a door lock) operates to control access to a secured resource such as hotel room, laboratory, storage facility, corporate office, security system, computer network or database, etc. Continuing with this example, detecting an access request can include receiving a wireless communication (e.g., an NFC communication) or wireless power from a proximate access device.

The method continues at step 548 where the processing module of the keycard senses a finger touch to the sensing area of capacitive thumbprint reader of the keycard and generates a capacitive image/digital representation of the fingerprint. Next, at step 550, the processing module determines if the capacitive image matches the stored fingerprint template of the authorized user. In response to determining that the capacitive image substantially matches the stored fingerprint template, the processing module authorizes the access request. In an example, authorization of an access request includes enabling a wireless interface of the keycard to transmit access authorization information such as may be stored during programming of the keycard. In another example in which the keycard includes a display, the processing module further causes the display to show information such as a room number, authorized user identification information, an indication of a successful scan, a credit balance, an account number, etc.

In response to determining that the capacitive image does not match the stored fingerprint template, the method continues at step 554 where the processing module denies the access request. For example, the processing module disables the wireless interface used to communicate with access devices. In another example, the processing module does not transmit the access authorization information. Following the denial of the access request at step 554, the processing module may enable the capacitive thumbprint reader to allow a keycard holder to attempt another fingerprint matching operation.

Referring to the drawings and the prior description herein various particular embodiments are contemplated. According to one embodiment, a device includes a plurality of column electrodes and a plurality of row electrodes, wherein the plurality of row electrodes and the plurality of column electrodes are separated by a dielectric material and arranged in a crossing pattern in a sensing area of the device. The device further includes a plurality of drive-sense circuits, each of the drive-sense circuits configured, when enabled, to drive a sensor signal on at least one electrode of the plurality of column electrodes or the plurality of row electrodes, the sensor signal including a drive signal component and a receive signal component. The plurality of drive-sense circuits is further configured to generate, based on the receive signal component, a sensed signal representative of an impedance of the at least one electrode. The device further includes a processing module configured to process sensed signals generated by the plurality of drive-sense circuits to detect a finger touch to the sensing area and generate a digital representation of a fingerprint corresponding to the finger touch.

With another embodiment, a device includes a display configured to display images in a display area, a plurality of row electrodes integrated into the display area and a plurality of column electrodes integrated into the display area, wherein the plurality of row electrodes and the plurality of column electrodes are arranged in a crossing pattern to form a sensing area of the display area. The device further includes a plurality of drive-sense circuits, each of the drive-sense circuits configured, when enabled, to drive a sensor signal on at least one electrode of the plurality of column electrodes or the plurality of row electrodes, the sensor signal including a drive signal component and a receive signal component. The drive-sense circuits are further configured to generate, based on the receive signal component, a sensed signal representative of an impedance of the at least one electrode. The device further includes a processing module configured to process sensed signals generated by the plurality of drive-sense circuits to detect a finger touch to the sensing area and generate a fingerprint capacitive image corresponding to the finger touch.

These embodiments may include optional aspects. With one optional aspect, the sensed signal is representative of a change in mutual impedance between the at least one electrode and at least one additional electrode of the plurality of column electrodes or the plurality of row electrodes. With another optional aspect, the receive signal component includes a representation of a first impedance change of the impedance of the at least one electrode that is indicative of a change in self-capacitance of the at least one electrode in accordance with a first frequency of the drive signal component, and a representation of a second impedance change of the impedance of the at least one electrode that is indicative of a change in mutual capacitance of the at least one electrode in accordance with a second frequency of a drive signal component on a differing electrode.

With yet another optional aspect, the processing module is further configured to extract fingerprint minutia data from the digital representation of the fingerprint. With yet another optional embodiment, the processing module is further configured to retrieve a stored fingerprint template including stored minutia data, compare the fingerprint minutia data to the stored minutia data to determine a number of matches and, in response to determining that the number of matches exceeds a matching threshold, generate an indication that the fingerprint matches the stored fingerprint template. The processing module can be further configured to quantize the fingerprint minutia data.

With yet another optional aspect, the device includes digital filtering circuitry coupled between the plurality of drive-sense circuits and the processing module, the digital filtering circuitry configured to filter the sensed signals generated by the plurality of drive-sense circuits for processing by the processing module. With yet another optional embodiment, the device also includes reference signal circuitry coupled to the plurality of drive-sense circuits, wherein the processing module is further configured to generate control signals to enable the reference signal circuitry to provide reference signals to the plurality of drive-sense circuits for establishing the drive signal components of the sensor signals. With yet another optional embodiment, the digital representation of a fingerprint includes fingerprint ridge data and fingerprint valley data.

With another embodiment, a card having an edge capacitive scanner includes a substrate having opposing sides and an edge surface. A plurality of column electrodes and a plurality of row electrodes are disposed in a crossing pattern along the edge surface of the substrate to form a sensing area. The card further includes a plurality of drive-sense circuits, each of the drive-sense circuits configured, when enabled, to drive a sensor signal on at least one electrode of the plurality of column electrodes or the plurality of row electrodes, the sensor signal including a drive signal component and a receive signal component. The plurality of drive-sense circuits are further configured to generate, based on the receive signal component, a sensed signal representative of an impedance of the at least one electrode. A processing module of the card is configured to process sensed signals generated by the plurality of drive-sense circuits to detect a touch to the sensing area by at least a portion of a surface of an object and generate a capacitive image of the at least a portion of the surface.

With still another embodiment, a method comprises sensing a touch, by a portion of an object or finger, to a sensing area disposed on an edge surface of a card. The method further includes: capturing an initial capacitive image of a portion of the object or finger touching the sensing area and storing the initial capacitive image as an initial window (which may have a window size corresponding to the size of the sensing area); capturing additional capacitive images of the object or finger as the object or finger moves across the sensing area for a scan; for each additional capacitive image, determining whether the additional capacitive image corresponds to a next portion of the object or finger and, in response to determining that an additional capacitive image corresponds to a next portion of the object or finger, storing the additional capacitive image as a next window. The method continues by detecting completion of the scan and, in response to detecting completion of the scan, compiling the stored windows to produce a scanned capacitive image.

With an optional aspect of this embodiment, capturing a capacitive image includes driving, by a plurality of drive-sense circuits, sensor signals on a plurality of row electrodes and a plurality of column electrodes, wherein the plurality of row electrodes and the plurality of column electrodes are disposed in a crossing pattern along the edge surface of the substrate to form the sensing area, and wherein a sensor signal includes a drive signal component and a receive signal component. The plurality of drive-sense circuits are further configured to generate, based on the receive signal components, sensed signals representative of changes in impedances of the plurality row electrodes and the plurality of column electrodes. The method of this optional aspect further includes processing the sensed signals to generate the capacitive image.

With another optional aspect, detecting completion of the scan includes sensing that object or finger is no longer touching the sensing area. With yet another optional aspect, detecting completion of the scan includes determining that the number of stored capacitive images compares favorably to a threshold number. With yet another optional aspect, the method further includes detecting an incomplete scan and generating an indication of scan failure. With yet another optional aspect, the next portion of the object or finger is non-overlapping with a preceding portion of the object or finger. With yet another optional aspect, the window size substantially corresponds to the size of the sensing area.

With another embodiment, a card comprises a substrate, a memory configured to store fingerprint template data corresponding to an authorized user of the card, a near field communication (NFC) chip, a plurality of column electrodes, and a plurality of row electrodes. The plurality of row electrodes and the plurality of column electrodes are disposed in a crossing pattern along a side surface of the substrate to form a sensing area. The card further includes a plurality of drive-sense circuits, each of the drive-sense circuits configured, when enabled, to drive a sensor signal on at least one electrode of the plurality of column electrodes or the plurality of row electrodes, the sensor signal including a drive signal component and a receive signal component, and generate, based on the receive signal component, a sensed signal representative of an impedance of the at least one electrode. A processing module of the card is coupled to the memory and the NFC chip. The processing module is configured to process sensed signals generated by the plurality of drive-sense circuits to detect a finger touch to the sensing area, generate a digital representation of a fingerprint corresponding to the finger touch, determine if the digital representation of the fingerprint substantially matches the fingerprint template data and, in response to determining that the digital representation of the fingerprint substantially matches the fingerprint template data, generate a control signal to enable the NFC chip to transmit transaction authorization information.

With still another embodiment, a method for authenticating an on-line payment transaction initiated on a first device having a touch screen comprises wirelessly receiving, by the first device from a second device (e.g., a smart card or mobile communications device), a first fingerprint capacitive image or template. The method further includes configuring the touch screen for fingerprint scanning, detecting a finger touch to the touch screen, generating a second fingerprint capacitive image or template corresponding to the finger touch, determining if the first fingerprint capacitive image substantially matches the second fingerprint capacitive image. In response to determining that the first fingerprint capacitive image matches the second fingerprint capacitive image, the method further includes completing the on-line payment transaction.

According to another embodiment, a keycard includes a memory for storing one or more fingerprint templates corresponding to an authorized user of the keycard, a wireless communication interface, a plurality of column electrodes and a plurality of row electrodes, wherein the plurality of row electrodes and the plurality of column electrodes are separated by a dielectric material and arranged in a crossing pattern in a sensing area of the keycard. The keycard further includes a plurality of drive-sense circuits, each of the drive-sense circuits configured, when enabled, to drive a sensor signal on at least one electrode of the plurality of column electrodes or the plurality of row electrodes, the sensor signal including a drive signal component and a receive signal component. Each of the drive-sense circuits is further configured to generate, based on the receive signal component, a sensed signal representative of an impedance of the at least one electrode. The keycard further includes a processing module configured to process sensed signals generated by the plurality of drive-sense circuits to detect a finger touch to the sensing area and generate a digital representation of a fingerprint corresponding to the finger touch, determine if the digital representation of the fingerprint substantially matches a fingerprint template stored in the memory and, in response to determining that the digital representation of the fingerprint substantially matches the fingerprint template, enable the wireless communication interface to transmit access authorization information.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or may further include memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While transistors may be shown in one or more of the above-described figure(s) as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A device comprising:
   a plurality of column electrodes;
   a plurality of row electrodes, wherein the plurality of row electrodes and the plurality of column electrodes are separated by a dielectric material and arranged in a crossing pattern in a sensing area of the device;
   a first plurality of drive-sense circuits coupled to the plurality of column electrodes, each of the first plurality of drive-sense circuits configured to:
   drive a sensor signal on at least one column electrode of the plurality of column electrodes, the sensor signal including a drive signal component and a receive signal component; and generate, based on the receive signal component, a sensed signal representative of:
- a first impedance of the at least one column electrode in accordance with a first frequency of the drive signal component; and
- a second impedance of the at least one column electrode in accordance with a second frequency of a drive signal component from a differing electrode;

a second plurality of drive-sense circuits coupled to the plurality of row electrodes, each of the second plurality of drive-sense circuits configured to:
- drive a sensor signal on at least one row electrode of the plurality of row electrodes, the sensor signal including a drive signal component and a receive signal component; and
- generate, based on the receive signal component, a sensed signal representative of an impedance of the at least one row electrode; and a processing module configured to process sensed signals generated by the first plurality of drive-sense circuits and second plurality of drive-sense circuits to:
- detect a finger touch to the sensing area; and
- generate a digital representation of a fingerprint corresponding to the finger touch.

2. The device of claim 1, further comprising:
a switch network configurable to:
- couple the first plurality of drive-sense circuits to the plurality of column electrodes; and
- couple the second plurality of drive-sense circuits to the plurality of row electrodes.

3. The device of claim 2, wherein the processing module is further configured to process the sensed signals to:
- detect a proximal touch to the sensing area; and
- in response to detecting the proximal touch, control the switch network to adjust a touch resolution of the sensing area.

4. The device of claim 1, wherein the sensed signal representative of the first impedance of the at least one column electrode is indicative of a change in self-capacitance.

5. The device of claim 4, wherein the sensed signal representative of the second impedance of the at least one column electrode is indicative of a change in mutual capacitance.

6. The device of claim 1, wherein the processing module is further configured to extract fingerprint minutia data from the digital representation of the fingerprint.

7. The device of claim 6, wherein the processing module is further configured to:
- retrieve a stored fingerprint template including stored minutia data; and
- compare the fingerprint minutia data to the stored minutia data to determine if the fingerprint matches the stored fingerprint template.

8. The device of claim 6, wherein the processing module is further configured to quantize the fingerprint minutia data.

9. The device of claim 1, further comprising:
digital filtering circuitry coupled between the processing module and the first plurality of drive-sense circuits and second plurality of drive-sense circuits, the digital filtering circuitry configured to filter the sensed signals generated by the drive-sense circuits for processing by the processing module; and reference signal circuitry coupled to the first plurality of drive-sense circuits and second plurality of drive-sense circuits, wherein the processing module is further configured to generate control signals to enable the reference signal circuitry to provide reference signals to first plurality of drive-sense circuits and second plurality of drive-sense circuits.

10. A device comprising:
a first plurality of electrodes;
a second plurality of electrodes, wherein the first plurality of electrodes has a first orientation and the second plurality of electrodes has a second orientation, and wherein the first orientation and the second orientation form a sensing area of the device;
a plurality of drive-sense circuits, each of the drive-sense circuits configured, when enabled, to:
- drive a sensor signal on an electrode of the first plurality of electrodes or the second plurality of electrodes, the sensor signal including a drive signal component and a receive signal component; and
- generate, based on the receive signal component, a sensed signal representative of at least one impedance of the electrode, wherein receive signal components of the sensor signals that correspond to electrodes of the first plurality of electrodes include:
  - a first frequency component corresponding to a frequency of the drive signal component; and
  - a second frequency component corresponding to a frequency of a drive signal component from a differing electrode; and a processing module configured to process sensed signals generated by the plurality of drive-sense circuits to:
- detect a finger touch to the sensing area; and
- generate a capacitive image of at least a partial fingerprint corresponding to the finger touch.

11. The device of claim 10, further comprising:
a switch network configurable to couple the plurality of drive-sense circuits to the first plurality of electrodes and the second plurality of electrodes, wherein the processing module is further configured to process the sensed signals to:
- detect a proximal touch to the sensing area; and
- in response to detecting the proximal touch, control the switch network to adjust a touch resolution of the sensing area.

12. The device of claim 10, wherein the first frequency component is representative of a change in self-capacitance.

13. The device of claim 12, wherein the second frequency component is representative of a change in mutual capacitance.

14. The device of claim 10, wherein the processing module is further configured to extract fingerprint minutia data from the capacitive image of the at least a partial fingerprint.

15. The device of claim 14, wherein the processing module is further configured to:
- retrieve a stored fingerprint template including stored minutia data; and
- compare the fingerprint minutia data to the stored minutia data to determine if the capacitive image of the at least a partial fingerprint matches the stored fingerprint template.

16. The device of claim 10, further comprising:
digital filtering circuitry coupled between the plurality of drive-sense circuits and the processing module, the digital filtering circuitry configured to filter the sensed signals generated by the plurality of drive-sense circuits for processing by the processing module; and reference signal circuitry coupled to the plurality of drive-sense circuits, wherein the processing module is further configured to generate control signals to enable the reference signal circuitry to provide reference signals to the plurality of drive-sense circuits.

17. A device comprising:

a display configured to display images in a display area;

a first plurality of electrodes integrated into the display area;

a second plurality of electrodes integrated into the display area, wherein the first plurality of electrodes and the second plurality of electrodes are arranged in a crossing pattern to form a sensing area of the display area;

a plurality of drive-sense circuits, each of the drive-sense circuits configured to:

drive a sensor signal on an electrode of the first plurality of electrodes or the second plurality of electrodes, the sensor signal including a drive signal component and a receive signal component, wherein a drive signal component of the sensor signals driven to electrodes of the first plurality of electrodes include a first frequency component and a second frequency component, and wherein a drive signal component of the sensor signals driven to electrodes of the second plurality of electrodes includes the first frequency component; and generate, based on the receive signal component, a sensed signal representative of at least one impedance of the electrode; and a processing module configured to process sensed signals generated by the plurality of drive-sense circuits to:

detect a finger touch to the sensing area; and generate a fingerprint capacitive image corresponding to the finger touch.

18. The device of claim 17, further comprising:

a switch network configurable to couple the plurality of drive-sense circuits to the first plurality of electrodes and the second plurality of electrodes, wherein the processing module is further configured to process the sensed signals to:

detect a proximal touch to the sensing area; and in response to detecting the proximal touch, control the switch network to adjust a touch resolution of the sensing area.

19. The device of claim 17, wherein a sensed signal corresponding to an electrode of the second plurality of electrodes includes a representation of:

a representation of a first impedance in accordance with the first frequency component, wherein the representation of the first impedance is indicative of a change in self-capacitance of the electrode of the second plurality of electrodes; and a representation of a second impedance in accordance with the second frequency component, wherein the representation of the second impedance is indicative of a change in mutual capacitance between the electrode of the second plurality of electrodes and an electrode of the first plurality of electrodes.

20. The device of claim 17, wherein the processing module is further configured to:

extract fingerprint minutia data from the fingerprint capacitive image;

retrieve a stored fingerprint template including stored minutia data; and compare the fingerprint minutia data to the stored minutia data to determine a number of matches.

* * * * *